US008605835B2

(12) United States Patent
Matsumura

(10) Patent No.: US 8,605,835 B2
(45) Date of Patent: Dec. 10, 2013

(54) RECEIVER DEVICE, INTEGRATED CIRCUIT, RECEIVING METHOD, AND RECEIVING PROGRAM

(75) Inventor: Yoshinobu Matsumura, Osaka (JP)

(73) Assignee: Panasonic Corporation, Osaka (JP)

( * ) Notice: Subject to any disclaimer, the term of this patent is extended or adjusted under 35 U.S.C. 154(b) by 234 days.

(21) Appl. No.: 13/060,534

(22) PCT Filed: Jun. 23, 2010

(86) PCT No.: PCT/JP2010/004175
§ 371 (c)(1),
(2), (4) Date: Feb. 24, 2011

(87) PCT Pub. No.: WO2011/001632
PCT Pub. Date: Jan. 6, 2011

(65) Prior Publication Data
US 2011/0164671 A1 Jul. 7, 2011

(30) Foreign Application Priority Data
Jul. 2, 2009 (JP) .................................. 2009-157971

(51) Int. Cl.
H04L 27/06 (2006.01)
H04L 27/00 (2006.01)
H03K 9/00 (2006.01)
H03K 9/06 (2006.01)
H04J 1/00 (2006.01)

(52) U.S. Cl.
USPC ........... 375/344; 375/316; 375/326; 375/324; 375/322; 370/482; 370/480; 370/464; 455/150.1; 455/130

(58) Field of Classification Search
USPC ................................ 375/343, 344
See application file for complete search history.

(56) References Cited

U.S. PATENT DOCUMENTS

2002/0017948 A1 2/2002 Hyakudai et al.
2008/0089443 A1 4/2008 Sanada et al.
(Continued)

FOREIGN PATENT DOCUMENTS

JP 11-112460 4/1999
JP 2001-308821 11/2001
(Continued)

OTHER PUBLICATIONS

Digital Video Broadcasting (DVB), Frame structure channel coding and modulation for a second generation digital terrestrial television broadcasting system (DVB-T2), DVB Document A122, Jun. 2008.*

(Continued)

Primary Examiner — Chieh M Fan
Assistant Examiner — Michelle M Koeth
(74) Attorney, Agent, or Firm — Wenderoth, Lind & Ponack, L.L.P.

(57) ABSTRACT

A wideband carrier frequency error calculator that, for each of a plurality of location patterns, calculates a cumulative value through a predetermined process performed on signals output by an orthogonal transformer for a plurality of sub-carrier positions determined according to a given location pattern while simultaneously shifting the signals output therefrom by one sub-carrier unit along the carrier direction and that also calculates wideband carrier frequency error according to carrier direction discrepancies calculated as maximum values within the cumulative value, and a carrier frequency error corrector that applies corrections to carrier frequency discrepancies according to the wideband carrier frequency error so calculated.

7 Claims, 45 Drawing Sheets

(56) References Cited

U.S. PATENT DOCUMENTS

| | | |
|---|---|---|
| 2008/0090536 A1* | 4/2008 | Okada .......................... 455/208 |
| 2009/0225822 A1* | 9/2009 | Tupala et al. ................. 375/226 |
| 2010/0091916 A1* | 4/2010 | Henriksson et al. .......... 375/343 |
| 2011/0249772 A1 | 10/2011 | Kimura et al. |
| 2012/0156990 A1* | 6/2012 | Dateki et al. .................... 455/39 |

FOREIGN PATENT DOCUMENTS

| | | |
|---|---|---|
| JP | 2002-026866 | 1/2002 |
| JP | 2004-165896 | 6/2004 |
| JP | 2006-295349 | 10/2006 |
| JP | 2008-236704 | 10/2008 |
| JP | 2009-112013 | 5/2009 |
| WO | 2008/149510 | 11/2008 |
| WO | 2009/056801 | 5/2009 |

OTHER PUBLICATIONS

International Search Report issued Sep. 7, 2010 in International (PCT) Application No. PCT/JP2010/004175.

Digital Video Broadcasting (DVB); Implementation guidelines for a second generation digital terrestrial television broadcasting system (DVB-T2), DVB Document A133, Jun. 2010.

* cited by examiner

FIG. 9

| | FFT size | Guard interval fraction | | | | | | |
|---|---|---|---|---|---|---|---|---|
| | | 1/128 | 1/32 | 1/16 | 19/256 | 1/8 | 19/128 | 1/4 |
| | 32k | (PP7) | (PP4) PP6 | (PP2) (PP8) PP4 | (PP2) (PP8) PP4 | PP2 (PP8) | PP2 (PP8) | N/A |
| | 16k | (PP7) | PP7 (PP4) PP6 | (PP2) (PP8) PP4 PP5 | (PP2) (PP8) PP4 PP5 | PP2 PP3 (PP8) | PP2 PP3 (PP8) | PP1 (PP8) |
| | 8k | (PP7) | PP7 (PP4) | (PP8) PP4 PP5 | (PP8) PP4 PP5 | PP2 PP3 (PP8) | PP2 PP3 (PP8) | PP1 (PP8) |
| | 4k, 2k | N/A | PP7 (PP4) | PP4 PP5 | N/A | PP2 PP3 | N/A | PP1 |
| SISO | 1k | N/A | N/A | PP4 PP5 | N/A | PP2 PP3 | N/A | PP1 |
| | FFT size | Guard interval fraction | | | | | | |
| | | 1/128 | 1/32 | 1/16 | 19/256 | 1/8 | 19/128 | 1/4 |
| | 32k | (PP8) PP4 PP6 | (PP8) PP4 | PP2 (PP8) | PP2 (PP8) | N/A | N/A | N/A |
| | 16k | (PP8) PP4 PP5 | (PP8) PP4 PP5 | PP3 (PP8) | PP3 (PP8) | PP1 (PP8) | PP1 (PP8) | N/A |
| | 8k | (PP8) PP4 PP5 | (PP8) PP4 PP5 | PP3 (PP8) | PP3 (PP8) | PP1 (PP8) | PP1 (PP8) | N/A |
| | 4k, 2k | N/A | PP4 PP5 | PP3 | N/A | PP1 | N/A | PP1 |
| MISO | 1k | N/A | N/A | PP3 | N/A | PP1 | N/A | PP1 |

FIG. 13

PN sequence (Hexadecimal)

4DC2AF7BD8C3C9A1E76C9A090AF1C3114F07FCA2808E9462E9AD7B712D6F4AC8A59BB069CC50BF1149927E6B
B1C9FC8C18BB949B30CD09DDD749E704F57B41DEC7E7B176E12C5657432B51B0B812DF0E14887E24D80C97F09
374AD76270E58FE1774B2781D8D3821E393F2EA0FFD4D24DE20C05D0BA1703D10E52D61E013D837A62D007CC
2FD76D23A3E125BDE8A9A7C02A98B70251C556F6341EBDECB801AAD5D9FB8CBEA80BB6190965 27A8C475B3D8
DB28AF8543A00EC3480DFF1E2CDA9F985B523B879007AA5D0CE58D21B186310066 17F6F769EB947F924EA5161E
C2C0488B63ED7993BA8EF4E552FA32FC3F1BDB199239 02BCBBE5DDABB824126E08459CA6CFA0267E5294A98C6
32569791E60EF659AEE9518CDF08D87833690C1B79183ED127E533 60CD86514859A28B5494F51AA4882419A25A2
D01A5F47AA27301E79A5370CCB3E197F

FIG. 29

Sub-carrier numbers of TMCC positions
(ISDB-T, Mode 3, synchronous modulation)

| 70 | 1474 | 2878 | 4282 |
|---|---|---|---|
| 133 | 1537 | 2941 | 4345 |
| 233 | 1637 | 3041 | 4445 |
| 410 | 1814 | 3218 | 4622 |
| 476 | 1880 | 3284 | 4688 |
| 587 | 1991 | 3395 | 4799 |
| 697 | 2101 | 3505 | 4909 |
| 787 | 2191 | 3595 | 4999 |
| 947 | 2351 | 3755 | 5159 |
| 1033 | 2437 | 3841 | 5245 |
| 1165 | 2569 | 3973 | 5377 |
| 1289 | 2693 | 4907 | 5501 |
| 1319 | 2723 | 4127 | 5531 |

FIG. 32

CP carrier positions (DVB-T, 8k)

| 0 | 636 | 1140 | 1986 | 2646 | 3462 | 4167 | 4614 | 5544 | 6096 |
|---|---|---|---|---|---|---|---|---|---|
| 48 | 714 | 1146 | 2037 | 2673 | 3495 | 4173 | 4677 | 5562 | 6162 |
| 54 | 759 | 1206 | 2136 | 2688 | 3549 | 4188 | 4731 | 5595 | 6213 |
| 87 | 765 | 1269 | 2154 | 2754 | 3564 | 4212 | 4785 | 5637 | 6219 |
| 141 | 780 | 1323 | 2187 | 2805 | 3600 | 4281 | 4899 | 5643 | 6222 |
| 156 | 804 | 1377 | 2229 | 2811 | 3609 | 4296 | 5091 | 5730 | 6249 |
| 192 | 873 | 1491 | 2235 | 2814 | 3663 | 4326 | 5112 | 5748 | 6252 |
| 201 | 888 | 1683 | 2322 | 2841 | 3687 | 4347 | 5160 | 5826 | 6258 |
| 255 | 918 | 1704 | 2340 | 2844 | 3690 | 4350 | 5166 | 5871 | 6318 |
| 279 | 939 | 1752 | 2418 | 2850 | 3741 | 4377 | 5199 | 5877 | 6381 |
| 282 | 942 | 1758 | 2463 | 2910 | 3840 | 4392 | 5253 | 5892 | 6435 |
| 333 | 969 | 1791 | 2469 | 2973 | 3858 | 4458 | 5268 | 5916 | 6489 |
| 432 | 984 | 1845 | 2484 | 3027 | 3891 | 4509 | 5304 | 5985 | 6603 |
| 450 | 1050 | 1860 | 2508 | 3081 | 3933 | 4515 | 5313 | 6000 | 6795 |
| 483 | 1101 | 1896 | 2577 | 3195 | 3939 | 4518 | 5367 | 6030 | 6816 |
| 525 | 1107 | 1905 | 2592 | 3387 | 4026 | 4545 | 5391 | 6051 | |
| 531 | 1110 | 1959 | 2622 | 3408 | 4044 | 4548 | 5394 | 6054 | |
| 618 | 1137 | 1983 | 2643 | 3456 | 4122 | 4554 | 5445 | 6081 | |

FIG. 39 (PRIOR ART)

| | FFT size | Guard interval fraction | | | | | | |
|---|---|---|---|---|---|---|---|---|
| | | 1/128 | 1/32 | 1/16 | 19/256 | 1/8 | 19/128 | 1/4 |
| | 32k | PP7 | PP4 PP6 | PP2 PP8 PP4 | PP2 PP8 PP4 | PP2 PP8 | PP2 PP8 | N/A |
| | 16k | PP7 | PP7 PP4 PP6 | PP2 PP8 PP4 PP5 | PP2 PP8 PP4 PP5 | PP2 PP3 PP8 | PP2 PP3 PP8 | PP1 PP8 |
| | 8k | PP7 | PP7 PP4 | PP8 PP4 PP5 | PP8 PP4 PP5 | PP2 PP3 PP8 | PP2 PP3 PP8 | PP1 PP8 |
| | 4k, 2k | N/A | PP7 PP4 | PP4 PP5 | N/A | PP2 PP3 | N/A | PP1 |
| SISO | 1k | N/A | N/A | PP4 PP5 | N/A | PP2 PP3 | N/A | PP1 |
| | FFT size | Guard interval fraction | | | | | | |
| | | 1/128 | 1/32 | 1/16 | 19/256 | 1/8 | 19/128 | 1/4 |
| | 32k | PP8 PP4 PP6 | PP8 PP4 | PP2 PP8 | PP2 PP8 | N/A | N/A | N/A |
| | 16k | PP8 PP4 PP5 | PP8 PP4 PP5 | PP3 PP8 | PP3 PP8 | PP1 PP8 | PP1 PP8 | N/A |
| | 8k | PP8 PP4 PP5 | PP8 PP4 PP5 | PP3 PP8 | PP3 PP8 | PP1 PP8 | PP1 PP8 | N/A |
| | 4k, 2k | N/A | PP4 PP5 | PP3 | N/A | PP1 | N/A | PP1 |
| MISO | 1k | N/A | N/A | PP3 | N/A | PP1 | N/A | PP1 |

| FFT size | Number of P2 symbols |
|---|---|
| 1k | 16 |
| 2k | 8 |
| 4k | 4 |
| 8k | 2 |
| 16k | 1 |
| 32k | 1 |

FIG. 42 (PRIOR ART)

| FFT size | | 1k | 2k | 4k | 8k | 16k | 32k |
|---|---|---|---|---|---|---|---|
| Number of useful sub-carriers | Normal mode | 853 | 1705 | 3409 | 6817 | 13633 | 27265 |
| | Extended mode | N/A | N/A | N/A | 6913 | 13921 | 27841 |
| Half the difference in number of useful sub-carriers between normal mode and extended mode ($\Delta f$) | | — | — | — | 48 | 144 | 288 |

| Pilot pattern | Dx | Dy | DxDy |
|---|---|---|---|
| PP1 | 3 | 4 | 12 |
| PP2 | 6 | 2 | 12 |
| PP3 | 6 | 4 | 24 |
| PP4 | 12 | 2 | 24 |
| PP5 | 12 | 4 | 48 |
| PP6 | 24 | 2 | 48 |
| PP7 | 24 | 4 | 96 |
| PP8 | 6 | 16 | 96 |

FIG. 45 (PRIOR ART)

| FFT size | CP groups used | N |
|---|---|---|
| 1k | CP_g1 | 1632 |
| 2k | CP_g1, CP_g2 | 1632 |
| 4k | CP_g1, CP_g2, CP_g3 | 3264 |
| 8k | CP_g1, CP_g2, CP_g3, CP_g4 | 6528 |
| 16k | CP_g1, CP_g2, CP_g3, CP_g4, CP_g5 | 13056 |
| 32k | CP_g1, CP_g2, CP_g3, CP_g4, CP_g5, CP_g6 | — |

FIG. 46 (PRIOR ART)

| | PP1 | PP2 | PP3 | PP4 | PP5 | PP6 | PP7 | PP8 |
|---|---|---|---|---|---|---|---|---|
| CP_g1 | 116 255<br>285 430<br>518 546<br>601 646<br>744 1662<br>1893 1995<br>2322 3309<br>3351 3567<br>3813 4032<br>5568 5706 | 116 318<br>390 430<br>474 518<br>601 646<br>708 726<br>1752 1758<br>1944 2100<br>2208 2466<br>3792 5322<br>5454 5640 | 116 318<br>342 426<br>430 518<br>582 601<br>646 816<br>1758 1764<br>2400 3450<br>3504 3888<br>4020 4932<br>5154 5250<br>5292 5334 | 108 116<br>144 264<br>288 430<br>518 564<br>636 646<br>828 2184<br>3360 3396<br>3912 4032<br>4932 5220<br>5676 5688 | 108 116<br>228 430<br>518 601<br>646 804<br>1644 1680<br>1752 1800<br>1836 3288<br>3660 4080<br>4932 4968<br>5472 | | 264 360<br>1848 2088<br>2112 2160<br>2256 2280<br>3984 3960<br>5136 5016<br>5664 5208 | |
| CP_g2 | 1022 1224<br>1302 1371<br>1495 2261<br>2551 2583<br>2649 2833<br>2925 3192<br>4266 5395<br>5710 5881<br>8164<br>10568<br>11069<br>11560<br>12631<br>12946<br>13954<br>15559<br>16745<br>21494 | 1022 1092<br>1369 1416<br>1446 1495<br>2598 2833<br>2928 3144<br>4410 4800<br>5710 5881<br>6018 6126<br>10568<br>11515<br>12946<br>13954<br>15559<br>16681 | 1022 1495<br>2261 2551<br>2802 2820<br>2833 2922<br>4422 4752<br>4884 5710<br>8164<br>10568<br>11069<br>11560<br>12631<br>12946<br>16745<br>21494 | 601 1022<br>1092 1164<br>1369 1392<br>1452 1495<br>2261 2580<br>2833 3072<br>4320 4452<br>5710 5881<br>6048<br>10568<br>11515<br>12946<br>13954<br>15559<br>16681 | 852 1022<br>1495 2508<br>2551 2604<br>2664 2736<br>2833 3120<br>4248 4512<br>4836 5710<br>5940 6108<br>8164<br>10568<br>11069<br>11560<br>12946<br>13954<br>21494 | | 116 430<br>518 601<br>646 1022<br>1296 1368<br>1369 1495<br>2833 3024<br>4416 4608<br>4776 5710<br>5881 6168<br>7013 8164<br>10568<br>10709<br>11515<br>12946<br>15559<br>24934<br>25879<br>26308<br>26674 | |
| CP_g3 | | 2261 8164 | 13954 | 8164 | 648 4644<br>16745 | | 456 480<br>2261 6072<br>17500 | |

FIG. 47 (PRIOR ART)

| PP1 | PP2 | PP3 | PP4 | PP5 | PP6 | PP7 | PP8 |
|---|---|---|---|---|---|---|---|
| | 10709<br>19930 | | 10709<br>19930 | 12631 | 1008  6120<br>13954 | 116  132<br>180  430<br>518  601<br>646  1022<br>1266  1369<br>1495  2261<br>2490  2551<br>2712  2833<br>3372  3438<br>4086  4098<br>4368  4572<br>4614  4746<br>4830  4968<br>5395  5710<br>5881  7649<br>8164<br>10568<br>11069<br>11560<br>12631<br>12946<br>13954<br>15760<br>16612<br>16745<br>17500<br>19078<br>19930<br>21494<br>22867<br>25879<br>26308 | |

| PP1 | PP2 | PP3 | PP4 | PP5 | PP6 | PP7 | PP8 |
|---|---|---|---|---|---|---|---|
| | | | | | 116 | | |
| | | | | | 408 | | |
| | | | | | 518 | | |
| | | | | | 601 | | |
| | | | | | 646 | | |
| | | | | | 672 | | |
| | | | | | 960 | | |
| | | | | | 1022 | | |
| | | | | | 1272 | | |
| | | | | | 1344 | | |
| | | | | | 1369 | | |
| 1369 | | 1369 | | 1369 | 1495 | | |
| | | | | | 1800 | | |
| | | | | | 2040 | | |
| | | | | 2261 | 2261 | | |
| | | | | | 2833 | | |
| | | | | | 3192 | | |
| | | | | | 3240 | | |
| | | | | | 3768 | | |
| | | | | | 3864 | | |
| | | | | | 3984 | | |
| | | | | | 4104 | | |
| | | | | | 4632 | | |
| | | | | | 4728 | | |
| | | | | | 4944 | | |
| | | | | | 5184 | | |
| | | | | | 5232 | | |
| | | | | | 5256 | | |
| | | 5395 | | 5395 | 5376 | | |
| | | | | | 5592 | | |
| | | | | | 5616 | | |
| | | | | | 5710 | | |
| | | | | | 5808 | | |
| | | 5881 | | 5881 | 5881 | | |
| | | | | | 6360 | | |
| | | 6564 | | 6552 | 6552 | | |
| | | | | | 6792 | | |
| | | | 6612 | 6636 | | | |
| | | 6684 | | 6744 | 6744 | | |
| | 6744 | | | 6900 | 6960 | 6984 | 6720 |
| | | | 6708 | | 7013 | 7013 | 7013 |
| 7013 | 7013 | 7013 | 7013 | 7013 | 7013 | 7032 | 7026 |
| | 7020 | | 7068 | | 7344 | 7056 | 7092 |
| | 7122 | | 7164 | 7296 | 7392 | 7080 | 7320 |
| 7215 | | | 7224 | | 7536 | 7152 | 7512 |
| 7284 | | | 7308 | | 7649 | 7320 | 7536 |
| 7549 | 7649 | 7649 | 7464 | 7464 | 7680 | 7392 | 7596 |
| 7649 | 7674 | 8376 | 7656 | 7649 | 7800 | 7536 | 7704 |
| 7818 | 7752 | 8544 | 7716 | 7668 | 8064 | 7649 | 7746 |
| 8025 | 7764 | 8718 | 7752 | 7956 | 8160 | 7704 | 7758 |
| 8362 | 8154 | 8856 | 7812 | 8124 | 8164 | 7728 | 7818 |
| 8733 | 8190 | 9024 | 7860 | 8244 | 8400 | 8064 | 7986 |
| 8880 | 8922 | 9132 | 8568 | 8808 | 8400 | 8088 | 8160 |
| 9249 | 8856 | 9498 | 8808 | 8904 | 8632 | 8240 | 8528 |
| 9432 | 9504 | 9774 | 9072 | 8940 | 9144 | 9312 | 9054 |
| 9771 | 9702 | 9840 | 9228 | 9216 | 9648 | 9480 | 9852 |
| 10107 | 9882 | 10302 | 9516 | 9780 | 9696 | 9504 | 9924 |
| 10110 | 10032 | 10512 | 9696 | 10224 | 9912 | 9840 | 10146 |
| 10398 | 10092 | 10566 | 9996 | 10332 | 10008 | 9960 | 10254 |
| 10659 | 10266 | 10770 | 10560 | 10709 | 10200 | 10320 | 10428 |
| 10709 | 10302 | 10914 | 10608 | 10776 | 10488 | 10368 | 10704 |
| 10785 | 10494 | 11340 | 10728 | 10944 | 10568 | 10728 | 11418 |
| 10872 | 10530 | 11418 | 11148 | 11100 | 10709 | 10752 | 11436 |
| 11115 | 10716 | 11730 | 11232 | 11292 | 11088 | 11448 | 11496 |
| 11373 | 11016 | 11742 | 11244 | 11364 | 11160 | 11640 | 11550 |
| 11515 | 11076 | 12180 | 11496 | 11496 | 11515 | 11688 | 11766 |
| 11649 | 11160 | 12226 | 11520 | 11532 | 11592 | 11808 | 11862 |
| 11652 | 11286 | 12276 | 11664 | 11904 | 12048 | 12192 | 12006 |
| 12627 | 11436 | 12474 | 11676 | 12228 | 12264 | 12240 | 12132 |
| 12822 | 11586 | 12486 | 11724 | 12372 | 12288 | 12480 | 12216 |
| 12984 | 12382 | 15760 | 11916 | 12816 | 12552 | 12816 | 12486 |
| 15760 | 13002 | 16612 | 17500 | 12946 | 12672 | 16681 | 12762 |
| 16612 | 17500 | 17500 | 18358 | 15760 | 13954 | 22124 | 17500 |
| 17500 | 18358 | 18358 | 19078 | 16612 | 15559 | | 18358 |
| 18358 | 19078 | 19078 | 21284 | 17500 | 16681 | | 20261 |
| 19078 | 19078 | 19930 | 22124 | 19078 | 17500 | | 20422 |
| 19930 | 20422 | 20261 | 24073 | 22867 | 19078 | | 22124 |
| 20261 | 22124 | 20422 | 24934 | 25879 | 20422 | | 23239 |
| 20422 | 22124 | 22124 | 25879 | | 22124 | | 24934 |
| 22867 | 23239 | 22867 | 26308 | | 23239 | | |
| 24934 | 24073 | 23239 | | | 24934 | | |
| 25879 | 24934 | 24934 | | | 25879 | | |
| 26308 | 25879 | 25879 | | | 26308 | | |
| 26674 | 26308 | 26308 | | | | | |
| | | 26674 | | | | | |

| FFT size | PP1 | PP2 | PP3 | PP4 | PP5 | PP6 | PP7 | PP8 |
|---|---|---|---|---|---|---|---|---|
| 8k | None | 6820 6847<br>6869 6898 | 6820 6869 | 6820 6869 | None | N/A | 6820 6833<br>6869 6887<br>6898 | 6820 6833<br>6869 6887<br>6898 |
| 16k | 13636<br>13724<br>13790<br>13879 | 13636<br>13790 | 13636<br>13790 | 13636<br>13790 | 13636<br>13790 | 13636<br>13790 | 13636<br>13724<br>13879 | 13636<br>13724<br>13879 |
| 32k | N/A | 27268<br>27688 | N/A | 27268<br>27688 | N/A | 27268<br>27448<br>27688<br>27758 | 27268<br>27688 | 27268<br>27368<br>27448<br>27580<br>27688<br>27758 |

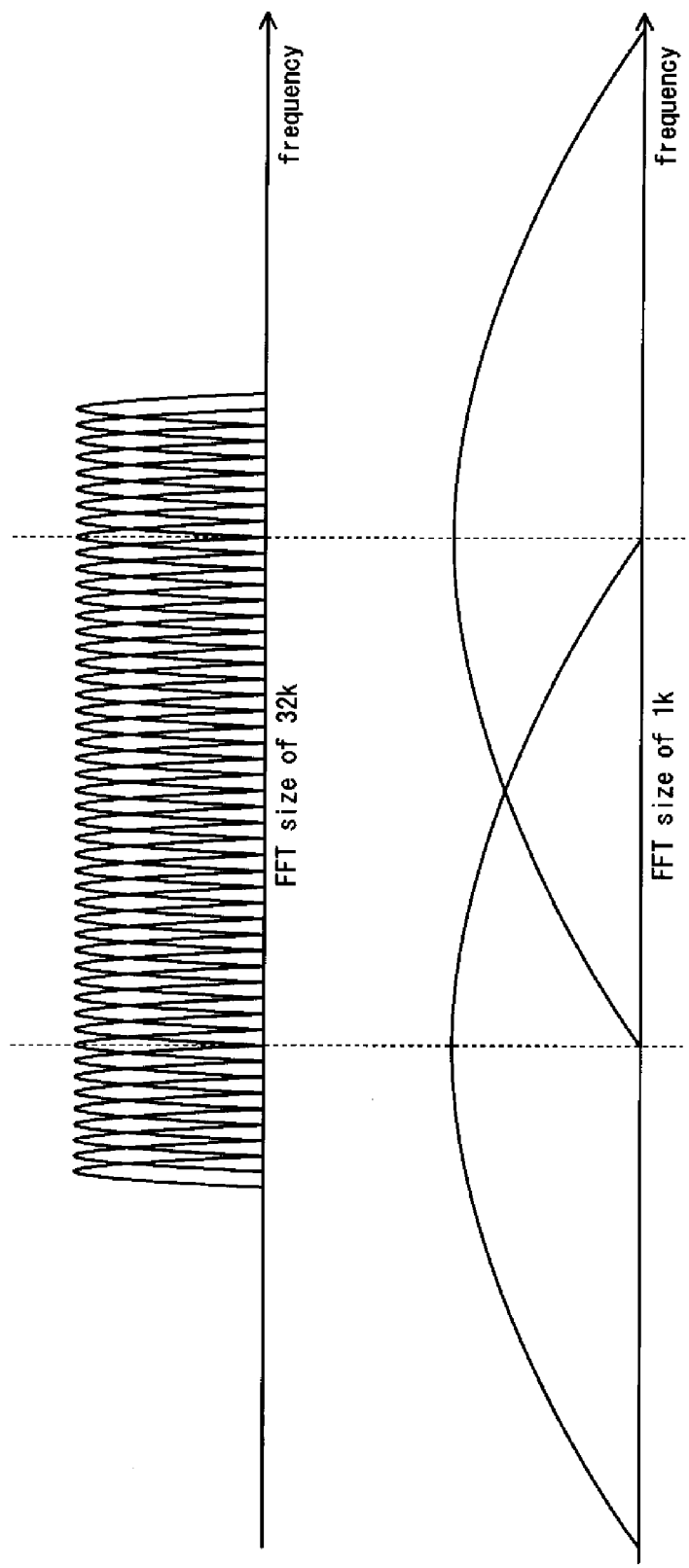

RECEIVER DEVICE, INTEGRATED CIRCUIT, RECEIVING METHOD, AND RECEIVING PROGRAM

BACKGROUND OF INVENTION

1. Technical Field

The present invention relates to technology for receiving multi-carrier modulated signals in which a plurality of sub-carriers have been multiplexed.

2. Background Art

Presently, Orthogonal Frequency Division Multiplexing (OFDM) is a broadcasting scheme widely used for various types of digital transmission, notably including terrestrial digital broadcasting and the IEEE 802.11a standards. The OFDM scheme makes highly efficient use of frequencies by frequency multiplexing a plurality of narrowband digitally-modulated signals using mutually-orthogonal sub-carriers.

Additionally, in the OFDM scheme, the length of one symbol comprises the length of a useful symbol as well as the length of a guard interval. As such, a portion of the useful symbol-length signal is reproduced at length the guard interval to produce intra-symbol periodicity. Thus, the influence of inter-symbol interference caused by multi-pass interference can be reduced given that such a scheme offers superb resistance to such interference.

The terrestrial digital television broadcasting scheme employed in Japan, namely ISDB-T (Integrated Services Digital Broadcasting-Terrestrial) uses the broadcasting format shown in FIG. 30. The terrestrial digital television broadcasting scheme employed in Europe, namely DVB-T (Digital Video Broadcasting-Terrestrial) uses the broadcasting format shown in FIG. 31. In FIGS. 30 and 31, the horizontal axis is the carrier (frequency) direction and the vertical axis is the symbol (time) direction.

As shown in FIGS. 30 and 31, in both ISDB-T and DVB-T, pilot signals are scattered and inserted every 12 sub-carriers along the carrier direction and every four symbols along the symbol direction. These pilot signals are called scattered pilot (hereinafter, SP) signals. SP signals are known to transmitters as well as to receivers and are used by receivers for estimation of channel characteristics.

Further, in DVB-T, pilot signals called continual pilot signals (hereinafter, CP) are present in addition to SP signals. CP signals are pilot signals inserted into every symbol of specific sub-carriers and are used for such purposes as CPE (Common Phase Error) elimination. CP signals are also known to transmitters and receivers alike. The positions of the sub-carriers into which CP signals are inserted (hereinafter referred to as CP carriers) are shown for 8 k mode in FIG. 32. It should be noted that the values given in FIG. 32 show the carrier indices of the CP carriers when the carrier index of the useful sub-carrier with the lowest carrier frequency is zero. In ISDB-T, CP signals are inserted into only one sub-carrier.

Carrier frequency synchronisation is necessary to OFDM signal reception. Generally speaking, carrier frequency synchronisation is divided into (i) narrowband carrier frequency synchronisation used for detection and correction of discrepancies within the transmitted sub-carrier spacing (narrowband carrier frequency discrepancies) and (ii) wideband carrier frequency synchronisation used for detection and correction of discrepancies at the unit level of the sub-carrier spacing (wideband carrier frequency discrepancies).

The greater the narrowband carrier frequency discrepancies, the greater the data errors become. Also, the presence of wideband carrier frequency discrepancies causes discrepancies in sub-carrier positions. As such, signal processing is carried out using a different sub-carrier and demodulation cannot be accomplished. This presents difficulties for steady reception.

For these reasons, conventional technology has been proposed for wideband carrier frequency synchronisation. For example, Patent Literature 1 discloses an OFDM signal demodulator that performs wideband carrier frequency synchronisation through correlation of the location of CP signals included in the DVB-T transmission format. The configuration of the OFDM signal demodulator disclosed in Patent Literature 1 is shown in FIG. 33.

In the receiver, the frequency of an OFDM signal input from a channel to the OFDM signal demodulator is converted by the tuner 1001 from the RF (Radio Frequency) band to the IF (Intermediate Frequency) band. The quadrature demodulation circuit 1002 uses a fixed frequency to perform quadrature demodulation on IF band OFDM signals and then outputs baseband OFDM signals so obtained to the $f_c$ correction circuit 1003.

The $f_c$ correction circuit 1003 generates a corrected carrier frequency according to the narrowband carrier frequency error input from the narrowband $f_c$ error calculation circuit 1004 as well the wideband carrier frequency error input from the wideband $f_c$ error calculation circuit 1008, and then applies corrections to carrier frequency discrepancies in the baseband OFDM signals according to the corrected carrier frequency so generated.

The baseband OFDM signals in which carrier frequencies have been corrected are supplied to the narrowband $f_c$ error calculation circuit 1004 and to the FFT circuit 1005. The narrowband $f_c$ error calculation circuit 1004 correlates the guard interval-length signal and the end portion of the useful symbol length-signal within the baseband OFDM signals to calculate the carrier frequency error within the sub-carrier spacing (narrowband carrier frequency error), and then outputs the carrier frequency error so calculated to the $f_c$ correction circuit 1003. The FFT circuit 1005 performs a Fast Fourier Transform (FFT) on the useful signal-length portion of the baseband OFDM signals, thus converting same into frequency-domain signals.

The differential detection circuit 1006 calculates inter-symbol phase fluctuations through inter-symbol differential detection on each of the sub-carrier signals in the frequency-domain signals input from the FFT circuit 1005, and then outputs the signals so calculated (hereinafter called differential detection signals) to the correlation circuit 1007 and the phase averaging circuit 1009. The correlation circuit 1007 correlates the differential detection signals from the differential detection circuit 1006 and the location sequence signal of the sub-carriers that transmit the CP signals, then outputs the correlated values to the wideband $f_c$ error calculation circuit 1008.

The wideband $f_c$ error calculation circuit 1008 detects peak positions in the correlated values input from the correlation circuit 1007, calculates the carrier frequency error at the unit level of the sub-carrier spacing (wideband carrier frequency error) from the peak positions so detected, and then outputs the carrier frequency error so calculated to the $f_c$ correction circuit 1003.

The phase averaging circuit 1009 performs intra-symbol averaging of the phases evidenced in the differential detection signals from the differential detection circuit 1006 corresponding to the CP signals, estimates the CPE, then outputs the CPE so estimated to the phase fluctuation correction circuit 1010. The phase fluctuation correction circuit 1010 applies corrections (CPE elimination) to phase fluctuations in the signals output from the FFT circuit 1005 according to the CPE input from the phase averaging circuit 1009, and then outputs signals in which CPE has been eliminated. The detection circuit 1011 detects the signals output from the phase fluctuation correction circuit 1010.

The differential detection circuit 1006 is explained with reference to FIG. 34. In the differential detection circuit 1006, the delay circuit 1031 delays and outputs the signals output from the FFT circuit 1005 by one symbol. The conjugation circuit 1032 calculates and outputs the complex conjugate of the signals output from the delay circuit 1031. The complex multiplier 1033 multiplies the signals output from the FFT circuit 1005 by the signals output from the conjugation circuit 1032, then outputs the complex signals (differential detection signals) so obtained to the correlation circuit 1007 and to the phase averaging circuit 1009.

Next, the correlation circuit 1007 is further explained with reference to FIG. 35. The differential detection signals output from the differential detection circuit 1006 are input to the shift register 1051. The shift register 1051 comprises a plurality of tap outputs corresponding to the positions of the sub-carriers that transmit the CP signals, the output of which is input to the summation circuit 1052. The summation circuit 1052 calculates the sum of the tap outputs of the shift register 1051. The power calculation circuit 1053 calculates the power value of the sum of the tap outputs, then outputs the power value so calculated to the wideband $f_c$ error calculation circuit 1008 as the correlated value.

The differential detection signals output from the differential detection circuit 1006 have the same value for every CP carrier position and arbitrary values for non-CP carrier positions. As such, if all the tap outputs of the shift register 1051 are CP carrier positions, then the correlated value output by the correlation circuit 1007 is maximized. The wideband $f_c$ error calculation circuit 1008 is able to detect the carrier frequency error at the sub-carrier unit level (wideband carrier frequency error) from the timing at which the correlated value output from the correlation circuit 1007 is so maximized.

Analogue television broadcasts are being phased out in many countries and frequency reconfiguration is being carried out worldwide. In Europe, demand is growing for high definition (HD) service in addition to DVB-T standard definition (SD) broadcasting. Thus the second generation European digital terrestrial television broadcasting system, DVB-T2, has been advanced. As shown in FIG. 36, frames in DVB-T2 include P1 symbols, P2 symbols, and data symbols.

P1 symbols have an FFT size of 1 k and, as shown in FIG. 37, a guard interval before and after the useful symbol length. Unlike the guard intervals previously used in ISDB-T and DVB-T, these guard intervals reproduce the leading half of the useful symbol length before the useful symbol itself, and repeat the ending half of the useful symbol length afterward. Such reproduction is created by shifting a source signal by a predetermined frequency $f_{sh}$ and inserting the signal so obtained into the guard interval portions. Additionally, as shown in FIG. 38, P1 symbols are made up of active carriers and of null (unused) carriers.

P1 symbols include information indicating whether the P2 symbols and the data symbols use MISO (Multiple-Input Single-Output) mode or SISO (Single-Input Single-Output) mode (hereinafter referred to as SISO/MISO information), information indicating the FFT size of the P2 symbols and data symbols (hereinafter referred to as FFT size information), information indicating whether or not FEF (Future Extension Frames) are included (hereinafter referred to as FEF information) and the like.

The P2 symbols and data symbols share a common FFT size and guard interval fraction. The guard interval fraction is the ratio of the guard interval length to the useful symbol length. The combinations of FFT size and guard interval fraction used in DVB-T2 are shown in FIG. 39 together with the permitted pilot patterns for each such combination. There are eight pilot patterns, namely PP1 through PP8. In FIG. 39, "N/A" is used to indicate that no pilot patterns are permitted for a given combination of FFT size and guard interval fraction.

Pilot signals are inserted into the P2 symbols at equal intervals. Such pilot signals are hereinafter referred to as P2 pilot signals. P2 pilot signals are inserted every six sub-carriers when an FFT size of 32 k and SISO mode are used, and are inserted every three sub-carriers otherwise.

P2 symbols include information indicating the pilot pattern for the data symbols (hereinafter referred to as pilot pattern information), information indicating whether the carrier mode is extended or normal (hereinafter referred to as carrier mode information), the number of symbols per frame, the modulation scheme, the encoding ratio of forward error correction (FEC) codes, and other such information and transmission parameters necessary for reception. The number of P2 symbols per frame depends on the FFT size as shown in FIG. 40.

In DVB-T2, extended mode is defined so as to have an extended number of useful sub-carriers. FIG. 41 shows the sub-carrier positions in the two carrier modes, namely normal mode and extended mode. Normal mode uses, as useful sub-carriers, a first range of sub-carriers which consists of the middle portion of all sub-carriers to the exclusion of a plurality of sub-carriers with the highest frequencies as well as a plurality of sub-carriers with the lowest frequencies. Extended mode uses, as useful sub-carriers, a second range of sub-carriers which includes the first range as well as a predetermined number of sub-carriers with the highest and lowest frequencies. That is, extended mode extends beyond normal mode at the left and right ends thereof. FFT sizes of 8 k, 16 k, and 32 k can be selected in extended mode, and P2 symbols and data symbols are applicable thereto.

The number of useful sub-carriers in the two modes for each FFT size is shown in FIG. 42. The number of useful sub-carriers is greater in extended mode than in normal mode and as such, more information can be transmitted through the use thereof. In FIG. 42, "N/A" is used to indicate that a given FFT size cannot be used in extended mode. Also, given that extended mode cannot be used with FFT sizes of 1 k, 2 k, and 4 k, the value of Δf, which indicates half the difference in the number of useful sub-carriers, cannot be calculated and is replaced with a dash (-).

Much like in DVB-T and in ISDB-T, SP signals are inserted into the data symbols, as are CP signals for predetermined sub-carriers. However, in DVB-T2, the location pattern of these SP signals and CP signals is determined according to the pilot pattern in use.

(Math. 1) gives the SP signal location for each of the pilot patterns PP1 through PP8 in normal mode.

$$k \bmod (D_x D_y) = D_x (l \bmod D_y) \quad \text{(Math. 1)}$$

(Math. 2) gives the SP signal location for each of the pilot patterns PP1 through PP8 in extended mode.

$$(k - K_{ext}) \bmod (D_x D_y) = D_x (l \bmod D_y) \quad \text{(Math. 2)}$$

In both (Math. 1) and (Math. 2), mod is the modulo operator, k is the useful sub-carrier number, and l is the symbol number. $K_{ext}$ is the value of half the difference in the number of useful sub-carriers between normal mode and extended mode (Δf in FIG. 42). Furthermore, as shown in FIG. 43, $D_x$ is the sub-carrier interval between the positions of any two sub-carriers having SP signals and $D_y$ is the symbol interval between SP signals within a single sub-carrier. In FIG. 43, the horizontal axis is the carrier (frequency) direction and the vertical axis is the symbol (time) direction.

The values of $D_x$ and $D_y$ for each pilot pattern PP1 through PP8 are given in FIG. 44.

Within a given symbol, the sub-carrier interval between the sub-carrier positions of SP signals is $D_xD_y$, as given in FIG. 44. The SP signal location pattern previously shown for DVB-T and ISDB-T corresponds to PP1 as given by FIG. 44.

FIG. 45 and FIGS. 46 through 49 show the CP signal location patterns corresponding to the pilot patterns PP1 through PP8. FIG. 45 shows the groups CP_g1 through CP_g6 used by FFT size. If two or more groups (CP_g1 through CP_g6) are indicated, then all such groups are used at once. FIGS. 46 through 49 show the values that belong to the groups CP_g1 through CP_g6 and that correspond to the pilot patterns PP1 through PP8.

Let K be the value indicated in FIGS. 46 through 49 and let N be the value indicated in FIG. 45. The value of KmodN is then a useful sub-carrier number of a CP signal. Here, mod is the modulo operator. It should be noted that for an FFT size of 32 k, the useful sub-carrier numbers of CP signals are the values indicated in FIGS. 46 through 49 with no modulo operation performed therewith. In FIG. 45, N values corresponding to the FFT size of 32 k are given as a dash for this reason.

In normal mode, the values obtainable from FIG. 45 and FIGS. 46 through 49 are the useful sub-carrier numbers. In extended mode, the values indicated in FIG. 50 are additional useful sub-carrier numbers of CP signals that supplement the useful sub-carrier numbers obtainable from FIG. 45 and FIGS. 46 through 49. No modulo operation is necessary for the values in FIG. 50. In FIG. 50, "N/A" is used to indicate that a given combination of FFT size and guard interval fraction is not permitted. Furthermore, "None" is used to indicate the absence of additional sub-carriers with CP signals.

In normal mode, the useful sub-carrier numbers for SP signals and CP signals are given as follows: the useful sub-carrier with the lowest frequency is used for reference and the number thereof is set to zero. The useful sub-carrier numbers are set so as to increase along with increasing frequency. In extended mode, the effective carrier numbers for SP signals and CP signals are given as follows: the useful sub-carrier with the lowest frequency is used for reference and the number thereof set to zero. The useful sub-carrier numbers are set so as to increase along with increasing frequency.

As shown in Non-Patent Literature 1, there exists a method for realising wideband carrier frequency synchronisation using P1 symbols in receiver technology for the DVB-T2 transmission format as described above. The configuration of such a receiver is shown in FIG. 51.

In the receiver, the frequency of OFDM signals input thereto from channels is converted by the tuner 2001 from the RF band to the IF band. The quadrature demodulator 2002 uses a fixed frequency to perform quadrature demodulation on the IF band OFDM signals and then outputs the baseband OFDM signals so obtained to the $f_c$ corrector 2003.

The $f_c$ corrector 2003 generates a corrected carrier frequency according to the narrowband carrier frequency error input from the narrowband $f_c$ error calculator 2005 as well the wideband carrier frequency error and the narrowband carrier frequency error input from the P1 demodulator 2004, and then applies corrections to carrier frequency discrepancies in the baseband OFDM signals according to the corrected carrier frequency so generated.

The baseband OFDM signals in which carrier frequency discrepancies have been corrected are supplied to the P1 demodulator 2004, to the narrowband $f_c$ error calculator 2005, and to the FFT unit 2006.

The P1 demodulator 2004 detects P1 symbols that are included in the DVB-T2 transmission format in the baseband OFDM signals input from the $f_c$ corrector 2003. The P1 demodulator 2004 detects the wideband carrier frequency error and the narrowband carrier frequency error for the P1 symbols and applies corrections to carrier frequency discrepancies therein, then outputs the wideband carrier frequency error and the narrowband carrier frequency error so detected to the $f_c$ corrector 2003. Additionally, the P1 demodulator 2004 decodes the P1 symbols and outputs the control information obtained as a result thereof to the control information collector 2010.

The narrowband $f_c$ error calculator 2005 uses correlation (guard correlation) between the guard interval-length signal and the end portion of the useful symbol length-signal of the P2 symbols or data symbols to calculate the carrier frequency error within the sub-carrier spacing (narrowband carrier frequency error) for each such symbol, and then outputs the narrowband carrier frequency error so calculated to the $f_c$ corrector 2003.

The FFT unit 2006 performs Fast Fourier Transforms on the time-domain baseband OFDM signals input from the $f_c$ corrector 2003 then outputs the resulting frequency-domain baseband OFDM signals to the channel characteristics estimator 2007 and to the equaliser 2008. The channel characteristics estimator 2007 estimates the channel characteristics, i.e. the amplitude and phase displacement, of the channel through which the frequency-domain baseband OFDM signals input from the FFT unit 2006 were received, then outputs the channel characteristics so estimated to the equaliser 2008. The equaliser 2008 uses the channel characteristics estimated by the channel characteristics estimator 2007 to correct the amplitude and phase displacement of the frequency-domain baseband OFDM signals input from the FFT unit 2006, then outputs the signals so corrected to the error corrector 2009.

The error corrector 2009 corrects errors in the signals input from the equaliser 2009 and outputs transmission parameters and other such control information transmitted in the P2 symbols to the control information collector 2010.

The control information collector 2010 classifies the control information collected from the P1 demodulator 2004 and from the error corrector 2009 into transmission parameters.

The P1 demodulator 2004 is explained with reference to FIG. 52. The baseband OFDM signals output from the $f_c$ corrector 2003 are input to the P1 position detector 2101 within the P1 demodulator 2004.

The P1 position detector 2101 calculates the correlation (guard correlation) between the guard interval-length signal and predetermined portions of the useful symbol-length signal of the P1 symbols for the baseband OFDM signals input from the $f_c$ corrector 2003 and detects the positions of P1 symbols from the peak value of integrals taken over the guard interval. This correlation calculation is carried out with the frequency shift $f_{sh}$ added by the transmitter taken into consideration. Furthermore, the predetermined portions are the leading portion of the useful symbol for the guard interval that precedes the useful symbol and the closing portion of the useful symbol for the guard interval that follows the useful symbol.

The P1 narrowband $f_c$ error detector and corrector 2102 (hereinafter referred to as P1 NAFC) detects the carrier frequency error within the P1 symbol sub-carrier spacing (narrowband carrier frequency error) from the guard correlation between the guard interval-length signals of P1 symbols and predetermined portions of the useful symbol-length signals based on the P1 symbol positions detected by the P1 position detector 2101, and also applies corrections to narrowband carrier frequency discrepancies for the P1 symbols according to the narrowband carrier frequency error so detected. The P1 NAFC 2102 outputs the P1 symbol narrowband carrier frequency error so detected to the $f_c$ corrector 2003 and outputs the P1 symbols in which narrowband carrier frequencies have been corrected to the FFT unit 2103.

The FFT unit 2103 performs FFTs on the P1 symbol time-domain baseband OFDM signals input from the P1 NAFC 2102 and outputs a P1 symbol frequency-domain baseband OFDM signal to the P1 wideband $f_c$ error detector and corrector 2104 (hereinafter referred to as P1 WAFC).

The P1 WAFC 2104 detects the carrier frequency error at the unit level of the P1 symbol carrier spacing (wideband carrier frequency error) and also applies corrections to wideband carrier frequency discrepancies for the P1 symbols according to the wideband carrier frequency error so detected. The P1 WAFC 2104 outputs the P1 symbol wideband carrier frequency error so detected to the $f_c$ corrector 2003 and outputs the P1 symbols in which wideband carrier frequencies have been corrected to the P1 decoder 2105.

The P1 decoder 2105 decodes the P1 symbols input from the P1 WAFC 2104 and extracts FFT size information, MISO/SISO information and the like therefrom.

The detection of the P1 symbol wideband carrier frequency error is explained below.

As described above, P1 symbols contain active carriers and null carriers. These are used to calculate the power of each sub-carrier signal as well as to correlate the results of such calculations with a known location sequence of active carriers. Given that active carriers are modulated using BPSK, correlation with a shift when the wideband carrier frequency error is zero gives the sum of all active carriers and thus results in a larger value in comparison to correlated values using other shifts which incorporate null carriers. Therefore, the shift obtained from the largest correlated value is the wideband carrier frequency error, which in turn makes detection thereof possible.

CITATION LIST

Patent Literature

[Patent Literature 1]
Japanese Unexamined Patent Application Publication No. H11-112460

Non-Patent Literature

[Non-Patent Literature 1]
DVB Bluebook Document A133; Implementation guidelines for a second generation digital terrestrial television broadcasting system (DVB-T2)

SUMMARY OF INVENTION

However, the following problems arise when using only P1 symbols for wideband carrier frequency error detection. P1 symbols have a set FFT size of 1 k, yet P2 symbols and data symbols may have an FFT size ranging from 1 k to 32 k. For example, if the FFT size is large, i.e. 32 k, then as shown in FIG. 53, the sub-carrier spacing for P2 symbols and data symbols will be $\frac{1}{32}$ that of the P1 symbols. In a degraded reception environment, residual error arises in narrowband carrier frequency error detection using P1 symbols. For instance, in an environment for which C/N=5 dB, the residual error will be greater than $\frac{1}{32}$ of the P1 symbol sub-carrier spacing. In such a case, with reference to the P1 symbols, the wideband carrier frequency error of the P1 symbol sub-carrier spacing is zero, and the narrowband carrier frequency error is $\frac{1}{32}$. On the other hand, with reference to the P2 symbols and data symbols, residual wideband carrier frequency error exists at the sub-carrier unit level of such symbols, and thus there is a need to apply corrections to carrier frequency discrepancies based on the wideband carrier frequency error thereof. Such an error component cannot be fully corrected through corrections applied to carrier frequency discrepancies based on the narrowband carrier frequency error for P2 symbols and data symbols alone. Without error correction, reception cannot occur correctly.

However, in realizing wideband carrier frequency error detection with P2 symbols and data symbols, the pilot pattern and carrier mode (extended mode or normal mode) is unclear until P2 symbols are decoded. Thus, a problem arises in that the signals used for wideband carrier frequency error detection cannot be uniquely determined. Furthermore, as channel characteristics estimation and equalisation processing are realized after P2 symbol decoding and the extraction of pilot pattern and carrier mode information, there is a need to decode P2 symbols in order for these processes to occur, and so the time required for channel selection is lengthened.

In light of the above, the present invention provides a receiving device, an integrated circuit, a receiving method, and a receiving program with the aim of applying corrections to wideband carrier frequency discrepancies to multi-carrier modulated signals without extracting location pattern information for predetermined signals therein and so to make possible stable reception in a degraded environment.

In order to solve the above problems, a receiving device receiving multi-carrier modulated signals in which predetermined signals continuously arranged at a plurality of symbols along a symbol direction are arranged at a plurality of sub-carrier positions determined according to one among a plurality of location patterns which determine the sub-carrier positions in which the predetermined signals are arranged comprises: an orthogonal transformer operable to separate and output the multi-carrier modulated signals into a plurality of sub-carriers by orthogonal transformation; a wideband carrier frequency error calculator operable, for each of the location patterns, to (i) calculate a cumulative value by performing predetermined processing on signals output from the orthogonal transformer at the sub-carrier positions determined by the location pattern while simultaneously shifting the signals output by the orthogonal transformer by one sub-carrier unit along the carrier direction, and (ii) calculate a wideband carrier frequency error according to carrier direction discrepancies calculated as maximum values within the cumulative value; and a carrier frequency error corrector operable to apply corrections to carrier frequency discrepancies according to the wideband carrier frequency error so calculated.

According to the above-described receiving device, when receiving multi-carrier modulated signals transmitted using one among a plurality of location patterns which determine the plurality of sub-carrier positions in which the predetermined signals are arranged, even if the location pattern actually in use is unclear, the wideband carrier frequency error can be detected and carrier frequency discrepancies can be cor-

BRIEF DESCRIPTION OF FIGURES

FIG. 9 is a diagram showing the status of frame-closing symbols for each combination of FFT size, guard interval fraction, and pilot pattern.

FIG. 13 is a diagram showing the PN sequence.

FIG. 29 is a diagram showing the sub-carrier positions of TMCC signals in ISDB-T (Mode 3, synchronous modulation).

FIG. 32 is a diagram showing the CP carrier positions in the DVB-T transmission format (for an FFT size of 8 k).

FIG. 39 is a diagram showing the permitted combinations of FFT size, guard interval fraction, and pilot pattern under DVB-T2.

FIG. 42 is a diagram showing the number of useful sub-carriers in the two carrier modes, namely normal mode and extended mode.

FIG. 45 is a diagram showing the CP groups and modulo arithmetic values used by FFT size.

FIG. 46 is a diagram showing the values of the CP groups CP_g, CP_g2, and CP_g3 by pilot pattern.

FIG. 47 is a diagram showing the values of the CP group CP_g4 by pilot pattern.

FIG. 48 is a diagram showing the values of the CP group CP_g5 by pilot pattern.

FIG. 49 is a diagram showing the values of the CP group CP_g6 by pilot pattern.

FIG. 50 is a diagram showing the values of the useful sub-carrier numbers of the CP signals added in extended mode.

FIG. 53 is a schematic diagram for comparing sub-carriers with an FFT size of 1 k to sub-carriers with an FFT size of 32 k.

DETAILED DESCRIPTION OF INVENTION

Figure 1:
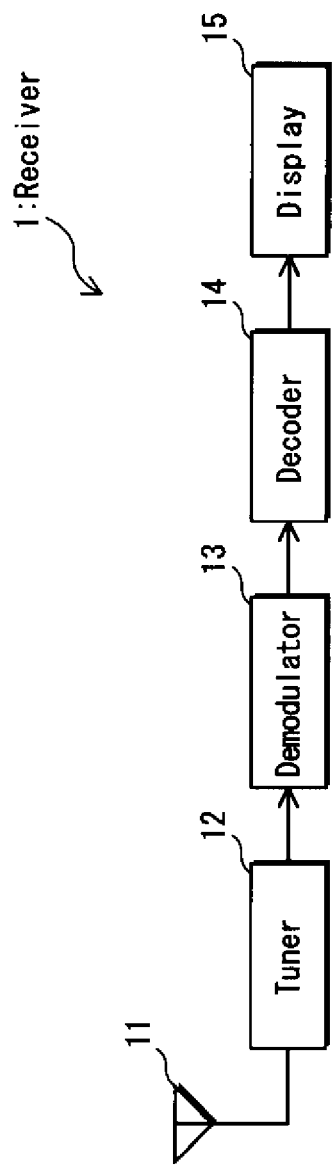
FIG. 1 is a configuration diagram of the receiver pertaining to Embodiment 1.

As an Embodiment of the present invention, a first receiver is a receiving device receiving multi-carrier modulated signals in which predetermined signals continuously arranged at a plurality of symbols along a symbol direction are arranged at a plurality of sub-carrier positions determined according to one among a plurality of location patterns which determine the sub-carrier positions in which the predetermined signals are arranged, wherein the receiving device comprises: an orthogonal transformer operable to separate and output the multi-carrier modulated signals into a plurality of sub-carriers by orthogonal transformation; a wideband carrier frequency error calculator operable, for each of the location patterns, to (i) calculate a cumulative value by performing predetermined processing on signals output from the orthogonal transformer at the sub-carrier positions determined by the location pattern while simultaneously shifting the signals output by the orthogonal transformer by one sub-carrier unit along the carrier direction, and (ii) calculate a wideband carrier frequency error according to carrier direction discrepancies calculated as maximum values within the cumulative value; and a carrier frequency error corrector operable to apply corrections to carrier frequency discrepancies according to the wideband carrier frequency error so calculated.

As an Embodiment of the present invention, an integrated circuit is an integrated circuit receiving multi-carrier modulated signals in which predetermined signals continuously arranged at a plurality of symbols along a symbol direction are arranged at a plurality of sub-carrier positions determined according to one among a plurality of location patterns which determine the sub-carrier positions in which the predetermined signals are arranged, wherein the integrated circuit comprises: an orthogonal transformation circuit operable to separate and output the multi-carrier modulated signals into a plurality of sub-carriers by orthogonal transformation; a wideband carrier frequency error calculation circuit operable, for each of the location patterns, to (i) calculate a cumulative value by performing predetermined processing on signals output from the orthogonal transformer at the sub-carrier positions determined by the location pattern while simultaneously shifting the signals output by the orthogonal transformer by one sub-carrier unit along the carrier direction, and (ii) calculate a wideband carrier frequency error according to carrier direction discrepancies calculated as maximum values within the cumulative value; and a carrier frequency error correction circuit operable to apply corrections to carrier frequency discrepancies according to the wideband carrier frequency error so calculated.

As an Embodiment of the present invention, a reception method is a receiving method for a receiving device receiving multi-carrier modulated signals in which predetermined signals continuously arranged at a plurality of symbols along a symbol direction are arranged at a plurality of sub-carrier positions determined according to one among a plurality of location patterns which determine the sub-carrier positions in which the predetermined signals are arranged, wherein the receiving method comprises: an orthogonal transformation step for separating and outputting the multi-carrier modulated signals into a plurality of sub-carriers by orthogonal transformation; a wideband carrier frequency error calculation step for each of the location patterns for (i) calculating a cumulative value by performing predetermined processing on signals output from the orthogonal transformer at the sub-carrier positions determined by the location pattern while simultaneously shifting the signals output by the orthogonal transformer by one sub-carrier unit along the carrier direction, and (ii) calculating a wideband carrier frequency error according to carrier direction discrepancies calculated as maximum values within the cumulative value; and a carrier frequency error correction step for applying corrections to carrier frequency discrepancies according to the wideband carrier frequency error so calculated.

As an Embodiment of the present invention, a reception program is a receiving program for controlling a receiving device receiving multi-carrier modulated signals in which predetermined signals continuously arranged at a plurality of symbols along a symbol direction are arranged at a plurality of sub-carrier positions determined according to one among a plurality of location patterns which determine the sub-carrier positions in which the predetermined signals are arranged, wherein the receiving device comprises: an orthogonal transformation step for separating and outputting the multi-carrier modulated signals into a plurality of sub-carriers by orthogonal transformation; a wideband carrier frequency error calculation step for each of the location patterns for (i) calculating a cumulative value by performing predetermined processing on signals output from the orthogonal transformer at the sub-carrier positions determined by the location pattern while simultaneously shifting the signals output by the orthogonal transformer by one sub-carrier unit along the carrier direction, and (ii) calculating a wideband carrier frequency error according to carrier direction discrepancies calculated as maximum values within the cumulative value; and a carrier frequency error correction step for applying corrections to carrier frequency discrepancies according to the wideband carrier frequency error so calculated.

According to each of the above, when a transmitted multi-carrier modulated signal is received which uses one of a plurality of location patterns that defines the positions of a plurality of sub-carriers at which predetermined signals are arranged, the wideband carrier frequency error can be detected and corrections to carrier frequency discrepancies can be realized even if the location pattern actually received is in uncertain condition. This enables stable reception in a degraded reception environment.

As one mode of the present invention, a second receiver is like the first receiver modified in that the multi-carrier modulated signals further include a preamble symbol, and the receiving device further comprises: a preamble carrier frequency error estimator operable to estimate a carrier frequency error using the preamble symbol; and a first carrier frequency error corrector operable to apply corrections to carrier frequency discrepancies using the carrier frequency error estimated using the preamble symbol before the wideband carrier frequency error is calculated by the wideband carrier frequency error calculator.

According to the above, the detection range for the wideband carrier frequency error detected by the wideband carrier frequency error calculator can be narrowed by using preamble symbols for estimation of the carrier frequency error and through pre-emptive application of corrections to carrier frequency discrepancies, which in turn enhances the accuracy of wideband carrier frequency error detection and of corrections to carrier frequency discrepancies. Alternatively, should the detection range for wideband carrier frequency error detected by the wideband carrier frequency error calculator be narrow, the detection range for carrier frequency discrepancies in the receiver as a whole can be widened by using preamble symbols for estimation of the carrier frequency error and through application of corrections to carrier frequency discrepancies. Thus, stable reception is made possible even when great carrier frequency error is present.

As one mode of the present invention, a third receiver is like the first receiver modified in that the multi-carrier modulated signals further include a preamble symbol that includes control information, and the receiving device further comprises: a preamble demodulator operable to demodulate the preamble symbol and extract the control information therefrom; a guard interval estimator operable to estimate guard interval-related information attached to each of the symbols other than the preamble symbol; and a control information collector operable to select location pattern candidates that may be in use by the multi-carrier modulated signals from among the plurality of location patterns according to the control information and to the guard interval-related information; and the wideband carrier frequency error calculator calculates the cumulative value only for the location pattern candidates.

According to the above, control information included in the preamble symbol and information pertaining to the guard interval is used, location pattern candidates that may actually be in use for the transmission are constricted from among the plurality of location patterns, and the wideband carrier frequency error calculator performs cumulative processing on the location pattern candidates only. Thus, not only are fewer resources needed for this cumulative processing, but erroneous wideband carrier frequency error calculation through a non-candidate location pattern can also be prevented, and the accuracy of wideband carrier frequency error calculation can be enhanced.

As one mode of the present invention, a fourth receiver is like the first receiver modified in that the multi-carrier modulated signals further include a preamble symbol that includes control information, and the receiving device further comprises: a preamble demodulator operable to demodulate the preamble symbol and extract the control information therefrom; a guard interval estimator operable to estimate guard interval-related information attached to each of the symbols other than the preamble symbol; a control information collector operable to select location pattern candidates that may be in use by the multi-carrier modulated signals from among the plurality of location patterns according to the control information and to the guard interval-related information; and the wideband carrier frequency error calculator calculates a wideband carrier frequency error according to carrier direction discrepancies calculated as maximum values in the cumulative values calculated for the location pattern candidates.

According to the above, control information included in the preamble symbol and information pertaining to the guard interval is used, location pattern candidates that may actually be in use for the transmission are constricted from among the plurality of location patterns, and the wideband carrier frequency error calculator calculates the wideband carrier frequency error based on carrier direction discrepancies calculated for the greatest cumulative value among the values calculated for the location pattern candidates. Thus, erroneous wideband carrier frequency error calculation through a non-candidate location pattern can be prevented, and the accuracy of wideband carrier frequency error calculation can be enhanced.

As one mode of the present invention, a fifth receiver is like the first receiver modified in that the multi-carrier modulated signals are transmitted using one of the following modes (i) and (ii): (i) a normal mode in which sub-carriers within a first range are useful sub-carriers, the first range being a middle portion of all sub-carriers to the exclusion of a plurality of high-frequency subcarriers and of a plurality of low-frequency sub-carriers; and (ii) an extended mode in which sub-carriers within a second range are useful sub-carriers, the second range being the first range extended by a set number of high-frequency sub-carriers and of low-frequency sub-carriers; the location patterns are determined with reference to the sub-carrier position of the lowest frequency among the useful sub-carriers; and the wideband carrier frequency error calculator calculates the cumulative value for location patterns in normal mode as well as for location patterns in extended mode According to the above, the wideband carrier frequency calculator cumulatively calculates wideband carrier frequency error in each of two modes, namely normal mode and extended mode. Thus, wideband carrier frequency error can be detected and corrections can be applied to carrier frequency discrepancies even when the identity of the current mode is unclear. In turn, stable reception is made possible even in a degraded reception environment.

As one mode of the present invention, a sixth receiver is like the first receiver modified in that the wideband carrier frequency error calculator comprises: a differential detector operable to differentially detect and output, for every sub-carrier, signals output from the orthogonal transformer and signals output from the orthogonal transformer one symbol prior; a correlator operable, for each of the location patterns, to shift signals output by the differential detector by one sub-carrier unit along the carrier direction and to simultaneously calculate a correlation between (i) a location sequence signal in which sub-carrier positions determined by the location pattern are set to one and all other sub-carrier positions are set to zero, and (ii) a signal output by the differential detector and output the result; and a maximum value detector operable to calculate the wideband carrier frequency error by detecting maximum values within correlation values calculated by the correlator.

According to the above, by interpolating the output signal from the differential detector and the location sequence signal, the correlated value of the location pattern actually used for the transmission and positions shifted in the carrier direction corresponding to carrier frequency error arising between receivers is a larger value than that obtained through summation of the differential detection values for the sub-carriers located in all the predetermined signals. Thus, the accuracy of wideband carrier frequency error detection can be enhanced.

As one mode of the present invention, a seventh receiver is like the sixth receiver modified in that the multi-carrier modulated signals include symbols in which the predetermined signals are not included; and the correlator does not calculate a correlation when at least one of the two symbols used by the differential detector is a symbol in which the predetermined signals are not included.

According to the above, when at least one of the two symbols used for differential detection by the differential detector is a symbol in which predetermined signals are not arranged, erroneous wideband carrier frequency error-based corrections to carrier frequency discrepancies arising from such symbols can be avoided by not performing interpolation therewith.

As one mode of the present invention, an eighth receiver is like the sixth receiver modified in that the multi-carrier modulated signals include symbols in which the predetermined signals are not included; predetermined first signals that differ from the predetermined signals are arranged in a plurality of sub-carriers and included at the symbols in which the predetermined signals are not included; and the correlator is further operable, when at least one of the two symbols used by the differential detector is one of the symbols in which the predetermined signals are not included, to calculate a correlation between (i) for each of the location patterns, a location sequence signal in which sub-carrier positions where the predetermined signals are arranged therein when the location pattern is used and where the predetermined first signals are arranged at symbols in which the predetermined signals are not arranged are set to one, while all other sub-carrier positions are set to zero, and (ii) signals output by the differential detector.

According to the above, even when at least one of the two symbols used for differential detection by the differential detector is a symbol in which predetermined signals are not arranged, the number of symbols for which corrections to carrier frequency discrepancies are realised based on the wideband carrier frequency error can be increased through the use of a predetermined signal and a first signal. Thus, the accuracy of corrections to carrier frequency discrepancies and the time tracking of such corrections can be improved.

As one mode of the present invention, a ninth receiver is like the sixth receiver modified in that the multi-carrier modulated signals include symbols in which the predetermined signals are not included; predetermined first signals that differ from the predetermined signals are arranged in a plurality of sub-carriers and included at the symbols in which the predetermined signals are not included; and the correlator is further operable, when both of the two symbols used by the differential detector are symbols in which the predetermined signals are not included, to calculate a correlation between (i) for each of the location patterns, a location sequence signal in which sub-carrier positions where the predetermined signals are arranged therein when the location pattern is used and where the predetermined first signals are arranged at symbols in which the predetermined signals are not arranged are set to one, while all other sub-carrier positions are set to zero, and (ii) signals output by the differential detector.

According to the above, even when both of the two symbols used for differential detection by the differential detector are symbols in which predetermined signals are not arranged, the number of symbols for which corrections to carrier frequency discrepancies are realised based on the wideband carrier frequency error can be increased through the use of a predetermined signal. Thus, the accuracy of corrections to carrier frequency discrepancies and the time tracking of such corrections can be improved.

As one mode of the present invention, a tenth receiver is like the fifth receiver modified in that the wideband carrier frequency error detector estimates the location pattern and carrier mode used by the multi-carrier modulated signals according to the location pattern with the greatest cumulative value and the greatest carrier direction discrepancies, the receiving device further comprises: a channel characteristics estimator operable to estimate channel characteristics, which are the amplitude and phase received as a channel by the multi-carrier modulated signals, according to the location pattern and carrier mode estimated by the wideband carrier frequency calculator; and an equaliser operable to correct the amplitude and phase of the signals output by the orthogonal transformer according to the channel characteristics estimated by the channel characteristics estimator.

According to the above, channel characteristics can be estimated before the extraction of the location pattern or of channel mode information from the received multi-carrier modulated signal. Thus, the time required for channel selection can, for instance, be reduced.

As one mode of the present invention, an eleventh receiver is like the tenth receiver modified in that the multi-carrier modulated signals include scattered pilot signals scattered therein; the scatter pattern of the scattered pilot signals is determined according to the location pattern and the carrier mode; and the channel characteristics estimator estimates the scatter pattern from the estimated location pattern and carrier mode, and estimates channel characteristics according to the scatter pattern so estimated.

According to the above, channel characteristics can be estimated before the extraction of the location pattern and transmission mode information from the received multi-carrier modulated signal by estimating a scattered-pilot pattern from the estimated location pattern and transmission mode. This in turn allows, for example, the time required for channel selection to be reduced.

As one mode of the present invention, a twelfth receiver is like the fifth receiver modified in that the multi-carrier modulated signals further include control symbols that include control information, being the location pattern and the carrier mode used by the multicarrier modulated signals, and the receiving device further comprises: a control information extractor operable to extract the control information from the control symbols; and the wideband carrier frequency error calculator calculates the cumulative value only for the location pattern and carrier mode included therein after extraction of the control information.

According to the above, after the extraction of the location pattern and transmission mode information included in the control symbols, cumulative processing can be executed for the extracted location pattern and transmission mode information only. Thus, erroneous wideband carrier frequency error calculation through the wrong location pattern or transmission mode information can be prevented, and the accuracy of wideband carrier frequency error calculation can be enhanced.

As one mode of the present invention, a thirteenth receiver is like the tenth receiver modified in that the multi-carrier modulated signals further include control symbols that include control information, being the location pattern and the carrier mode used by the multicarrier modulated signals, and the receiving device further comprises: a control information extractor operable to extract the control information from the control symbols; and the channel characteristics estimator estimates the channel characteristics according to the location pattern and carrier mode included therein after the extraction of the control information.

According to the above, after the extraction of the location pattern and transmission mode information included in the control symbols, erroneous channel characteristics prediction based on mistaken location patterns or transmission mode information can be prevented by estimation the channel characteristics for the location pattern and transmission mode so extracted, and thus the accuracy of channel characteristics estimation can be enhanced.

Embodiments of the present invention are described below with reference to the figures.

Embodiment 1

The following describes a receiver 1 pertaining to Embodiment 1 of the present invention, with reference to the figures. It should be noted that for Embodiment 1 as well as for successive Embodiments, examples of receivers are described as operable to receive second-generation European terrestrial digital broadcasts according to the DVB-T2 scheme. The signals received by the receivers are OFDM signals based on the DVB-T2 transmission format.

FIG. 1 is a configuration diagram of the receiver 1 pertaining to Embodiment 1 of the present invention. The receiver 1 comprises an antenna 11, a tuner 12, a demodulator 13, a decoder 14, and a display 15.

The antenna 11 receives broadcast waves provided by a broadcasting station (not diagrammed) and outputs the broadcast waves so received to the tuner 12. The tuner 12 selects a desired reception channel signal out of a plurality of broadcast waves input from the antenna 11, converts the selected reception signals from the RF band to the IF band, and outputs the IF-band reception signals to the demodulator 13. As explained later, the demodulator 13 demodulates the reception signals input from the tuner 12 and outputs the resulting demodulated signals to the decoder 14.

The decoder 14 decodes the signals input from the demodulator 13, which are compressed using H.264 or a similar standard, into audiovisual signals and outputs the audiovisual signals so decoded to the display 15. The display 15 displays video and outputs audio in accordance with the audiovisual signals input from the decoder 14.

Next, the demodulator 13 of FIG. 1 is described with reference to FIG. 2.

Figure 2:
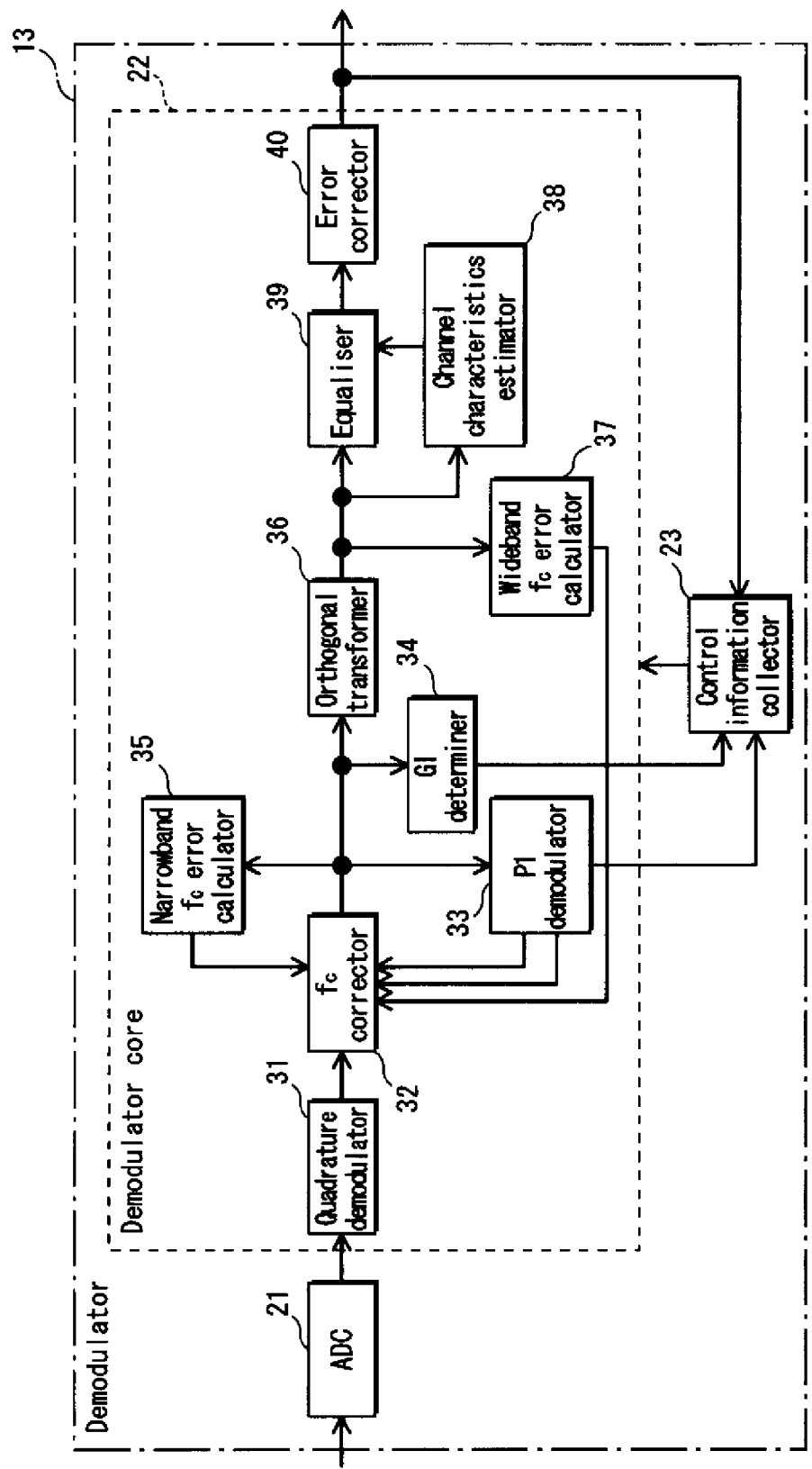
FIG. 2 is a configuration diagram of the demodulator from FIG. 1.

FIG. 2 is a configuration diagram of the demodulator 13 from FIG. 1. The demodulator 13 comprises an ADC (Analogue-to-Digital Converter) 21, a demodulator core 22, and a control information collector 23.

The IF-band reception signals from the tuner 12 of FIG. 1 are input to the ADC 21. The ADC 21 converts the signals so input from analogue signals to digital signals, then outputs the signals so converted (hereinafter referred to as digital reception signals) to the quadrature demodulator 31 (explained later) in the demodulator core 22.

The demodulator core 22 comprises a quadrature demodulator 31, a $f_c$ corrector 32, a P1 demodulator 33, a GI determiner 34, a narrowband $f_c$ error calculator 35, an orthogonal transformer 36, a wideband $f_c$ error calculator 37, a channel characteristics estimator 38, an equaliser 39, and an error corrector 40. Each component of the demodulator core 22 is operated using control information collected by the control information collector 23 as necessary.

The quadrature demodulator 31 quadrature demodulates the IF-band digital reception signals input from the ADC 21 using a fixed frequency and outputs the resulting quadrature demodulated complex baseband signals to the $f_c$ error corrector 32.

The $f_c$ corrector 32 produces corrected carrier frequencies based on the following: (i) narrowband carrier frequency error and wideband carrier frequency error detected thus far by the P1 demodulator 33, (ii) narrowband carrier frequency error calculated thus far by the narrowband $f_c$ error calculator 35, and (iii) wideband carrier frequency error calculated thus far by the wideband $f_c$ error calculator 37. According to the corrected carrier frequencies, the $f_c$ corrector 32 corrects carrier frequency discrepancies in the complex baseband signals input from the quadrature demodulator 31, then outputs complex baseband signals in which carrier frequency discrepancies have been corrected to the P1 demodulator 33, the GI determiner 34, the narrowband $f_c$ error calculator 35, and the orthogonal transformer 36.

The complex baseband signals in which carrier frequency discrepancies have been corrected are input from the $f_c$ corrector 32 to the P1 demodulator 33. The P1 demodulator 33 detects P1 symbols in the complex baseband signals. Such signals are included in the DVB-T2 transmission format. With respect to the P1 symbols, the P1 demodulator 33 detects the narrowband carrier frequency error as well as the wideband carrier frequency error, applies corrections to carrier frequency discrepancies, and outputs the narrowband carrier frequency error as well as the wideband carrier frequency error so detected to the $f_c$ corrector 32. In addition, the P1 demodulator 33 performs P1 symbol decoding and outputs the resulting control information to the control information collector 23. Here, the narrowband carrier frequency error detected by the P1 demodulator 33 is the carrier frequency error within the P1 symbol sub-carrier spacing, and the wideband carrier frequency error is the carrier frequency error at the unit level of the P1 symbol sub-carrier spacing.

The control information obtained as a result of decoding includes such information as SISO/MISO information concerning the format of the P2 symbols and data symbols, FFT size information concerning the FFT size of the P2 symbols and data symbols, FEF signalling information signalling the presence of FEFs, and the like.

Detailed explanations of the P1 demodulator 33 will be given later with reference to FIGS. 3 through 5.

The GI determiner 34 receives the FFT size information from the control information collector 23, which is transmitted in P1 symbols and concerns the FFT size of the P2 symbols and data symbols. Also, the GI determiner 34 detects the useful symbol length from the FFT size. Then, the GI determiner 34 estimates the guard interval fraction used for actual symbol transmission by calculating the correlation between guard interval-length symbols and the closing portion of the useful symbol-length symbols (guard correlation) for symbols other than P1 symbols (i.e. P2 symbols, data symbols, and frame-closing symbols) included in the complex baseband signals input from the $f_c$ corrector 32 for every guard interval fraction defined in the DVB-T2 scheme. The GI determiner 34 then outputs the estimated guard interval fraction as control information to the control information collector 23.

The GI determiner 34 specifies the guard interval fraction that may be used for actual transmissions according to either the FFT size information or to the FFT size and SISO/MISO information transmitted as P1 symbols (see FIG. 39). Furthermore, the GI determiner 34 may estimate the guard interval fraction used for actual symbol transmission by calculating the correlation between guard interval-length symbols and the closing portion of the useful symbol-length symbols (guard correlation) for symbols other than P1 symbols (i.e. P2 symbols, data symbols, and frame-closing symbols) included in the complex baseband signals input from the $f_c$ corrector 32 for every guard interval fraction specified as allowable for actual transmission.

The narrowband $f_c$ error calculator 35 calculates the correlation between guard interval-length symbols and signals the length of the end part of the useful symbol length (guard correlation) for symbols other than P1 symbols (i.e. P2 symbols, data symbols, and frame-closing symbols) included in the complex baseband signals input from the $f_c$ corrector 32 with the guard interval fraction estimated by the GI determiner 34. Then, the narrowband $f_c$ error calculator 35 calculates the narrowband carrier frequency error in the non-P1-symbols according to the guard correlation so calculated and outputs the narrowband carrier frequency error so calculated to the $f_c$ corrector 32. The narrowband carrier frequency error detected by the narrowband $f_c$ error calculator 35 is the error within the non-P1-symbol sub-carrier spacing.

The orthogonal transformer 36 separates the time-domain complex baseband signals of the useful symbol-length portions of non-P1 symbols (i.e. P2 symbols, data symbols, and frame-closing symbols) input from the $f_c$ corrector 32 into multiple sub-carriers by orthogonal transformation, and outputs the resulting frequency-domain complex baseband signals to the wideband $f_c$ error calculator 37, the channel characteristics estimator 38, and the equaliser 39. It should be noted that orthogonal transformation is performed by the orthogonal transformer 36 based on Fourier transforms, cosine transforms, wavelet transforms, Hadamard transforms, or similar.

In this example, the orthogonal transformer 36 performs orthogonal transformation using Fourier transforms, specifically Fast Fourier Transforms (FFT). The orthogonal transformer 36 transforms the time-domain complex baseband signals input from the $f_c$ corrector 32 by performing an FFT thereupon, thus producing frequency-domain complex baseband signals, then outputs the frequency-domain complex baseband signals so produced to the wideband $f_c$ error calculator 37, the channel characteristics estimator 38, and the equaliser 39. However, the orthogonal transformer 36 is not limited to the above.

The wideband $f_c$ error calculator 37 calculates the wideband carrier frequency error using non-P1 symbols (i.e. P2 symbols, data symbols, and frame-closing symbols) from the frequency-domain complex baseband signals input from the orthogonal transformer 36 after corrections have been applied to carrier frequency discrepancies according to the carrier frequency error detected in the P1 symbols, then outputs the wideband carrier frequency error so calculated to the $f_c$ corrector 32. The wideband carrier frequency error detected by the wideband $f_c$ error calculator 37 is the error at the unit level of the non-P1 symbol (i.e. P2 symbols, data symbols, and frame-closing symbols) sub-carrier spacing. Detailed explanations of the wideband $f_c$ error calculator 37 will be given later with reference to FIGS. 6 through 8.

The channel characteristics estimator 38 estimates the channel characteristics of the frequency-domain complex baseband signals input from the orthogonal transformer 36 and outputs the channel characteristics so estimated to the equaliser 39. The channel characteristics are the amplitude and phase displacement of the signals imparted by the reception channel. The equaliser 39 uses the channel characteristics estimated by the channel characteristics estimator 38 to apply amplitude and phase corrections to the frequency-domain complex baseband signals input from the orthogonal transformer 36, then outputs the resulting signals to the error corrector 40. The error corrector 40 executes error correction processing on the signals input from the equaliser 39. Then, the error corrector 40 outputs, for instance, transport streams and the like to the decoder 14 of FIG. 1, or transmission parameters and other such control information transmitted as P2 symbols to the control information collector 23.

Control information obtained by the error corrector 40 includes such information as pilot pattern information indicating which data symbol pilot pattern is in use, carrier mode information indicating which carrier mode is in use, the number of symbols per frame, the modulation scheme, the encoding ratio of FEC codes, and all other transmission parameters required for reception.

The control information collector 23 classifies the transmission parameters in the control information collected from the P1 demodulator 33, the GI determiner 34, and the error corrector 40, then outputs these parameters to the respective components of the demodulator core 22. Each component of the demodulator core 22 uses the control information collected by the control information collector 23 as necessary.

Next, the P1 demodulator 33 from FIG. 2 is explained with reference to FIG. 3.

Figure 3:
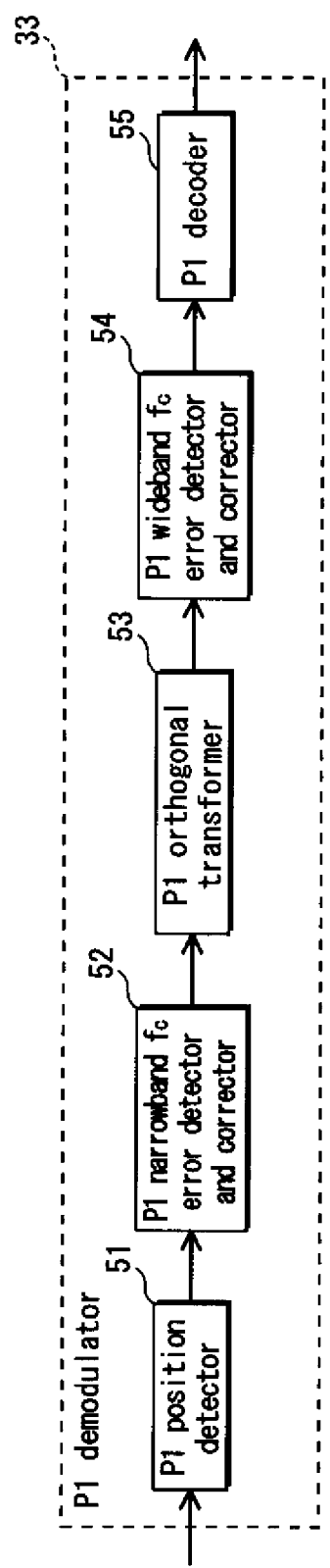
FIG. 3 is a configuration diagram of the P1 demodulator from FIG. 2.

FIG. 3 is a structural diagram of the P1 demodulator 33 from FIG. 2. The P1 demodulator 33 comprises a P1 position detector 51, a P1 NAFC 52, a P1 orthogonal transformer 53, a P1 WAFC 54, and a P1 decoder 55.

The complex baseband signals are input from the $f_c$ corrector of FIG. 2 to the P1 position detector 51. The P1 position detector 51 calculates the correlation between P1 symbol guard interval-length signals and a predetermined portion of the useful symbol-length signals (guard correlation) for P1 symbols in the complex baseband signals, and then integrates the correlation value over the guard interval length. The P1 position detector 51 detects the positions of P1 symbols in the complex baseband signals from peak positions in the value of this integral.

The P1 NAFC 52 calculates the correlation between P1 symbol guard interval-length signals and the predetermined portion of the useful symbol-length signals (guard correlation) based on the P1 symbol positions detected by the P1 position detector 51, and then integrates the correlated value over the guard interval length. The P1 NAFC 52 calculates the phase of the value of this integral and detects the narrowband carrier frequency error from the phase timing of the P1 symbol positions detected by the P1 position detector 51. The narrowband carrier frequency error detected by the P1 NAFC 52 is the error within the P1-symbol sub-carrier spacing. The P1 NAFC 52 applies corrections to P1 symbol carrier frequency discrepancies based on the error narrowband carrier frequency so detected, then outputs P1 symbols in which such discrepancies have been corrected to the P1 orthogonal transformer 53. In addition, the P1 NAFC 52 outputs the detected narrowband carrier frequency errors to the $f_c$ corrector 23 from FIG. 2.

Figure 37:
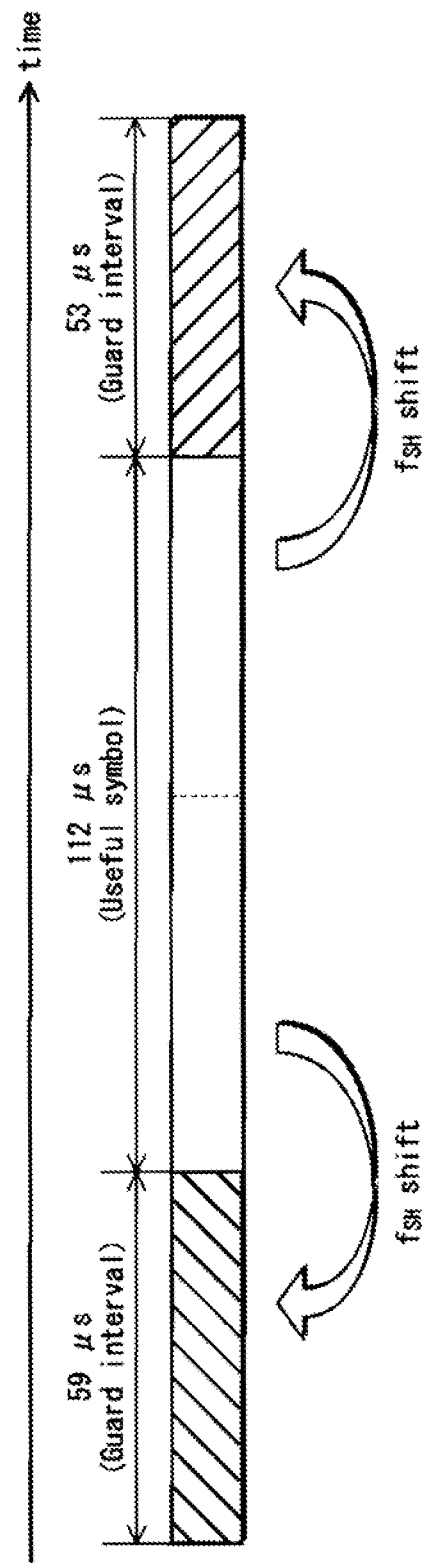
FIG. 37 is a schematic diagram showing the time axis format for P1 symbols.
Figure 38:
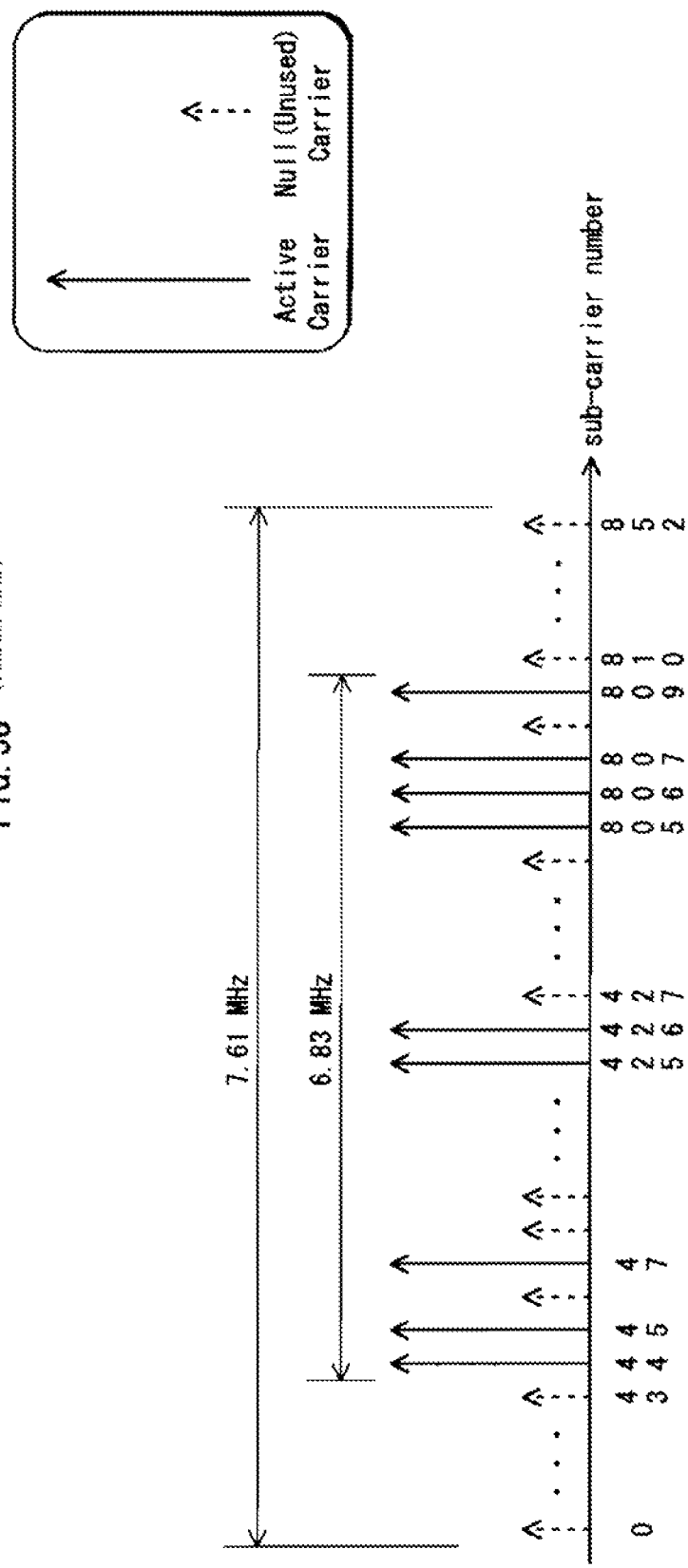
FIG. 38 is a schematic diagram showing the frequency axis format for P1 symbols.

However, as shown in FIG. 37, given that, for P1 symbols, a frequency-shifted signal portion $f_{sh}$ is inserted in the guard interval, the correlations calculated by the P1 position detector 51 and by the P1 NAFC 52 must take such transmitter-added $f_{sh}$ into account. Furthermore, the predetermined portions are defined as (i) the leading portion of the useful symbol for a guard interval preceding such a symbol, and (ii) the closing portion of the useful symbol for a guard interval following such a symbol.

The P1 orthogonal transformer 53 separates the time-domain complex baseband signals of the useful symbol-length portion of the P1 symbols input from the P1 NAFC 52 into a plurality of sub-carriers by orthogonal transformation, and then outputs the resulting frequency-domain complex baseband signals of the P1 symbols to the P1 WAFC 54. It should be noted that orthogonal transformation is performed by the P1 orthogonal transformer 53 based on Fourier transforms, cosine transforms, wavelet transforms, Hadamard transforms, or similar.

In this example, the P1 orthogonal transformer 53 performs orthogonal transformation using Fourier transforms, specifically Fast Fourier Transforms (FFT). The P1 orthogonal transformer 53 transforms the time-domain complex baseband signals of the useful symbol-length portion of the P1 symbols input from the P1 NAFC 52 by performing an FFT thereupon, thus producing frequency-domain complex baseband signals, then outputs the signals so produced to the P1 WAFC 54. However, the P1 orthogonal transformer 53 is not limited to the above.

The P1 WAFC 54 detects the wideband carrier frequency error in the P1 symbols input from the P1 orthogonal transformer 53. The wideband carrier frequency error detected by the P1 WAFC 54 is the carrier frequency error at the unit level of the P1 symbol sub-carrier spacing. The P1 WAFC 54 applies corrections to P1 symbol wideband carrier frequency discrepancies based on the wideband carrier frequency error so detected, then outputs P1 symbols in which such discrepancies have been corrected to the P1 decoder 55 and outputs the detected wideband carrier frequency error to the $f_c$ corrector 23 from FIG. 2.

The P1 decoder 55 decodes the P1 symbols input from the P1 WAFC 54 and outputs the control information transmitted as such P1 symbols to the control information collector 23 of FIG. 2.

Next, the P1 WAFC 54 of FIG. 3 is explained with reference to FIGS. 4 and 5.

Figure 4:
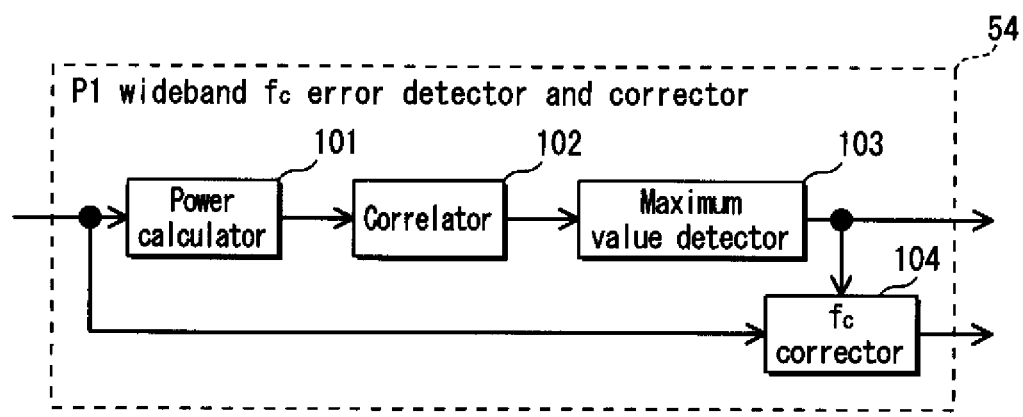
FIG. 4 is a configuration diagram of the P1 WAFC from FIG. 3.

FIG. 4 is a configuration diagram of the P1 WAFC 54 of FIG. 3. The P1 WAFC 54 comprises a power calculator 101, a correlator 102, a maximum value detector 103, and a $f_c$ corrector 104. The frequency-domain complex baseband signals of the P1 symbols input from the P1 orthogonal transformer 53 of FIG. 3 are supplied to the power calculator 101 and to the $f_c$ corrector 104.

The power calculator 101 calculates a power value for each sub-carrier signal of the P1 symbols and outputs the power values so calculated to the correlator 102.

The correlator 102 shifts the power value of each sub-carrier signal by one sub-carrier unit along the carrier direction, and simultaneously correlates (i) a sequence made up of the power values of the sub-carrier signals, and (ii) an active carrier location sequence (wherein elements corresponding to the locations of active carriers are set to one, and elements corresponding to the locations of null carriers are set to zero), then outputs the correlated value so calculated to the maximum value detector 103.

Specifically, correlation is performed by the correlator 102 as follows: Let the power value of each sub-carrier signal be X[i], and let the sequence number of each tap be C[j]. Correlation is then calculated as a convolution of sequence X and sequence C. It should be noted that the larger the values of i and j, respectively, for X and for C, the greater the sub-carrier position indicated by the carrier number. Furthermore, the tap coefficient value C[j] is set to one in response to an active carrier position and to zero in response to a null carrier position for the P1 symbols.

Figure 5:
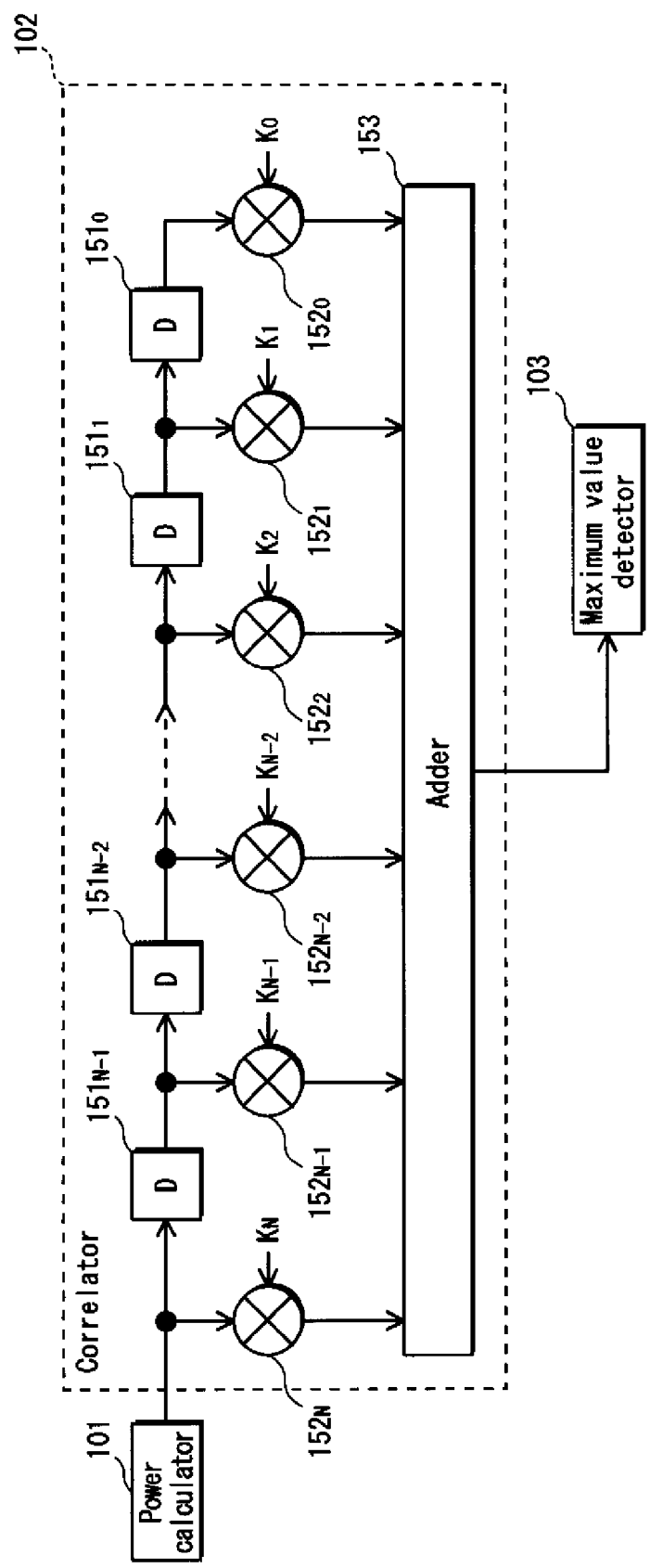
FIG. 5 is a configuration diagram of the correlator from FIG. 4.

FIG. 5 shows one sample configuration for the correlator 102. As shown in FIG. 5, the correlator 102 comprises registers $151_0$ through $151_{N-1}$, multipliers $152_0$ through $152_N$, and an adder 153. The number of registers and multipliers may be determined, for example, according to the number of useful sub-carriers in the P1 symbols.

The power value of each sub-carrier signal of the P1 symbols calculated by the power calculator 101 is provided to the correlator 102 in, for example, increasing sub-carrier frequency order, or else in decreasing sub-carrier frequency order. Each of the registers $151_{N-1}$ through $151_0$ delays and outputs the power value of the sub-carrier signal input thereto. Each of the multipliers $152_N$ through $152_0$ multiplies the power value of the sub-carrier signal input thereto by a tap coefficient value $K_N$ through $K_0$, then outputs the result to the adder 153. The tap coefficient value $K_0$ through $K_N$ is set to one in response to active carrier positions and to zero in response to null carrier positions in the P1 symbols. The adder 153 adds up the multiplied values input from the multipliers $152_N$ through $152_0$ and outputs the resulting correlated values to the maximum value detector 103.

The above-described series of processes is executed every time sub-carrier signal power values are provided to the correlator 102 by the power calculator 101.

The maximum value detector 103 from FIG. 4 observes the correlated values input from the adder 153 within the correlator 102, detects the maximum correlated value, then outputs the shift at the time this maximum value was taken as the wideband carrier frequency error to the $f_c$ corrector 104 and to the $f_c$ corrector 32 from FIG. 2.

This shift indicates how many sub-carriers among the set of sub-carriers used for correlation by the correlator 102 are offset in the carrier direction relative to a set of sub-carriers used for correlation by the correlator 102 when the wideband carrier frequency error in the P1 symbols as transformed by the P1 orthogonal transformer 53 is assumed to be zero.

The active carriers in the P1 symbols are DBPSK (Difference Binary Phase displacement Keying) modulated. The correlated value for a shift where only the power values of active carriers are input to all of the multipliers for which the tap coefficient value is set to one is the sum of the power values for all active carriers, and as such will be a larger value in comparison to the correlated value of other shifts in which null carriers are included. Accordingly, the shift obtained from the maximum correlated value is taken as the wideband carrier frequency error, which makes possible the detection thereof.

The $f_c$ corrector 104 absorbs the processing delay needed by each component, from the power calculator 101 to the maximum value detector 103, for processing of the frequency-domain complex baseband signals of the P1 symbols input from the P1 orthogonal transformer 53 from FIG. 3 into some form of memory, and applies corrections to wideband carrier frequency discrepancies based on the wideband carrier frequency error input from the maximum value detector 103. Then, the $f_c$ corrector 104 outputs frequency-domain complex baseband signals with P1 symbols in which such discrepancies have been corrected to the P1 decoder 55 from FIG. 3.

It should be noted that the structure of the P1 demodulator 33 is not limited to that shown in FIGS. 3 through 5 but may vary as long as the structure is able to detect the wideband carrier frequency error for P1 symbols, perform extraction of control information transmitted as P1 symbols, and so on.

Next, the wideband $f_c$ error calculator 37 of FIG. 2 is described with reference to FIGS. 6 through 8.

Figure 6:
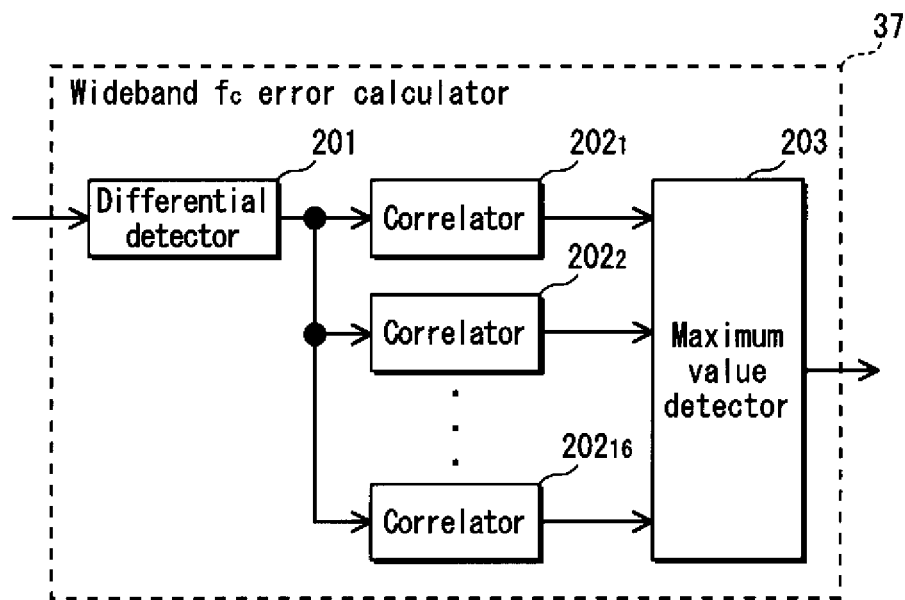
FIG. 6 is a configuration diagram of the wideband $f_c$ error calculator from FIG. 2.

FIG. 6 is a configuration diagram of the wideband $f_c$ error calculator 37 from FIG. 2. The wideband $f_c$ error calculator 37 comprises a differential detector 201, correlators $202_1$ through $202_{16}$, and a maximum value detector 203. The wideband $f_c$ error calculator 37 is equipped with the 16 correlators $202_1$ through $202_{16}$ for the eight different pilot patterns, namely PP1 through PP8, and the two carrier modes, namely normal mode and extended mode. The number of correlators in the wideband $f_c$ error calculator 37 is not fixed and may vary as appropriate.

The differential detector 201 uses each of the non-P1 symbols (i.e. P2 symbols, data symbols, and frame-closing symbols) input from the orthogonal transformer 36 of FIG. 2, detects a symbol direction differential in the sub-carrier signals for each sub-carrier, then outputs the values so obtained (hereinafter referred to as sub-carrier signal differential detection values) to the correlators $202_1$ through $202_{16}$.

Figure 7:
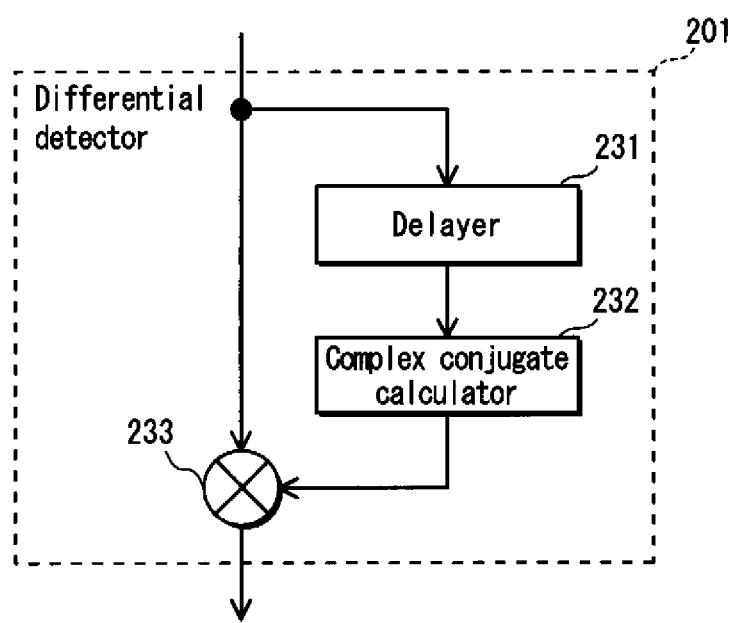
FIG. 7 is a configuration diagram of the differential detector from FIG. 6.

The configuration of the differential detector 201 is shown in FIG. 7. As shown, the differential detector 201 comprises a delayer 231, a complex conjugate calculator 232, and a multiplier 233.

The frequency-domain complex baseband signals of the non-P1 symbols (i.e. P2 symbols, data symbols, and frame-closing symbols) output from the orthogonal transformer 36 of FIG. 2 are supplied to the delayer 231 and to the multiplier 233.

The delayer 231 delays the frequency-domain complex baseband signals of the supplied symbols by one symbol, and outputs the result to the complex conjugate calculator 232. The complex conjugate calculator 232 calculates the complex conjugate of the signals input from the delayer 231 and outputs the signals so calculated to the multiplier 233. The multiplier 233 multiplies the complex baseband signals input from the orthogonal transformer 36 and the complex baseband signals input from the complex conjugate calculator 232, then outputs the results for each of the sub-carriers as sub-carrier signal differential detection values to the correlators $202_1$ through $202_{16}$.

Thus, the differential detector 201 performs symbol direction differential detection for each of the sub-carriers and outputs the respective results to the correlators $202_1$ through $202_{16}$.

Each of the correlators $202_1$ through $202_{16}$ is assigned one distinct combination of pilot pattern and carrier mode. As such, each of the correlators $202_1$ through $202_{16}$ is assigned a CP signal location pattern by the control information collector 23 of FIG. 2 according to the FFT size corresponding to the assigned combination thereof.

Each of the correlators $202_1$ through $202_{16}$ shifts the sub-carrier signal differential detection values input from the differential detector 201 by one sub-carrier unit in the carrier direction while simultaneously correlating (i) an input sequence made up of the sub-carrier signal differential detection values and (ii) the CP carrier location sequence determined by the assigned CP signal location pattern (wherein sequence elements corresponding to a CP carrier position are set to one, and all other sequence elements are set to zero), calculates the power of the correlated value, and outputs the power value so calculated to the maximum value detector 203.

Specifically, each of the correlators $202_1$ through $202_{16}$ performs correlation as follows: Let each sub-carrier signal differential detection value be X[i], and let the sequence number of each tap be C[j]. Correlation is then calculated as a convolution of sequence X and sequence C. It should be noted that the larger the values of i and j, respectively, for X and for C, the greater the sub-carrier position indicated by the carrier number. Furthermore, the tap coefficient value C[j] is set to one in response to a CP carrier position as determined by the assigned CP signal location, and is set to zero otherwise.

Figure 8:
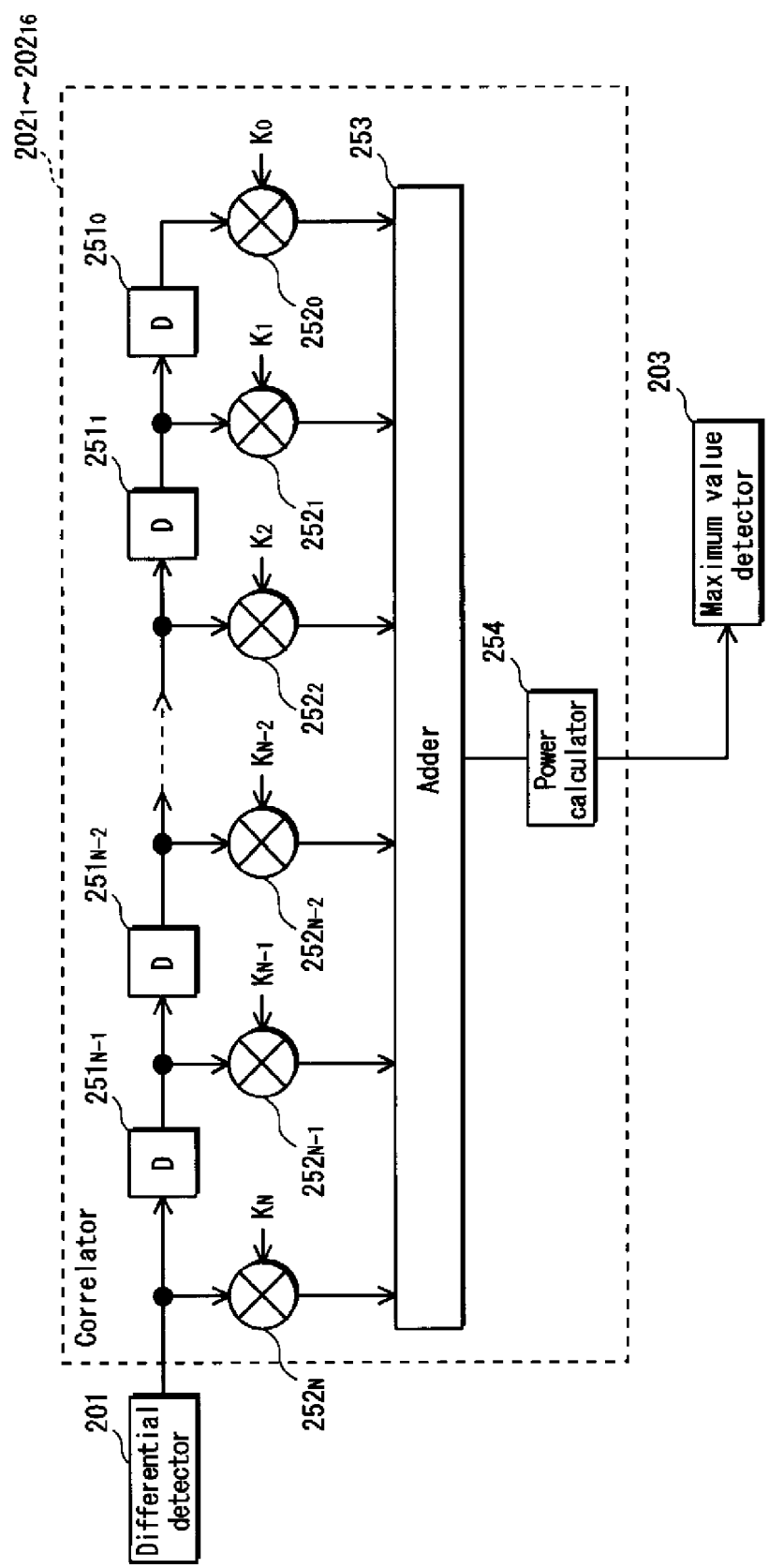
FIG. 8 is a configuration diagram of one of the correlators from FIG. 6.

FIG. 8 shows one sample configuration for the correlators $202_1$ through $202_{16}$. As shown, each of the correlators $202_1$ through $202_{16}$ comprise registers $251_0$ through $251_{N-1}$, multipliers $252_0$ through $252_N$, an adder 253, and a power calculator 254. The number of registers and multipliers may be determined, for example, according to the number of useful sub-carriers in the non-P1 symbols for the greatest FFT size.

The sub-carrier signal differential detection values calculated by the differential detector 201 are provided to the correlators $202_1$ through $202_{16}$ in, for example, increasing sub-carrier frequency order, or else in decreasing sub-carrier frequency order. Each of the registers $251_{N-1}$ through $251_0$ delays and outputs the sub-carrier signal differential detection value input thereto. Each of the multipliers $252_N$ through $252_0$ multiplies the sub-carrier signal differential detection value input thereto by the tap coefficient value $K_N$ through $K_0$, then outputs the result to the adder 253. The tap coefficient value $K_0$ through $K_N$ is set by the control information collector 23 to one in response to a CP carrier position as determined by the assigned CP signal location, and is set to zero otherwise.

The adder 253 adds up the multiplied values input from the multipliers $252_N$ through $252_0$ and outputs the resulting correlated value to the power calculator 254. The power calculator 254 calculates the power of the correlated value input from the adder 253 and outputs the result to the maximum value detector 203.

The above-described series of processes is executed every time sub-carrier signal differential detection values are input from the differential detector.

The maximum value detector 203 from FIG. 6 observes the power values input from the power calculator 254 within each of the correlators $202_1$ through $202_{16}$, detects the maximum correlated value out of all the correlated values in a predetermined detection range, then outputs the shift taken from this maximum correlated value as the wideband carrier frequency error to the $f_c$ corrector 23 from FIG. 2.

This shift indicates how many sub-carriers among the set of sub-carriers used for correlation by the correlators $202_1$ through $202_{16}$ are offset in the carrier direction relative to a set of sub-carriers used for correlation by the correlators $202_1$ through $202_{16}$ when the wideband carrier frequency error as transformed by the P1 orthogonal transformer 36 is assumed to be zero. Furthermore, the detection range is a range used for wideband carrier frequency error calculation by the wideband $f_c$ error calculator 37. In other words, this range is the range of the shift used for maximum value detection by the maximum value detector 203.

In the wideband $f_c$ error calculator 37, through differential detection for each of the sub-carriers of the signals output by the orthogonal transformer 36 from FIG. 2, the differential detection values for CP carriers each become similar vectors, and differential detection values for sub-carriers that are not CP carriers become random vectors. Thus, in the correlator corresponding to the CP signal location pattern of the right FFT size for the transmitted pilot pattern and carrier mode, the correlated value is larger when differential detection values for CP carriers are each input to all of the multipliers with a tap sequence value set to one, and the correlated value is smaller for any differing shift positions because a random sub-carriers differential detection value is included therein. Furthermore, in correlators not corresponding to the CP signal location pattern of the right FFT size for the transmitted pilot pattern and carrier mode, none of the differential detection values for CP carriers are input to any of the multipliers with a tap sequence value set to one. Thus, the correlated value therein is smaller because sub-carriers that are not CP carriers are always included. Accordingly, the shift of the CP signal location pattern producing the maximum correlated value is made into the wideband carrier frequency error, which in turn makes possible detection thereof.

For FFT sizes of 1 k, 2 k, and 4 k, only normal mode is available. Thus, the eight extended-mode correlators $202_9$ through $202_{16}$ do not perform correlation, or else the maximum value detector 203 excludes correlated values input from the eight extended-mode correlators $202_9$ through $202_{16}$ when detecting the maximum correlated value.

The detection range in which the wideband $f_c$ error calculator 37 detects the wideband carrier frequency error is described below.

Figures 40, 41:
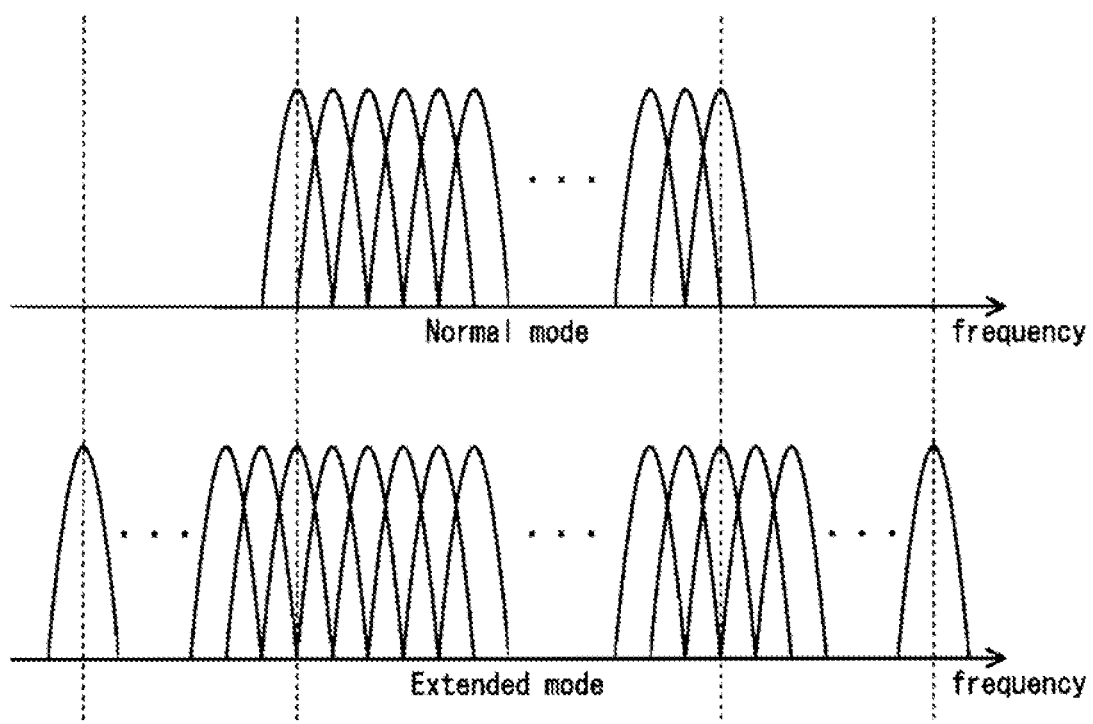
FIG. 40 is a diagram showing the number of P2 symbols per frame by FFT size.
FIG. 41 is a schematic diagram showing the sub-carrier positions in the two carrier modes, namely normal mode and extended mode.
Figures 43, 44:
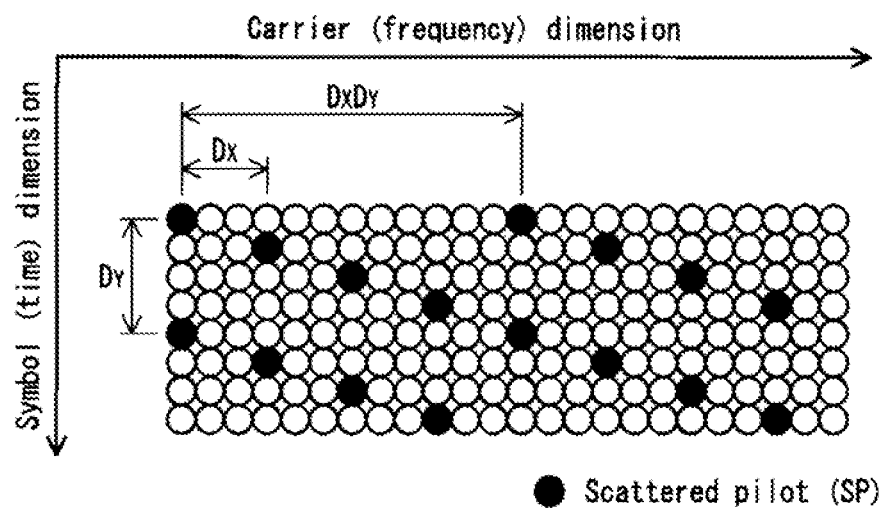
FIG. 43 is a diagram showing the SP signal positions by pilot pattern.
FIG. 44 is a diagram showing the sub-carrier spacing $D_x$ and the symbol spacing $D_y$ of the SP signals by pilot pattern.
Figure 49:
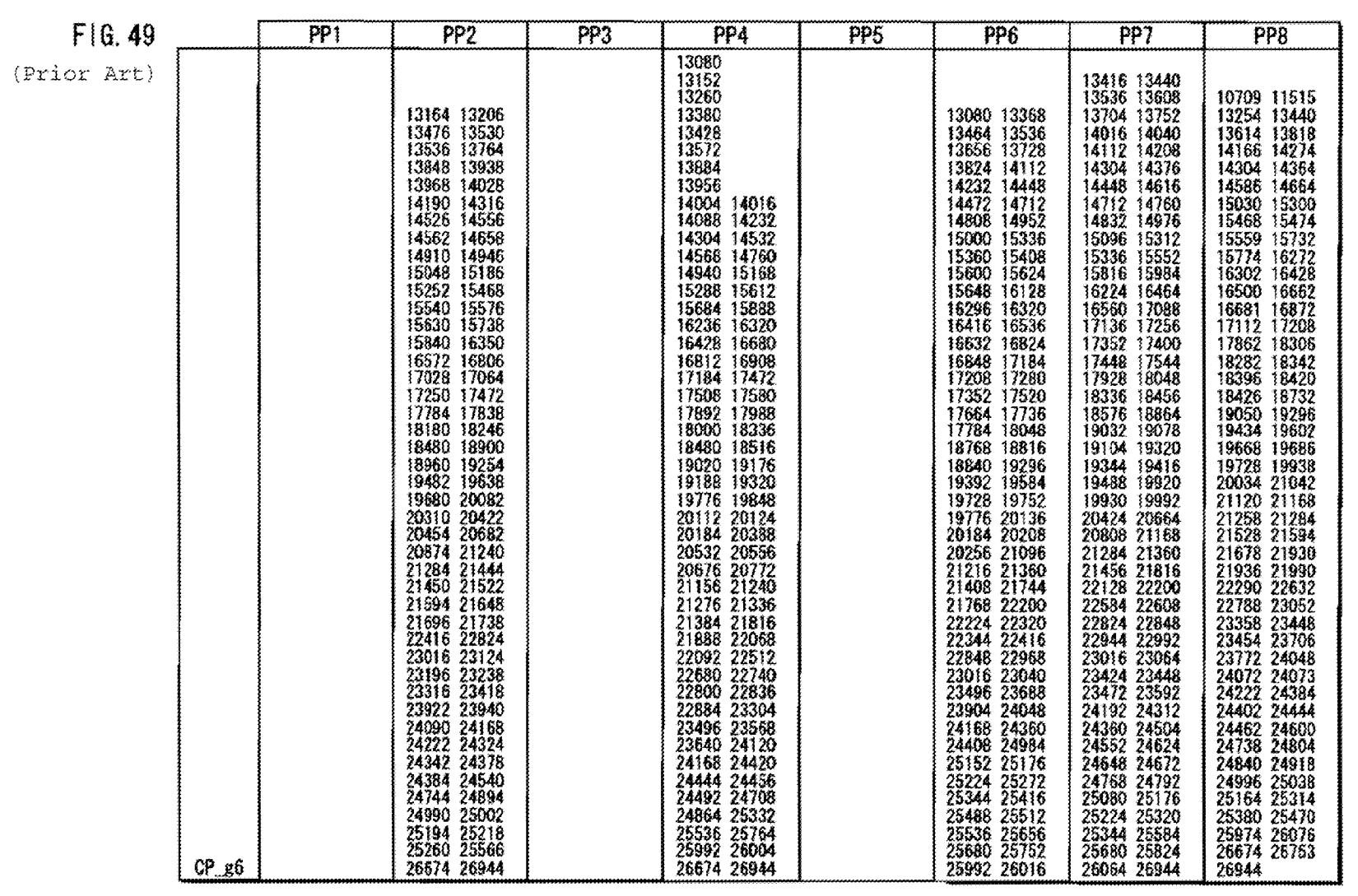
Figure 51:
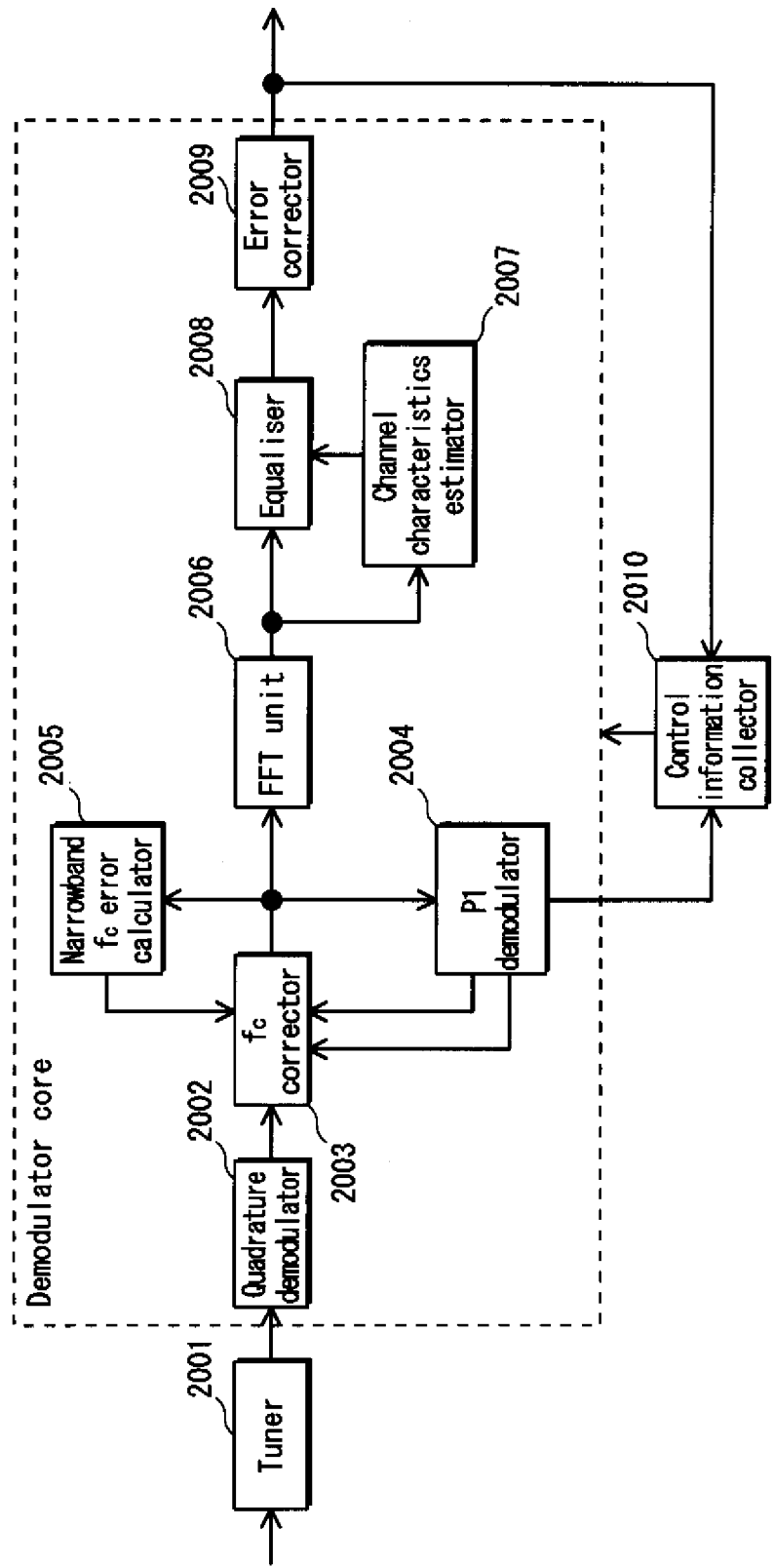
FIG. 51 is a configuration diagram of a conventional receiver having the P1 demodulator of Non-Patent Literature 1.
Figure 52:
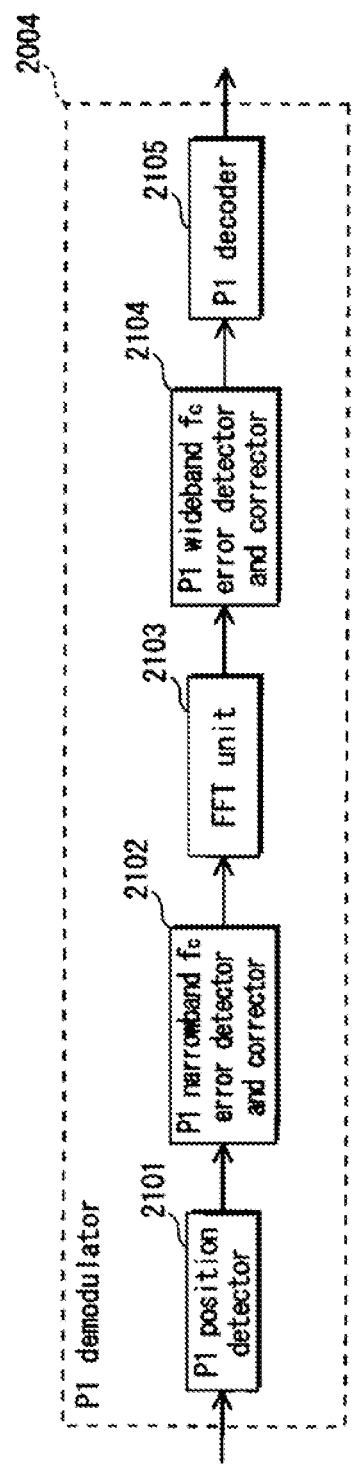
FIG. 52 is a configuration diagram of the P1 demodulator of Non-Patent Literature 1 from FIG. 51.

The difference in the number of CP carriers between the two carrier modes, namely normal mode and extended mode, is on the order of a few CP carriers (see FIG. 50). CP carrier positions can be thought of as physical sub-carrier positions. As such, these positions are shifted by only half of the difference in the number of useful sub-carriers between normal mode and extended mode. CP carrier positions, being fixed according to the values shown in FIG. 45, FIGS. 46 through 49, and FIG. 50, are the useful sub-carrier numbers. This is because, as shown in FIG. 41, there is an offset between the starting useful sub-carrier positions in normal mode and in extended mode. Accordingly, the offset in physical sub-carrier positions between CP carriers in the two modes is given as Δf, or half of the difference in sub-carrier number therebetween (see FIG. 42).

Given that the positional relationship between normal mode and extended mode is a simple shift, and that extended mode has an additional number of CP carriers, there is almost no difference between, for example, the normal-mode correlation of a correct sub-carrier position and the extended mode correlation for a position shifted by Δf therefrom. For this reason, wideband carrier frequency discrepancies in normal mode cannot be distinguished from Δf wideband carrier frequency discrepancies in extended mode, and there is a possibility that an incorrect wideband carrier frequency error could be detected.

By first using the P1 symbols to detect the error at the unit level of the P1 symbols sub-carrier spacing (wideband carrier frequency error), and then applying corrections to carrier frequency discrepancies for non-P1 symbols (i.e. P2 symbols, data symbols, and frame-closing symbols) based on the wideband carrier frequency error so detected, the error at the unit level of the non-P1 symbol sub-carrier spacing (wideband carrier frequency error) is constrained to, at most, ten sub-carriers. Therefore, the detection range need only be ten sub-carriers. Given that such a detection range covers shifts of less than $\Delta f$, and considering the $\Delta f$ values shown in FIG. 42, incorrect detection in which extended mode and normal mode are mistaken for one another can be avoided According to the above, the upper limit of the detection range for the wideband $f_c$ error calculator 37 may be half of the difference in the number of useful sub-carriers between normal mode and extended mode ($\Delta f$).

The processing performed by the wideband $f_c$ error calculator 37 on non-P1 symbols is described below.

In DVB-T2, non-P1 symbols include symbols with CP signals and symbols without CP signals. The former are data symbols while the latter are P2 symbols and frame-closing symbols.

For SISO mode, with the exception of pilot pattern PP8, the final symbol of a given frame is fixed as a data symbol or as a frame-closing symbol according to a particular combination of a guard interval fraction and one of the pilot patterns PP1 through PP7. Specifically, the final symbol is fixed as a frame-closing symbol when the reciprocal of the sub-carrier interval (Dx·Dy) for SP signals set in the pilot patterns PP1 through PP7 is smaller than the set guard interval fraction, and is fixed as a data symbol otherwise. In addition, for MISO mode, and again with the exception of pilot pattern PP8, the final symbol is fixed as a frame-closing symbol. In FIG. 9, cases where frame-closing symbols do not exist are indicated with brackets.

Figure 10:
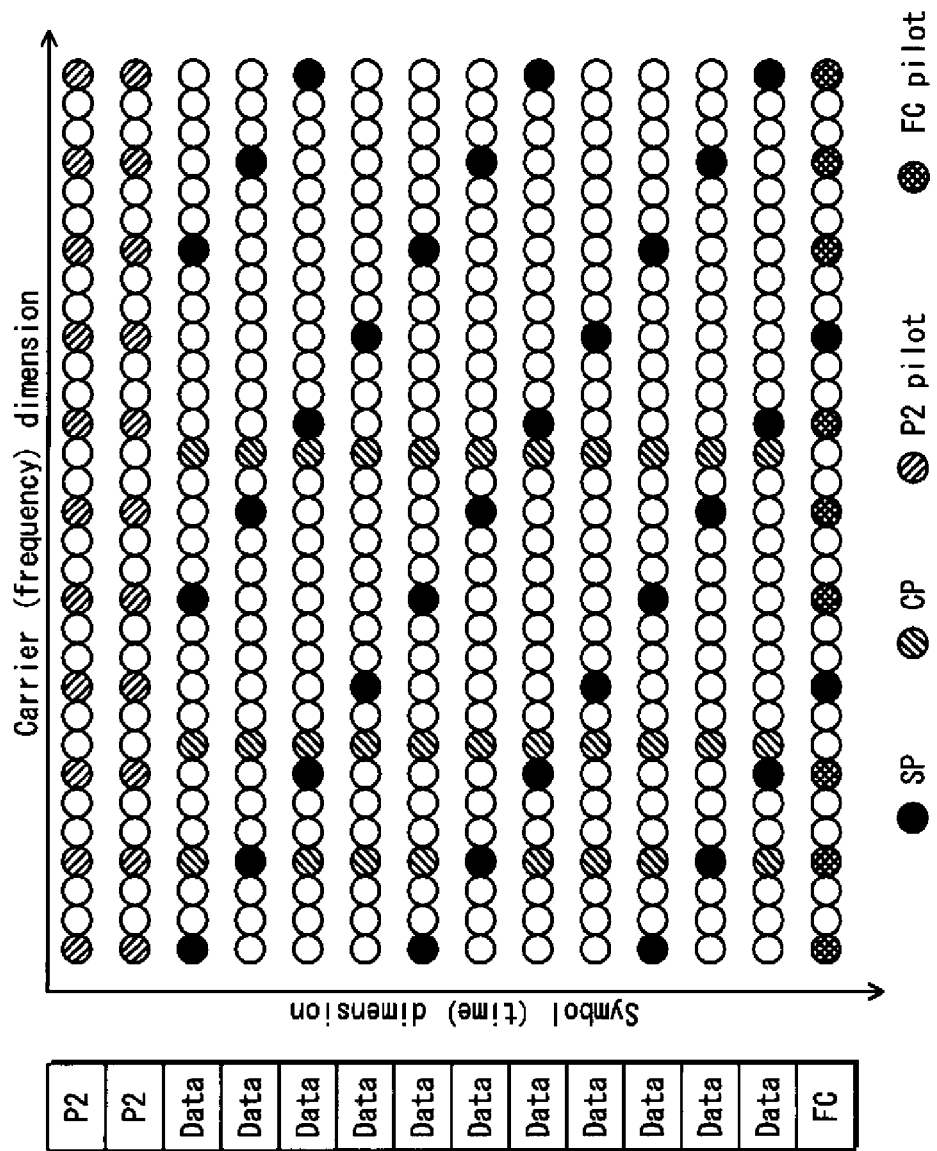
FIG. 10 is a schematic diagram showing the location of pilot signals in P2 symbols, data symbols, and frame-closing symbols.

FIG. 10 is a transmission format schematic diagram which includes P2 symbols, data symbols, and frame-closing symbols. In comparison to data symbols, frame-closing symbols include many pilot signals. This is done so that time direction interpolation can proceed smoothly as part of channel characteristics estimation. Additional pilot signals that are not SP signals are referred to as FC (frame-closing) pilot signals. CP signals are not found in frame-closing symbols due to such inclusion of many pilot signals.

Until the pilot pattern PP1 through PP8 and the guard interval fraction are known, the identity of the final symbol as a frame-closing symbol or a data symbol is unknown.

When calculating the wideband carrier frequency error for non-P1 symbols, the wideband $f_c$ error calculator 37 treats the final symbol of the frame as a frame-closing symbol, in which no CP signals are found. However, in DVB-T2, the number of symbols per DVB-T2 frame is transmitted by the P2 symbols. Thus, until a P2 symbol is decoded, the number of symbols per DVB-T2 frame is unknown, and as such, by detecting a P1 symbol for a subsequent frame, the preceding symbol is judged to have been a frame-final symbol.

Furthermore, the number of P2 symbols is uniquely determined by FFT size (see FIG. 40), and FFT size information can be found by decoding P1 symbols. The wideband $f_c$ error calculator 37 uses the FFT size information transmitted by the P1 symbols to distinguish P2 symbols from data symbols.

Reflecting the above, in the wideband $f_c$ error calculator 37, when both of the symbols used by the differential detector 201 for differential detection are data symbols, which include CP signals (frame-final symbols excepted), the correlators $202_1$ through $202_{16}$ perform correlation and the maximum value detector 203 performs maximum value detection, the wideband carrier frequency error is calculated, and the error so calculated is output to the $f_c$ corrector 32 of FIG. 2.

Also, in the wideband $f_c$ error calculator 37, when at least one of the symbols used by the differential detector 201 for differential detection is a symbol that does not include CP signals (i.e. P2 symbols or frame-final symbols), the output of the wideband carrier frequency error to the $f_c$ corrector 32 of FIG. 2 is halted or invalidated so that the correlators $202_1$ through $202_{16}$ do not perform correlation and the maximum value detector 203 does not perform maximum value detection.

(1) The wideband $f_c$ error calculator 37, which does not perform wideband carrier frequency error detection when at least one of the symbols used by the differential detector 201 for differential detection is a symbol that does not include CP signals (i.e. P2 symbols or frame-final symbols), is not limited to the above but may also be made to operate in other ways, such as the following examples.

(1-1) When one of the symbols used by the differential detector 201 for differential detection is a P2 symbol, which does not include CP signals, and the other such symbol is a leading data symbol, which does include CP signals, then correlation is performed by each of the correlators $202_1$ through $202_{16}$, maximum value detection is performed by the maximum value detector 203, and the wideband $f_c$ error calculator 37 calculates the wideband carrier frequency error then outputs the resulting wideband carrier frequency error to the $f_c$ corrector 32.

In such a case, each of the correlators $202_1$ through $202_{16}$ performs correlation using a location sequence in which elements corresponding to the positions of sub-carriers are set to one, and all other sequence elements are set to zero. The sub-carriers in question are sub-carriers where P2 pilot signals are arranged therein according to the FFT size and the carrier mode of the pilot pattern assigned in the P2 symbol, and where CP signals are arranged therein according to the FFT size of the pilot pattern assigned in the leading data symbol and the carrier mode. Each of the correlators $202_1$ through $202_{16}$ shifts each sub-carrier signal differential detection value input from the differential detector 201 by one sub-carrier unit along the carrier direction, and concurrently correlates an input sequence made up of the differential detection values for the sub-carrier signals and the above-described location sequence, then calculates the power of the correlated value. Next, the maximum value detector 203 performs maximum value detection and calculates the wideband carrier frequency error, then outputs the wideband carrier frequency error so calculated to the $f_c$ corrector 32 from FIG. 2.

It should be noted that while the above explanation mentions sub-carriers with CP signals arranged within according to the FFT size of the pilot pattern and the carrier mode assigned in the leading data symbol, sub-carriers with either SP signals or CP signals arranged within according to the FFT size of the pilot pattern and the carrier mode assigned in the leading data symbol, or sub-carriers with SP signals arranged within according to the FFT size of the pilot pattern and the carrier mode assigned in the leading data symbol may also be used. In these two cases, only a portion of the SP signal may, for instance, be used.

(1-2) When both of the symbols used by the differential detector 201 for differential detection are P2 symbols, which do not include CP signals, correlation is performed by each of the correlators $202_1$ through $202_{16}$, maximum value detection is performed by the maximum value detector 203, and the wideband $f_c$ error calculator 37 calculates the wideband carrier frequency error then outputs the resulting wideband carrier frequency error to the $f_c$ corrector 32.

In such a case, each of the correlators $202_1$ through $202_{16}$ performs correlation using a location sequence in which elements corresponding to the positions of a subset of sub-carriers where P2 pilot signals are arranged within according to the FFT size of the pilot pattern and the carrier mode assigned in the P2 symbol are set to one, and all other elements are set to zero. Each of the correlators $202_1$ through $202_{16}$ shifts each sub-carrier signal differential detection value input from the differential detector 201 by one sub-carrier unit along the carrier direction, and concurrently correlates an input sequence made up of the sub-carrier signal differential detection values and the above-described sequence, then calculates the power of the correlated value. Next, the maximum value detector 203 performs maximum value detection and calculates the wideband carrier frequency error, then outputs the wideband carrier frequency error so calculated to the $f_c$ corrector 32 from FIG. 2. However, the above-mentioned subset of the sub-carriers refers to, for example, sub-carriers with CP signals arranged within according to the FFT size of the pilot pattern and the carrier mode assigned in the leading data symbol. Preferentially, the subset of the sub-carriers should be non-periodical.

(1-3) After the P2 symbols have been decoded, the structure of the frames is made clear to the wideband $f_c$ error calculator 37, which can thus determine whether the final symbol of a frame so structured is a frame-closing symbol or a data symbol and may proceed to calculate the subsequent wideband carrier frequency error.

If the frame-final symbol is a data symbol, then the wideband $f_c$ error calculator 37 treats both of the symbols used for differential detection by the differential detector 201 as data symbols, in which CP signals are arranged, and proceeds as such for correlation by each of the correlators $202_1$ through $202_{16}$ as well as for wideband carrier frequency error calculation.

On the other hand, if the frame-final symbol is a frame-closing symbol, each of the correlators $202_1$ through $202_{16}$ performs correlation using a location sequence in which elements corresponding to the positions of a subset of the sub-carriers where CP signals are arranged therein according to the pilot pattern assigned in the data symbol that precedes the frame closing symbol and the FFT size of the carrier mode and where either SP signals or FC pilot signals are arranged therein according to the FFT size of the pilot pattern and the carrier mode assigned in the frame-closing symbol are set to one, and other sequence elements are set to zero. Each of the correlators $202_1$ through $202_{16}$ shifts each sub-carrier signal differential detection value input from the differential detector 201 by one sub-carrier unit along the carrier direction, concurrently correlates an input sequence made up of the differential detection values for the plurality of sub-carrier signals and the above-described sequence, then calculates the power of the correlated value. Next, the maximum value detector 203 performs maximum value detection and calculates the wideband carrier frequency error, then outputs the wideband carrier frequency error so calculated to the $f_c$ corrector 32 from FIG. 2.

It should be noted that while the above explanation mentions sub-carriers with CP signals arranged therein according to the FFT size of the pilot pattern and the carrier mode assigned in the data symbol that precedes the frame-closing symbol, sub-carriers with either CP signals or SP signals arranged within according to the FFT size of the pilot pattern and the carrier mode assigned in the data symbol that precedes the frame-closing symbol, or sub-carriers with SP signals arranged within according to the FFT size of the pilot pattern and the carrier mode assigned in the data symbol that precedes the frame-closing symbol may also be used. In these two cases, only a portion of the SP signal may, for instance, be used.

Similarly, the sub-carriers with either SP signals or FC signals arranged within according to the FFT size of the pilot pattern and the carrier mode assigned in the data symbol that precedes the frame-closing symbol may be replaced with sub-carriers with SP signals arranged within according to the FFT size of the pilot pattern and the carrier mode assigned in the frame-closing symbol, or sub-carriers with FC signals arranged within according to the FFT size of the pilot pattern and the carrier mode assigned in the frame-closing symbol may also be used. In these two cases, only a portion of the SP signal may, for instance, be used.

(2) The structure of the wideband $f_c$ error calculator 37 is such that different correlators are used in normal mode and in extended mode. However, the same correlators may be used for both modes.

For instance, the tap coefficient values in the correlators may be set to correspond to the location sequence found in normal mode, with the correlators operating in both normal mode and extended mode. In such a case, the detection range of the wideband $f_c$ error calculator 37 is greater and the two modes are distinguished according to the size of the shift corresponding to the maximum correlated value. In such a structure, the shift must be adjusted accordingly.

For example, if the FFT size is of 32 k, then as shown is FIG. 42, the number of sub-carriers in normal mode and in extended mode differs by 576, and in both modes the CP carrier positions are offset by 288 physical sub-carrier positions. As such, with reference to normal mode, the detection range extends from −304 to +16 sub-carriers (where − indicates leftward sub-carriers, i.e. sub-carriers with smaller numbers, and + indicates rightward sub-carriers, i.e. sub-carriers with larger numbers). Given that corrections are applied to wideband carrier frequency discrepancies using the P1 symbols, the wideband carrier frequency error in non-P1 symbols ought to be within the range of −16 to +16. Thus, if the detected shift is in the range of −16 to +16 sub-carriers, then normal mode is in use and that shift is used as the wideband carrier frequency error. Also, if the detected shift is in the range of −304 to −272, then extended mode is in use and so the detected shift is augmented by 288 before being used as the wideband carrier frequency error.

(3) As the P2 symbols are decoded, the control information collector 23 is able to collect the pilot pattern as well as the carrier mode, such information being transmitted with the P2 symbols. As such, after the P2 symbols are decoded, the wideband $f_c$ error calculator 37 may, for example, (3-1) have only those correlators which correspond to the pilot pattern and carrier mode transmitted with the P2 symbols operate and have the maximum value detector 203 observe only the output signals from such correlators to compute the wideband carrier frequency error, or (3-2) have all of the correlators operate and have the maximum value detector 203 observe only the output signals from correlators corresponding to the pilot pattern and carrier mode transmitted with the P2 symbols to compute the wideband carrier frequency error.

($f_c$ Corrector Variations)

(1) The structure of the $f_c$ corrector 32 is such that the error within the P1-symbol sub-carrier spacing detected in the P1 symbols (narrowband carrier frequency error) is used to apply corrections to carrier frequency discrepancies. However, the structure may be such that corrections to carrier frequency discrepancies are not applied thereby. For the signal input to the equaliser 39, the error within the P1-symbol sub-carrier spacing detected in the P1 symbols may instead be corrected using the carrier frequency error calculated by the narrowband $f_c$ calculator 35 and by the wideband $f_c$ calculator 37

Also, the structure of the $f_c$ corrector 32 is such that the error at the unit level of the P1 symbol sub-carrier spacing detected in the P1 symbols (wideband carrier frequency errors) is used to apply corrections to carrier frequency discrepancies. However, the structure may be such that corrections to carrier frequency discrepancies are not applied thereby. When carrier frequency discrepancies are constrained to a quarter of the number of useful sub-carriers ($\Delta f/2$, where $\Delta f$ is half the difference in number of useful sub-carriers) in normal mode and in extended mode, corrections to carrier frequency discrepancies need not be applied to the wideband carrier frequency error detected in the P1 symbols.

Embodiment 2

Embodiment 2 of the present invention is described below with reference to the figures. It should be noted that those structural elements of Embodiment 2 which are substantially equivalent to structural elements of Embodiment 1 use identical reference numbers and are here omitted as Embodiment 1 may be referred to for explanations thereof.

The wideband $f_c$ error calculator 37 of Embodiment 1 has a number of correlators $202_1$ through $202_{16}$ that is equal to the number of combinations pilot pattern and carrier mode, and correlation is performed in parallel on the CP signal location pattern of all such combinations.

In contrast, the wideband $f_c$ error calculator 37A of Embodiment 2 uses a single correlator 202A to perform correlation on the CP signal location pattern of all combinations of pilot pattern and carrier mode in serial order.

Figure 11:
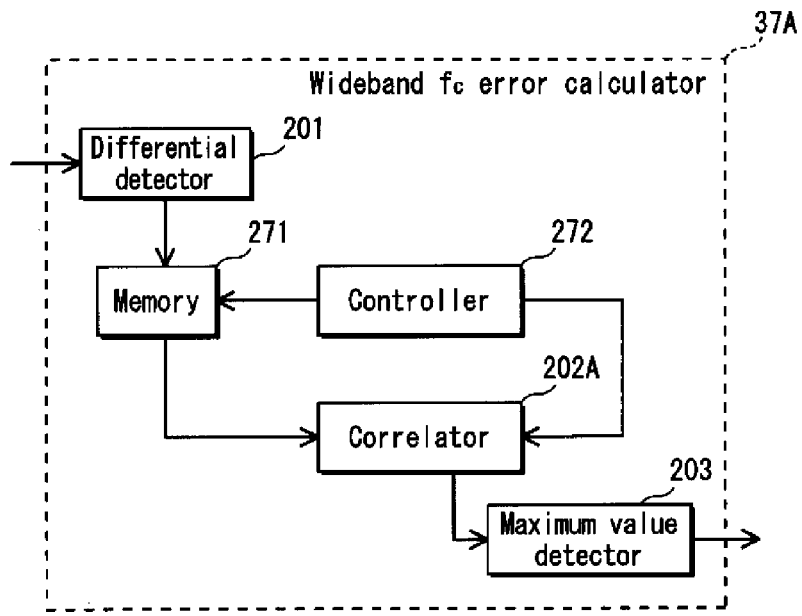
FIG. 11 is a configuration diagram of the wideband $f_c$ error calculator pertaining to Embodiment 2.

The wideband $f_c$ error calculator 37A of Embodiment 2 is described below with reference to FIG. 11. As shown, the wideband $f_c$ error calculator 37A of Embodiment 2 comprises a differential detector 201, a memory 271, a controller 272, a correlator 202A having a structure substantially identical to that shown in FIG. 8, and a maximum value detector 203.

Given that the wideband $f_c$ error calculator 37A uses the single correlator 202A for correlation of the CP signal location pattern for all combinations of pilot pattern and carrier mode, there is a need to store the sub-carrier differential detection values output from the differential detector 201. Thus, the sub-carrier signal differential detection values obtained by the differential detector 201 are stored in the memory 271.

The controller 272 controls the correlator 202A so that correlation thereby is performed in order on an active combination of pilot pattern and carrier mode. Then, the controller 272 sets the tap coefficient values $K_0$ through $K_N$ of the correlator 202A to one in response to the location of CP carriers as defined by the CP signal location pattern according to the pilot pattern and the FFT size of the currently active carrier mode, and to zero otherwise.

Also, the controller 272 controls the supply of the sub-carrier signal differential detection values from the memory 271 to the correlator 202A. For each differential detection value so supplied, the correlator 202A performs correlation using the sub-carrier signal differential detection values supplied from the memory 271 and the tap coefficient values $K_0$ through $K_N$ set by the controller 272, then outputs the result to the maximum value detector 203.

Embodiment 3

Embodiment 3 of the present invention is described below with reference to the figures. It should be noted that those structural elements of Embodiment 3 which are substantially equivalent to structural elements of Embodiment 1 use identical reference numbers and are here omitted as Embodiment 1 may be referred to for explanations thereof.

The wideband $f_c$ error calculator 37B of Embodiment 3 and the wideband $f_c$ error calculator 37C of the later-described Embodiment 4 have a smoothing function for the signals output from the differential detector 201 in addition to the functions of the wideband $f_c$ error calculator 37 from Embodiment 1.

Figure 12:
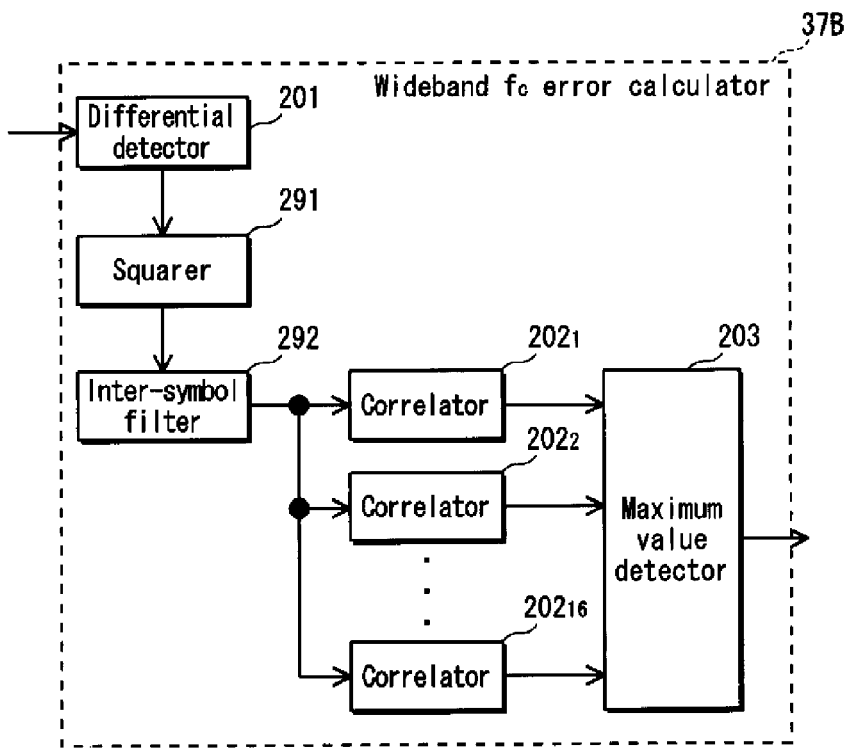
FIG. 12 is a configuration diagram of the wideband $f_c$ error calculator pertaining to Embodiment 3.

The wideband $f_c$ error calculator 37B of Embodiment 3 is described below with reference to FIG. 12. As shown, the wideband $f_c$ error calculator 37B comprises the structure of the wideband $f_c$ error calculator 37 (see FIG. 6) as well as a squarer 291 and an inter-symbol filter 292.

The differential detection signals output from the differential detector 201 are input to the squarer 291. The squarer 291 squares the sub-carrier differential detection signals so input and outputs the squared signals so obtained to the inter-symbol filter 292. The inter-symbol filter 292 performs symbol direction smoothing of the squared signals input from the squarer 291 for each of the sub-carriers, and outputs the signals so smoothed to the correlators $202_1$ through $202_{16}$. The correlators $202_1$ through $202_{16}$ then perform correlation using the smoothed signals output from the inter-symbol filter 292 rather than the signals output from the differential detector 201.

Through such symbol direction smoothing, the CP carrier vectors are emphasized and the correlated maximum value thereof made apparent. This, in turn, enhances the accuracy of wideband carrier frequency error detection.

Embodiment 4

Before the description of Embodiment 4, the polarity of SP signals and of CP signals in the DVB-T2 scheme is briefly explained.

The polarity of SP signals and of CP signals in the DVB-T2 scheme is assigned by exclusive-OR of a PRBS (Pseudorandom Binary Sequence) and a PN (Pseudorandom Noise) sequence along the carrier direction.

The PBRS is a binary sequence as indicated below in (Math. 3) where 11111111111 may be used as the initial sequence.

$$x^{11}+x^2+x \tag{Math. 3}$$

The PN sequence is shown in FIG. 13. The sequence shown in FIG. 13 is in hexadecimal. The PN sequence is used consecutively for every symbol, and returns to the starting point for the frame-initial symbol.

Based on the exclusive-OR in the below-inscribed (Math. 4) of $w_k$ for the PBRS carrier position k and $p_l$ for the PN sequence symbol position l, the polarity $c_1$ of SP signals and of CP signals is determined according to the carrier position k and the symbol position l as in the below-inscribed (Math. 5).

$$r_{k,l}=w_k \oplus p_l \tag{Math. 4}$$

Where S is the exclusive-OR operator.

$$c_{k,l}=1-2r_{k,l} \tag{Math. 5}$$

Embodiment 4 of the present invention is described below with reference to the figures. It should be noted that those structural elements of Embodiment 4 which are substantially equivalent to structural elements of Embodiment 1 use identical reference numbers and are here omitted as Embodiment 1 may be referred to for explanations thereof.

Figure 14:
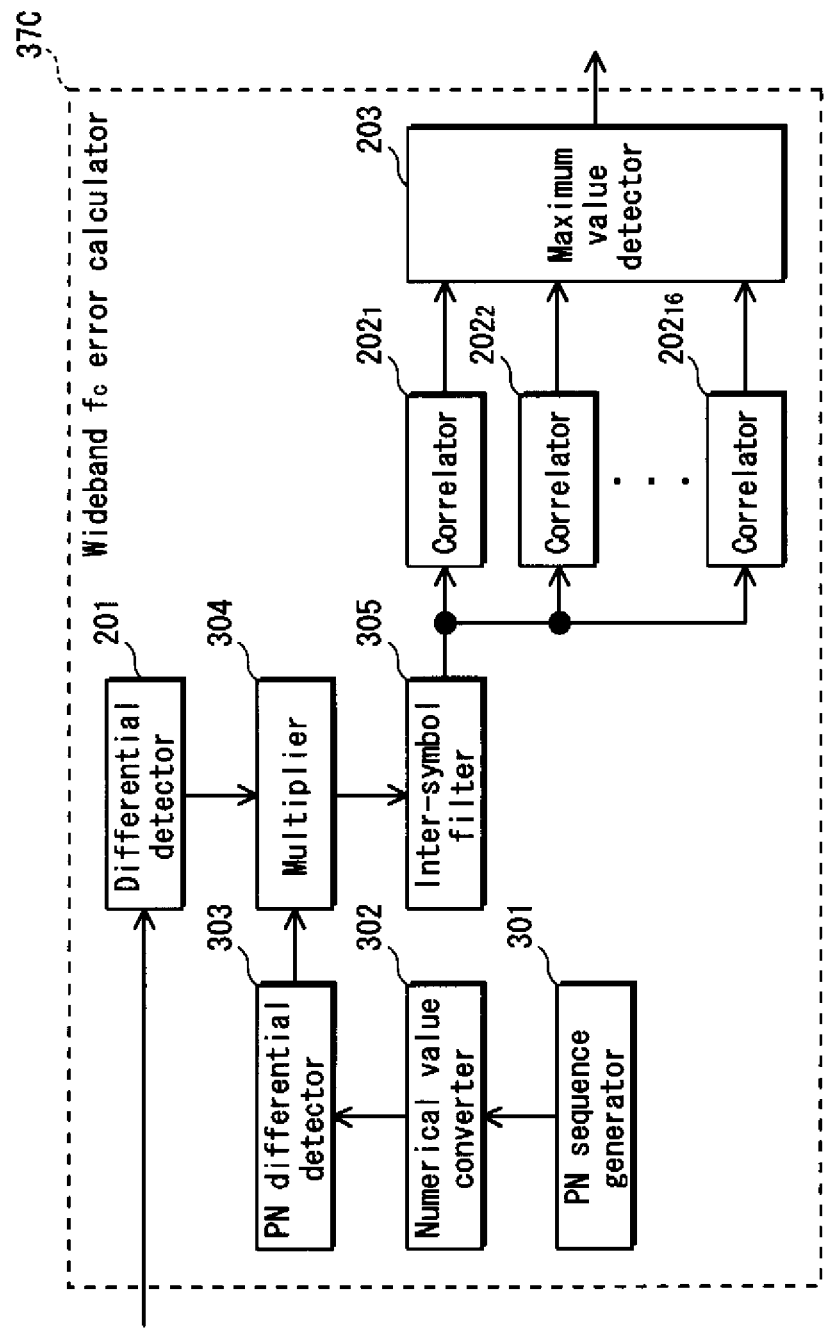
FIG. 14 is a configuration diagram of the wideband $f_c$ error calculator pertaining to Embodiment 4.

The wideband $f_c$ error calculator 37C of Embodiment 4 is described below with reference to FIG. 14. As shown, the wideband $f_c$ error calculator 37C comprises the structure of the wideband $f_c$ error calculator 37 (see FIG. 6) as well as the additional elements of a PN sequence generator 301, a numerical value converter 302, a PN differential detector 303, a multiplier 304, and an inter-symbol filter 305.

Using the frame-initial symbol for reference, the PN sequence generator 301 generates the PN sequence shown in FIG. 13 and outputs the PN sequence so generated to the numerical value converter 302. The PN sequence generator 301 may also be a logic circuit. Furthermore, the PN sequence generator 301 may also write the PN sequence from FIG. 13 to memory and read out values corresponding to the symbol numbers therefrom.

The numerical value converter 302 converts the numerical values of the PN sequence input from the PN sequence generator 301 using the below-inscribed (Math. 6), then outputs the signals of the sequence so obtained to the PN differential detector 303. In (Math. 6), $c_l$ indicates the polarity of the signals at symbol position l and $p_l$ indicates the value of the PN sequence at symbol position l.

$$c_l = 1 - 2p_l \qquad \text{(Math. 6)}$$

The PN differential detector 303 performs inter-symbol differential detection on the signals of the sequence input from the numerical value converter 302 and outputs the resulting signals (hereinafter referred to as PN differential detection signals) to the multiplier 304. The multiplier 304 multiplies the differential detection signals input from the differential detector 201 by the PN differential detection signals input from the PN differential detector 303 for every sub-carrier, and then outputs the resulting signals to the inter-symbol filter 305. The inter-symbol filter 305 performs smoothing of the signals input from the multiplier 304 for every sub-carrier, and then outputs the signals so smoothed to the correlators $202_1$ through $202_{16}$. The correlators $202_1$ through $202_{16}$ perform correlation using the signals output from the inter-symbol filter 305 rather than the signals output from the differential detector 201.

Thus, vector differences arising in every symbol of the signals output from the differential detector 201 due to PN sequence-based polarity can be corrected for, and by input thereof to the inter-symbol filter 305, inter-symbol smoothing can be realised. As such, the CP carrier vectors are emphasized and the interpolated maximum value therein made apparent. This, in turn, enhances the accuracy of wideband carrier frequency error detection.

It should be noted that the structure of the wideband $f_c$ error calculator is not limited to that shown in FIGS. 6, 11, 12, and 14. Any structure may be used in which error is calculated at the unit level of the sub-carrier spacing for the non-P1 symbols.

Embodiment 5

Embodiment 5 of the present invention is described below with reference to the figures. It should be noted that those structural elements of Embodiment 5 which are substantially equivalent to structural elements of Embodiment 1 use identical reference numbers and are here omitted as Embodiment 1 may be referred to for explanations thereof.

The structure of the demodulator 13 of Embodiment 1 is such that corrective feedback is applied to carrier frequency discrepancies in the output signals from the quadrature demodulator 31 using the wideband carrier frequency error output from the wideband $f_c$ error calculator 37.

In contrast, the structure of the demodulator 13D of Embodiment 5 is such that corrections are applied to carrier frequency discrepancies in the output signals from the orthogonal transformer 36 using the wideband carrier frequency error output from the wideband $f_c$ error calculator 37.

The demodulator 13D of Embodiment 5 is described below with reference to FIG. 15. As shown, the demodulator 13D contains a demodulator core 22D which comprises the structure of the demodulator core 22 of the demodulator 13 (see FIG. 2) with a few modifications, namely the replacement of the $f_c$ corrector 32 by the $f_c$ corrector 32D, and the addition of a $f_c$ corrector 45.

The $f_c$ corrector 32D generates a corrected carrier frequency based on the narrowband carrier frequency error and the wideband carrier frequency error detected thus far by the P1 demodulator 33, as well as on the narrowband carrier frequency error calculated thus far by the narrowband $f_c$ error calculator 35. The $f_c$ corrector 32D then accordingly applies corrections to carrier frequency discrepancies in the output signals from the quadrature demodulator 31.

The wideband carrier frequency error calculated by the wideband $f_c$ error calculator 37 is output to the $f_c$ corrector 45.

The $f_c$ corrector 45 applies corrections to carrier frequency discrepancies in the frequency-domain complex baseband signals output from the orthogonal transformer 36 based on the wideband carrier frequency error calculated by the wideband $f_c$ error calculator 37. Then, the $f_c$ corrector 45 outputs frequency-domain complex baseband signals in which carrier frequency discrepancies have been corrected to the channel characteristics estimator 38 and to the equaliser 39.

Figure 15:
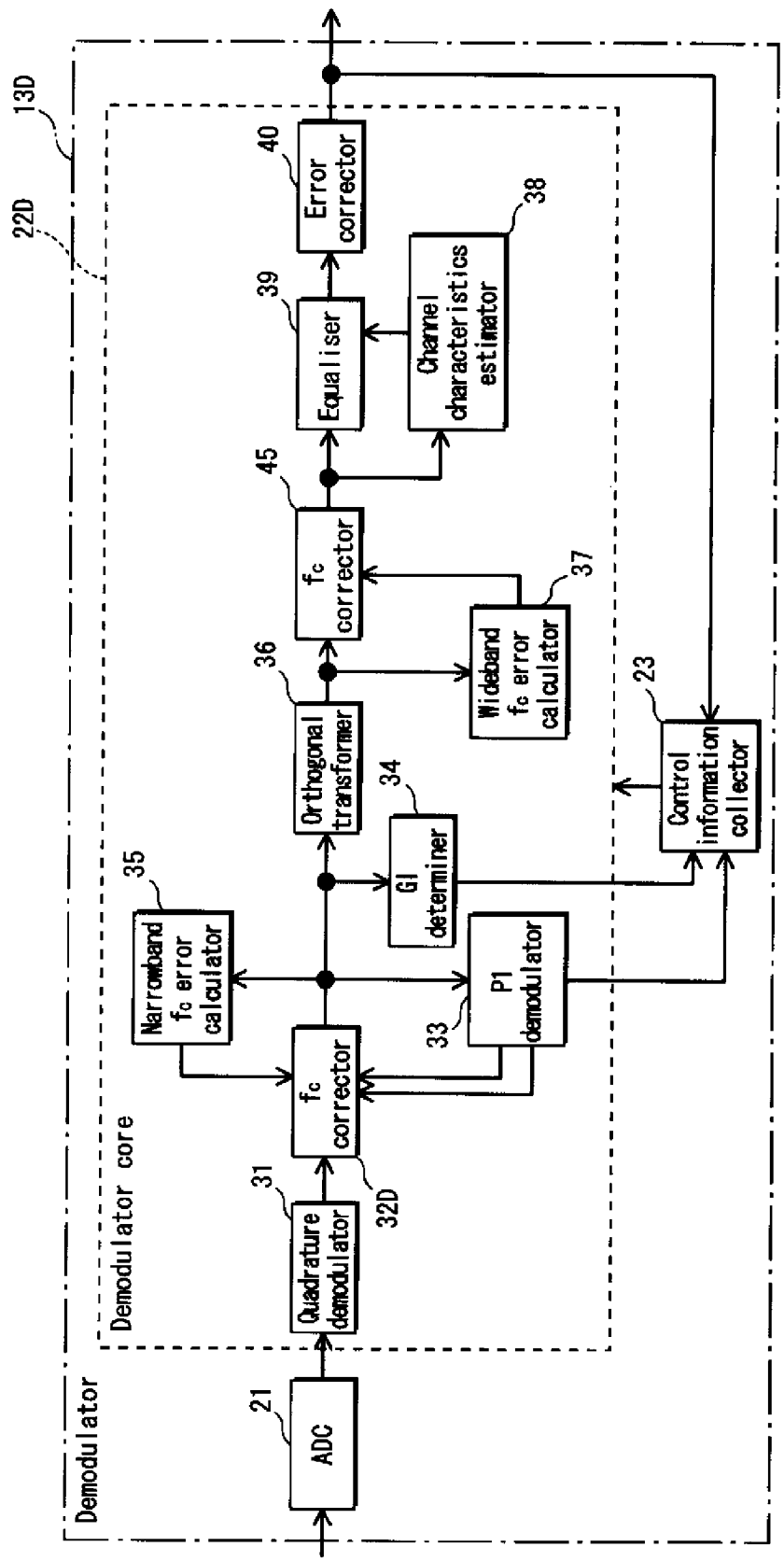
FIG. 15 is a configuration diagram of the demodulator pertaining to Embodiment 5.

It should be noted that the structure is not limited to that shown in FIGS. 2 and 15, but may differ as long as corrections are applied to carrier frequency discrepancies based on the wideband carrier frequency error calculated by the wideband $f_c$ error calculator 37

Embodiment 6

Embodiment 6 of the present invention is described below with reference to the figures. It should be noted that those structural elements of Embodiment 6 which are substantially equivalent to structural elements of Embodiment 1 use identical reference numbers and are here omitted as Embodiment 1 may be referred to for explanations thereof.

In contrast to the demodulator 13 of Embodiment 1, the demodulators of Embodiment 6 and of the later-described Embodiment 7 have an additional function by which non-P1 symbol wideband carrier frequency error is calculated upon narrowing down the pilot patterns that may actually be in use through the FFT size, the guard interval fraction, and SISO/MISO information.

The demodulator 13E of Embodiment 6 is described below with reference to FIG. 16. As shown, the demodulator 13E comprises an ADC 21, a demodulator core 22E, and a control information collector 23E. The demodulator core 22E comprises the structure of the demodulator core 22 (see FIG. 6) modified in that the wideband $f_c$ error calculator 37 is replaced by the wideband $f_c$ error calculator 37E.

As shown in FIG. 39, only a subset of the pilot patterns PP1 through PP8 fits a given combination of FFT size, SISO/MISO information, and guard interval fraction (four pilot patterns at most).

The control information collector 23E uses the FFT size information and the SISO/MISO information received from the P1 demodulator 33 as well as the guard interval fraction received from the GI determiner 34 to narrow down a subset of pilot patterns that may be in use among the pilot patterns PP1 through PP8, then outputs this subset of pilot patterns (hereinafter referred to as pilot pattern candidates) to the wideband $f_c$ error calculator 37E within the demodulator core 22E.

Figure 16:
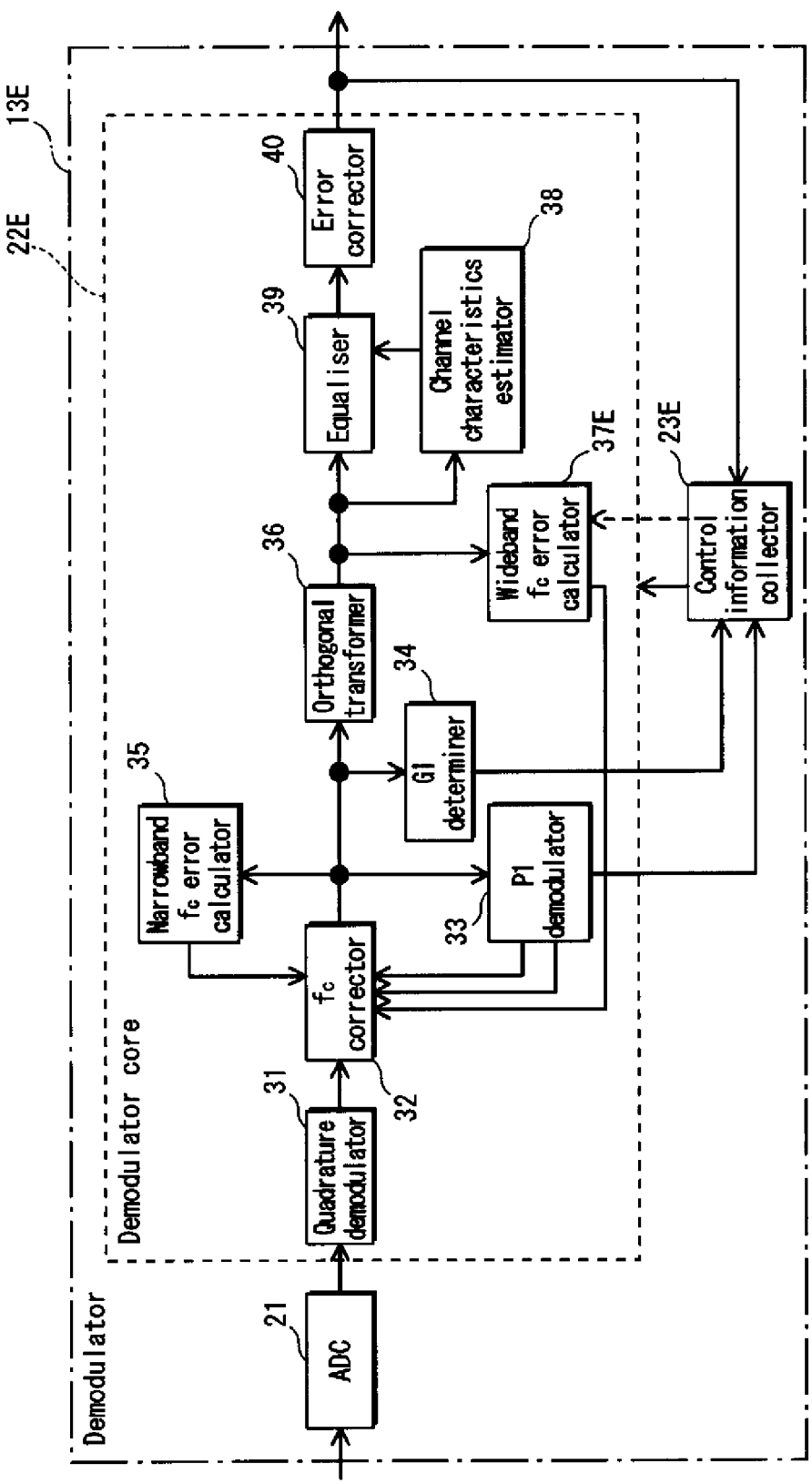
FIG. 16 is a configuration diagram of the demodulator pertaining to Embodiment 6.

The wideband $f_c$ error calculator 37E of FIG. 16 is described below with reference to FIG. 17. As shown, the wideband $f_c$ error calculator 37E comprises the structure of the wideband $f_c$ error calculator 37 (see FIG. 6) modified in that the maximum value detector 203 is replaced by the maximum value detector 203E.

The maximum value detector 203E receives the pilot pattern candidate information from the control information collector 23E. The maximum value detector 203E observes the correlated values output only from the correlators corresponding to each of the pilot pattern candidates in normal mode and in extended mode, detects the maximum correlated value, then outputs the shift at the time this maximum value was taken as the wideband carrier frequency error to the $f_c$ corrector 23 from FIG. 16.

As such, the potential for maximum value misjudgement based on a CP signal location pattern in normal mode or in extended mode of a pilot pattern that does not fit the FFT size, the SISO/MISO information, and the guard interval fraction can be reduced. This, in turn, enhances the accuracy of wideband carrier frequency error detection.

Embodiment 7

Embodiment 7 of the present invention is described below with reference to the figures. It should be noted that those structural elements of Embodiment 7 which are substantially equivalent to structural elements of Embodiment 1 use identical reference numbers and are here omitted as Embodiment 1 may be referred to for explanations thereof.

The wideband $f_c$ error calculator 37F of Embodiment 7 is described below with reference to FIG. 18. As shown, the wideband $f_c$ error calculator 37F comprises a differential detector 201, correlators $202F_1$ through $202F_8$, the structure of which is substantially equivalent to that shown in FIG. 8, and a maximum value detector 203F.

As shown in FIG. 39, only a subset of the pilot patterns PP1 through PP8 fit a given combination of FFT size, SISO/MISO information, and guard interval fraction, for a maximum of four pilot patterns per such combination. Furthermore, there are two carrier modes, namely normal mode and extended mode. In consideration of the above, correlation can be performed for the CP signal location pattern according to the FFT size corresponding to each combination of pilot pattern and carrier mode despite comprising only the eight correlators $202F_1$ through $202F_8$.

Thus, circuit scale can be reduced in the wideband $f_c$ error calculator 37F by comprising only the eight correlators $202F_1$ through $202F_8$.

The maximum value detector 203F receives the pilot pattern candidate information from the control information collector 23E of FIG. 16. The maximum value detector 203F assigns a distinct CP signal location pattern to each of the correlators $202F_1$ through $202F_8$ according to one FFT size among the combination of received carrier mode and pilot pattern candidates.

Each of the correlators $202F_1$ through $202F_8$ shifts the sub-carrier signal differential detection values input from the differential detector 201 by one sub-carrier unit in the carrier direction while simultaneously correlating an input sequence made up of the sub-carrier differential detection values and the location sequence of the CP carriers, which is determined by the assigned CP signal location pattern (wherein sequence elements corresponding to a CP carrier position are set to one, and other sequence elements are set to zero), calculates an interpolated power value, and outputs this power value to the maximum value detector 203F.

The maximum value detector 203F observes only the power values output from the correlators $202F_1$ through $202F_8$ corresponding to each of the pilot patterns in normal mode and in extended mode, detects the maximum power value, then outputs the shift taken from this maximum correlated value as the wideband carrier frequency error to the $f_c$ corrector 23 from FIG. 16.

Accordingly, the potential for maximum value misjudgement based on a CP signal location pattern in normal mode or in extended mode of a pilot pattern that does not fit the FFT size, the SISO/MISO information, and the guard interval fraction can be reduced. This, in turn, enhances the accuracy of wideband carrier frequency error detection.

Embodiments 6 and 7 are both described as narrowing down the possible pilot patters through a combination of FFT size, SISO/MISO information, and guard interval fraction. However, these Embodiments are not limited to the above, but may instead, for example, narrow down the pilot patterns through a combination of the FFT size and guard interval fraction only.

Furthermore, Embodiments 6 and 7 may use the guard interval length or other such guard interval-related information instead of the guard interval fraction.

Figure 17:
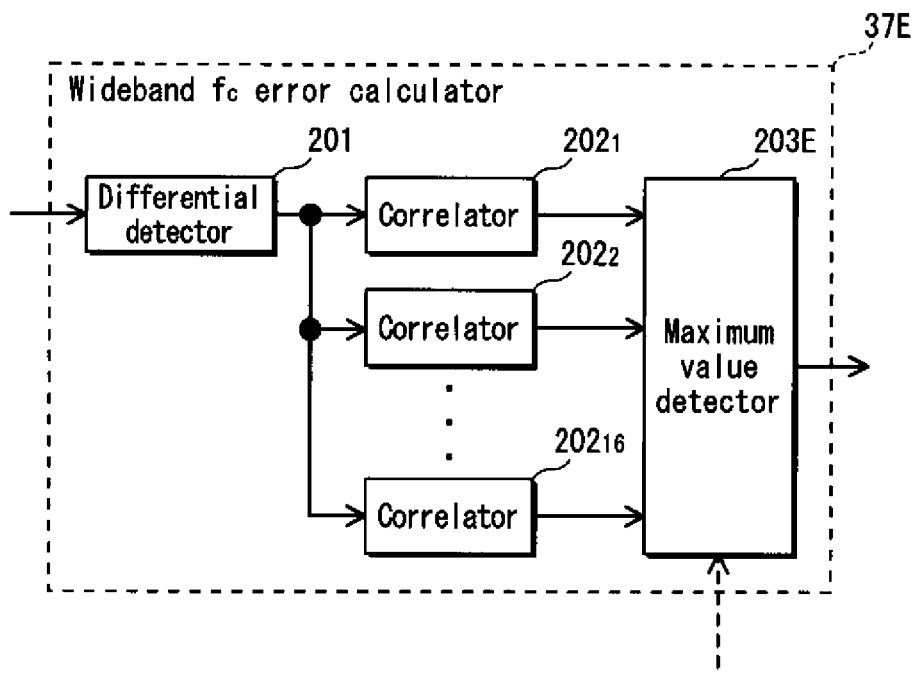
FIG. 17 is a configuration diagram of the wideband $f_c$ error calculator from FIG. 16.
Figure 18:
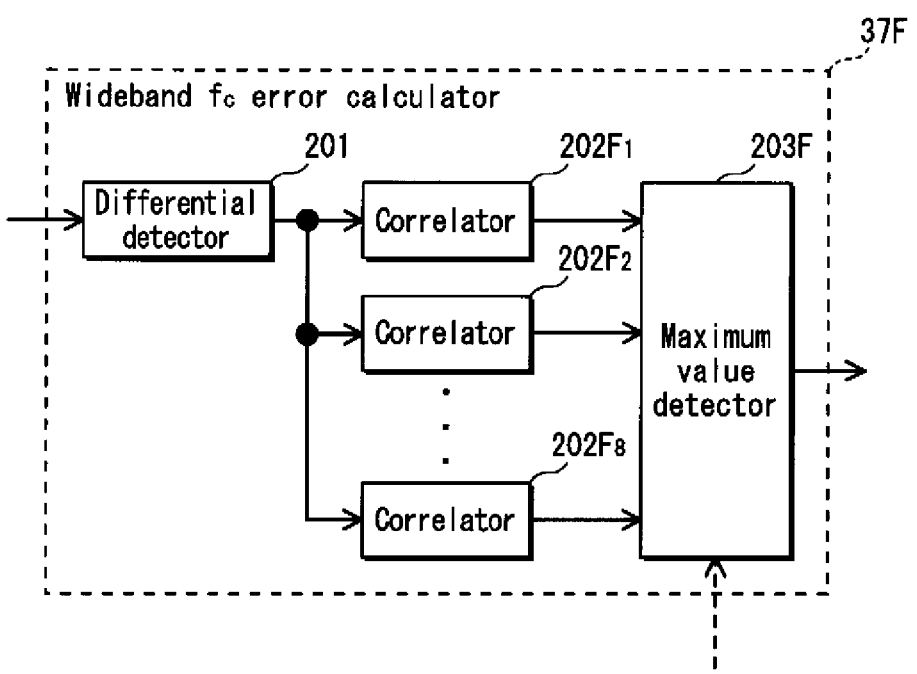
FIG. 18 is a configuration diagram of the wideband $f_c$ error calculator pertaining to Embodiment 7.

It should be noted that the structure of the wideband $f_c$ error calculator is not limited to that shown in FIGS. 17 and 18. For instance, the structure of the wideband $f_c$ error calculator described for Embodiments 2 through 4 may, for example, employ a demodulator that narrows down the possible pilot patterns through a combination of FFT size, SISO/MISO information, and guard interval fraction, or may employ a demodulator that performs such narrowing through a combination of the FFT size and guard interval. Also, these Embodiments may make use of the structure of the wideband $f_c$ error calculator explained as in Variation (2) of the wideband $f_c$ error calculator of Embodiment 1.

It should also be noted that the wideband $f_c$ error calculators 37E and 37F may also process non-P1 symbols as explained in Embodiment 1, and furthermore, may do so as described in Variations (1) and (3) of the wideband $f_c$ error calculator of Embodiment 1.

Embodiment 8

Embodiment 8 of the present invention is described below with reference to the figures. It should be noted that those structural elements of Embodiment 8 which are substantially equivalent to structural elements of Embodiment 1 use identical reference numbers and are here omitted as Embodiment 1 may be referred to for explanations thereof.

The demodulator 13G of Embodiment 8 is able to begin channel characteristics estimation sooner than the demodulator 13 of Embodiment 1.

The demodulator 13G of Embodiment 8 is described below with reference to FIGS. 19 through 21.

Figure 19:
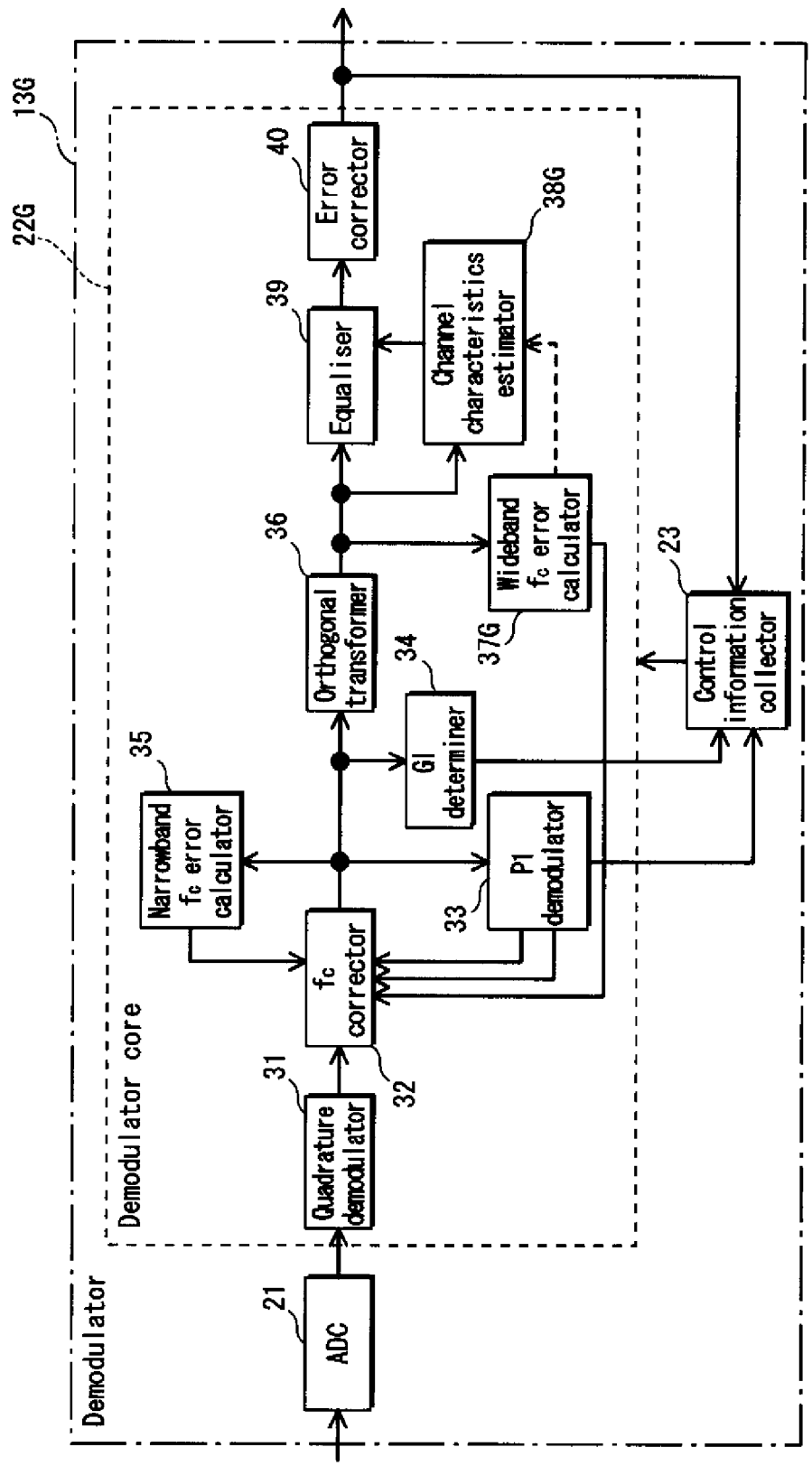
FIG. 19 is a configuration diagram of the demodulator pertaining to Embodiment 8.

FIG. 19 is a configuration diagram of the demodulator 13G of Embodiment 8. The demodulator 13G comprises the structure of the demodulator 13 (see FIG. 2), modified in that the wideband $f_c$ error calculator 37 and the channel characteristics estimator 38 are replaced by the wideband $f_c$ error calculator 37G and the channel characteristics estimator 38G, respectively.

Figure 20:
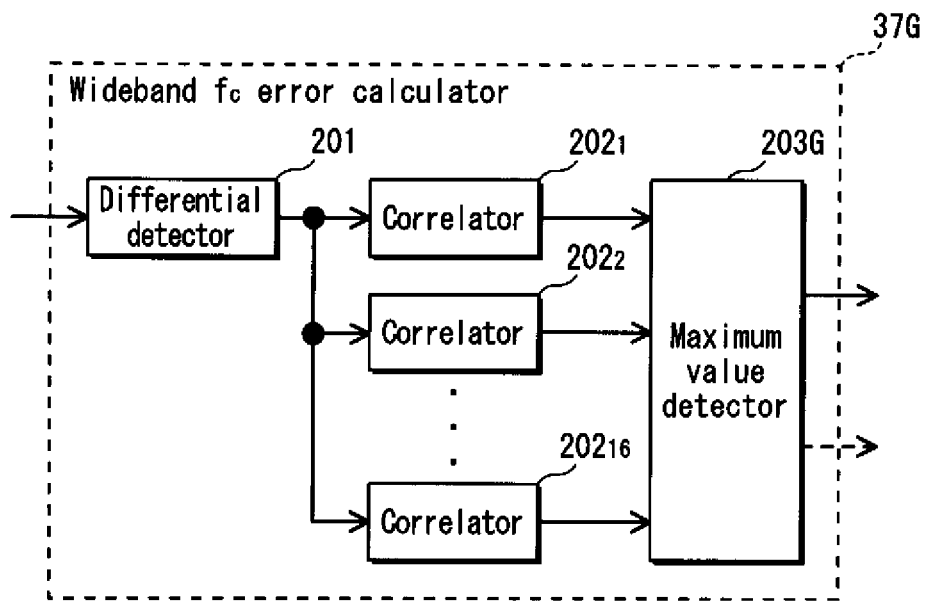
FIG. 20 is a configuration diagram of the wideband $f_c$ error calculator from FIG. 19.

FIG. 20 shows the configuration of the wideband $f_c$ error calculator 37G. As shown, the wideband $f_c$ error calculator 37G comprises the structure of the wideband $f_c$ error calculator 37 (see FIG. 6), modified in that the maximum value detector 203 is replaced by the maximum value detector 203G.

In addition to the functions of the maximum value detector 203, the maximum value detector 203G estimates the pilot pattern and carrier mode assigned to the maximum correlated value as those actually in use, and then outputs the pilot pattern and carrier mode so estimated to the channel characteristics estimator 38G of FIG. 19.

Figure 21:
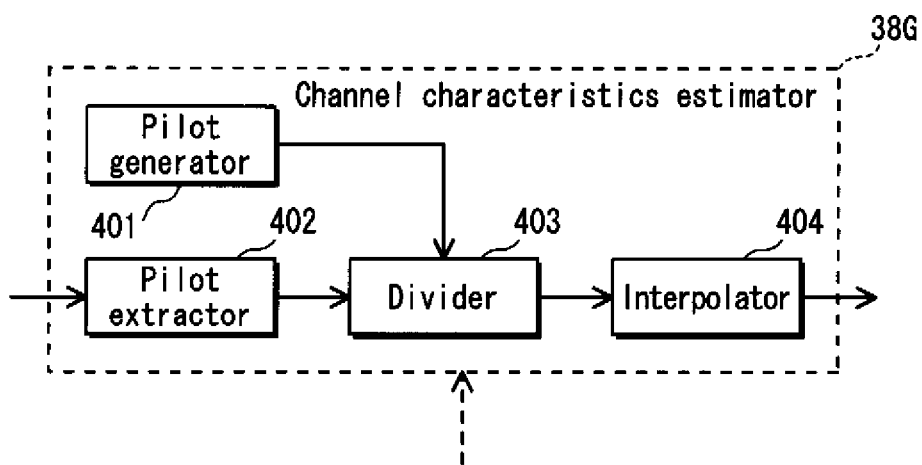
FIG. 21 is a configuration diagram of the channel characteristics estimator from FIG. 19.

The configuration of the channel characteristics estimator 38G is shown in FIG. 21. As shown, the channel characteristics estimator 38G comprises a pilot generator 401, a pilot extractor 402, a divider 403, and an interpolator 404.

Before the P2 symbols are decoded, the channel characteristics estimator 38G uses the pilot pattern and carrier mode estimated by the maximum value detector 203G within the wideband $f_c$ error calculator 37G to estimate the P2 pilot signal location pattern, the SP signal location pattern (scattered-pilot pattern), and the FC pilot signal location pattern.

Then, also before the P2 symbols are decoded, the channel characteristics estimator 38G begins to estimate the channel characteristics based on each of the P2 pilot signal, SP signal, and FC pilot signal location patterns previously estimated, and estimates the channel characteristics demonstrated as the amplitude and phase displacement imparted by the channel of the output signals from the orthogonal transformer 36.

The pilot generator 401 generates P2 pilot signals, SP signals, and FC pilot signals known to the receiver, then outputs the P2 pilot signals, SP signals, and FC pilot signals so generated to the divider 403.

The signals output from the orthogonal transformer 36 are supplied to the pilot extractor 402. The pilot extractor 402 uses the P2 pilot signal location pattern, the SP signal location pattern (scattered-pilot pattern), and the FC pilot signal location pattern to extract P2 pilot signals, SP signals, and FC pilot signals from the supplied signals, then outputs the P2 pilot signals, SP signals, and FC pilot signals so extracted to the divider 403.

The divider 403 calculates the channel characteristics that have influenced the SP signals, P2 pilot signals, and FC pilot signals by dividing the signals input from the pilot extractor 402 by the signals input from the pilot generator 401, then outputs the channel characteristics so calculated to the interpolator 404.

The P2 pilot signals, SP signals, and FC signals are in a scattered, incomplete state. As such, the interpolator 404 uses the channel characteristics calculated using the P2 pilot signals, SP signals, and FC pilot signals to perform interpolation on the channel characteristics, obtains channel characteristics for all of the sub-carriers, and outputs the channel characteristics so obtained to the equaliser 39 of FIG. 19. Widely-known methods where interpolation is carried out along the time axis (symbol) direction, and then carried out along the frequency axis (carrier) direction, or where interpolation is carried out along the frequency axis (carrier) direction only and similar methods may also be used.

The channel characteristics estimator 38G requires the location patterns of the P2 pilot signals, SP signals, and FC pilot signals in order to carry out the above-described channel characteristics estimation.

If the FFT size is known, then the number of P2 symbols can be known. Similarly, if the FFT size and the SISO/MISO information are both known, then the P2 pilot signal location pattern can be known. If the pilot pattern or the carrier mode is known, then the SP signal location pattern can be known.

From the guard interval fraction and the pilot pattern, the frame-final symbol can be identified as either a frame-closing symbol or a data symbol. Also, when a P1 symbol is detected, the preceding symbol is known to have been a frame-final symbol. In frame-closing symbols, the sub-carrier interval at which the pilot pattern composed of SP signals and FC pilot signals is arranged is fixed. Thus, the FC pilot signal location pattern can be known.

If the FFT size and the carrier mode are known, then the number of useful sub-carriers can be known.

In consideration of the above, the channel characteristics estimator 38G makes use of the FFT size information and SISO/MISO information extracted from the P1 symbols, as well as the guard interval fraction, in addition to the pilot pattern and the carrier mode estimated by the maximum value detector 203G within the wideband $f_c$ error calculator 37G. Thus, the channel characteristics estimator 38G can begin to estimate channel characteristics before the P2 symbols are decoded, which in turn makes earlier equalisation possible.

After the pilot pattern and the carrier mode are extracted from the P2 symbols, the channel characteristics estimator 38G may use these instead of the pilot pattern and the carrier mode received from the wideband $f_c$ error calculator 37G to estimate the location patterns of the P2 pilot signals, SP signals, and FC pilot signals and to perform estimation of channel characteristics.

Also, the wideband $f_c$ error calculator 37G is not limited in application to the structure of the wideband $f_c$ combiner 37 of FIG. 6, but may also be applied to other structures, such as for example that of the wideband $f_c$ error calculators explained in Embodiments 1 through 4, 6, and 7, or to the Variations thereof.

In addition, the wideband $f_c$ error calculator 37G may be realised so as to only perform detection of the pilot pattern and carrier mode through the maximum value detector 203G without calculating the wideband carrier frequency error of the detection range as one sub-carrier. In such a case, the error at the unit level of the non-P1 symbol sub-carrier spacing (wideband carrier frequency error) is not calculated, and thus no corrections to carrier frequency discrepancies are applied based on such spacing.

Embodiment 9

Embodiment 9 of the present invention is described below with reference to the figures. It should be noted that those structural elements of Embodiment 9 which are substantially equivalent to structural elements of Embodiment 1 use identical reference numbers and are here omitted as Embodiment 1 may be referred to for explanations thereof.

The demodulator 13 of Embodiment 1 uses the time-domain complex baseband signals to calculate the non-P1 symbol narrowband carrier frequency error.

In contrast, the demodulator 13H of Embodiment 9 and the demodulator 13I of the later-described Embodiment 10 use the frequency-domain complex baseband signals to calculate the non-P1 symbol narrowband carrier frequency error.

Figure 22:
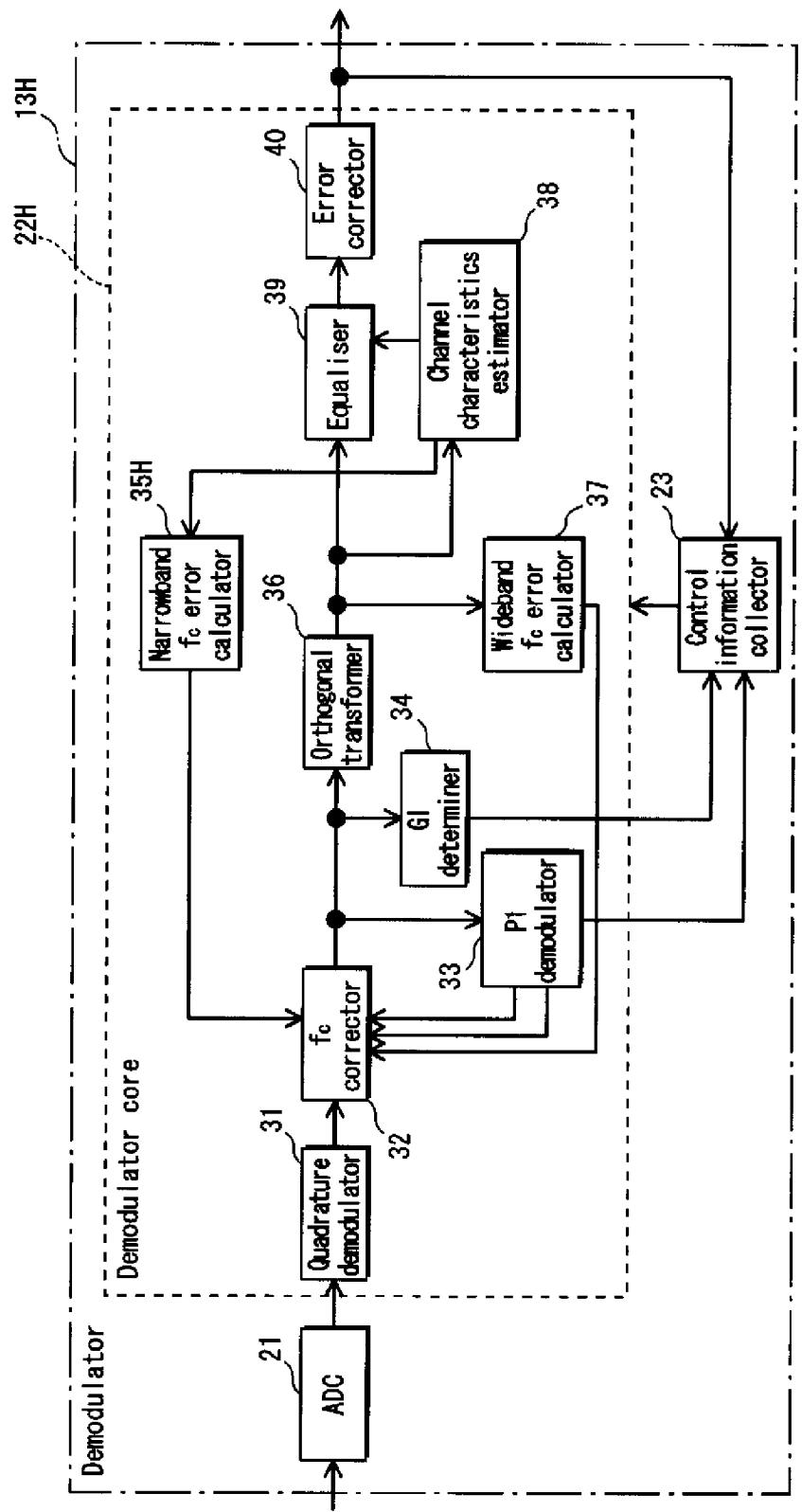
FIG. 22 is a configuration diagram of the demodulator pertaining to Embodiment 9.

The demodulator 13H of Embodiment 9 is described below with reference to FIG. 22. As shown, the demodulator core 22H of the demodulator 13H comprises the structure of the demodulator core 22 of the demodulator 13 (see FIG. 2) modified in that the narrowband $f_c$ error calculator 35 has been removed, and a narrowband $f_c$ error calculator 35H has been added.

Figure 23:
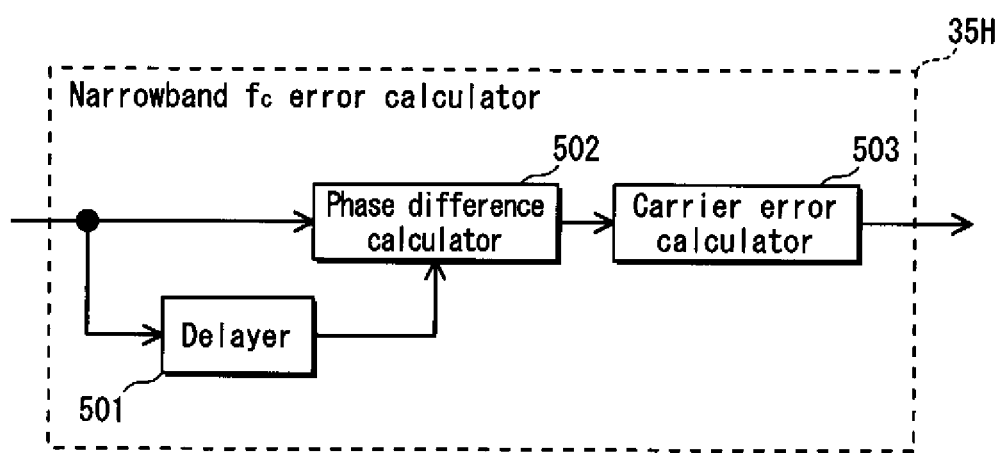
FIG. 23 is a configuration diagram of the narrowband $f_c$ error calculator from FIG. 22.

The configuration of the narrowband $f_c$ error calculator 35H is shown in FIG. 23. As shown, the narrowband $f_c$ error calculator 35H comprises a delayer 501, a phase displacement calculator 502, and a carrier error calculator 503.

The channel characteristics calculated by the channel characteristics estimator 38 are input to the delayer 501 and to the phase displacement calculator 502. The delayer 501 delays the input channel characteristics by one symbol and outputs same to the phase displacement calculator 502. The phase displacement calculator 502 uses the CP signal channel characteristics input from the channel characteristics estimator 38 and from the delayer 501 to calculate the inter-symbol phase displacement of the CP signal channel characteristics, and then outputs the CP signal inter-symbol phase displacement so calculated to the carrier error calculator 503. The carrier error calculator 503 estimates the narrowband carrier frequency error from the CP signal inter-symbol phase displacement input from the phase displacement calculator 502 and outputs the error so estimated to the $f_c$ corrector 32 of FIG. 22.

The $f_c$ corrector 32 uses the narrowband carrier frequency error input from the carrier error calculator 503 within the narrowband $f_c$ error calculator 35H instead of the narrowband carrier frequency error input from the narrowband $f_c$ error calculator 35H when applying corrections to carrier frequency discrepancies.

Corrections to carrier frequency discrepancies may be applied by multiplication of the phase opposite the desired phase by the signal output from the orthogonal transformer 36 rather than being applied by the $f_c$ corrector 32.

Embodiment 10

Embodiment 10 of the present invention is described below with reference to the figures. It should be noted that those structural elements of Embodiment 10 which are substantially equivalent to structural elements of Embodiment 1 use identical reference numbers and are here omitted as Embodiment 1 may be referred to for explanations thereof.

Figure 24:
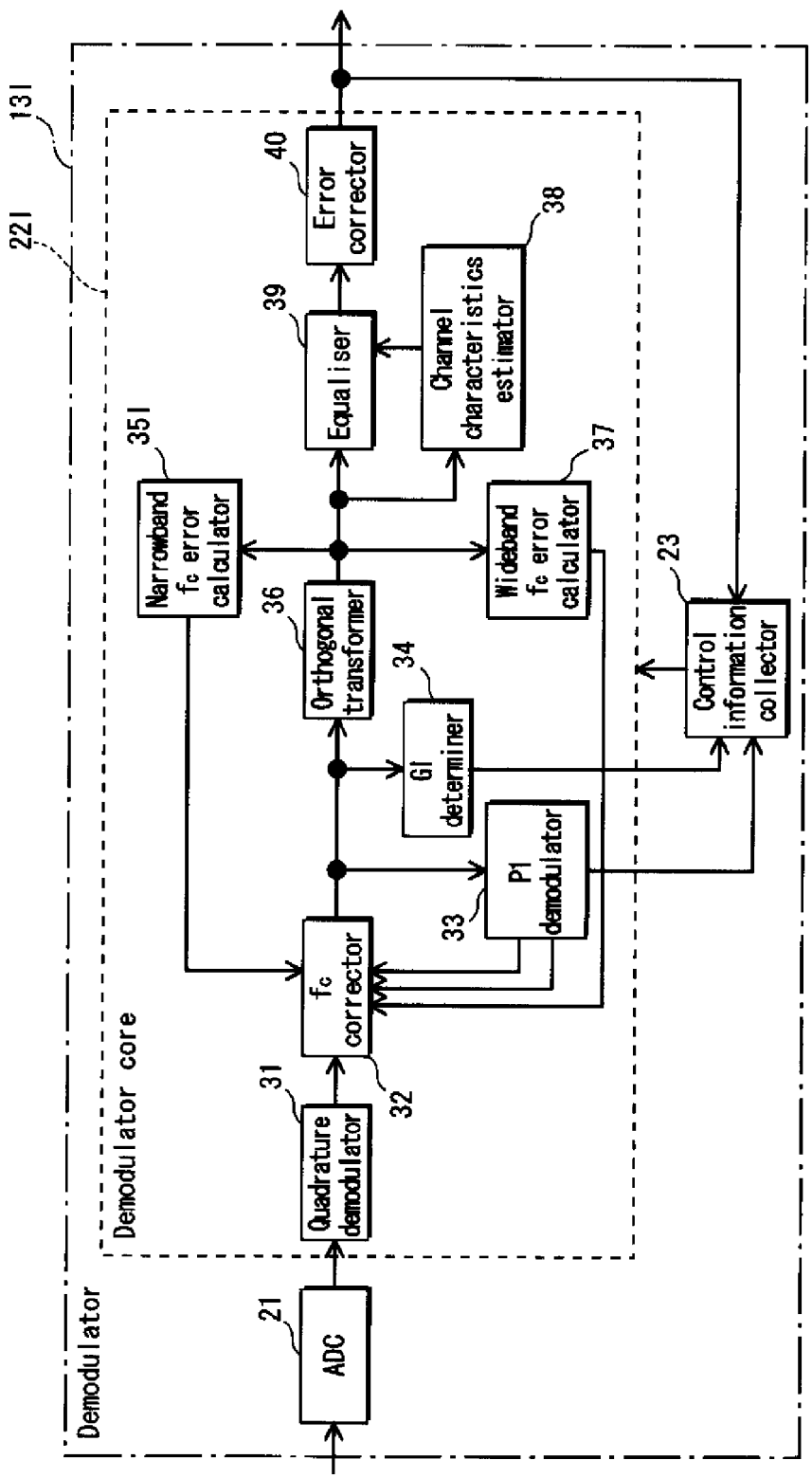
FIG. 24 is a configuration diagram of the demodulator pertaining to Embodiment 10.

The demodulator 13I of Embodiment 10 is described below with reference to FIG. 24. As shown, the demodulator core 22I of the demodulator 13I comprises the structure of the demodulator core 22 of the demodulator 13 (see FIG. 2) modified in that the narrowband $f_c$ error calculator 35 has been removed and the narrowband $f_c$ error calculator 35I has been added.

Figure 25:
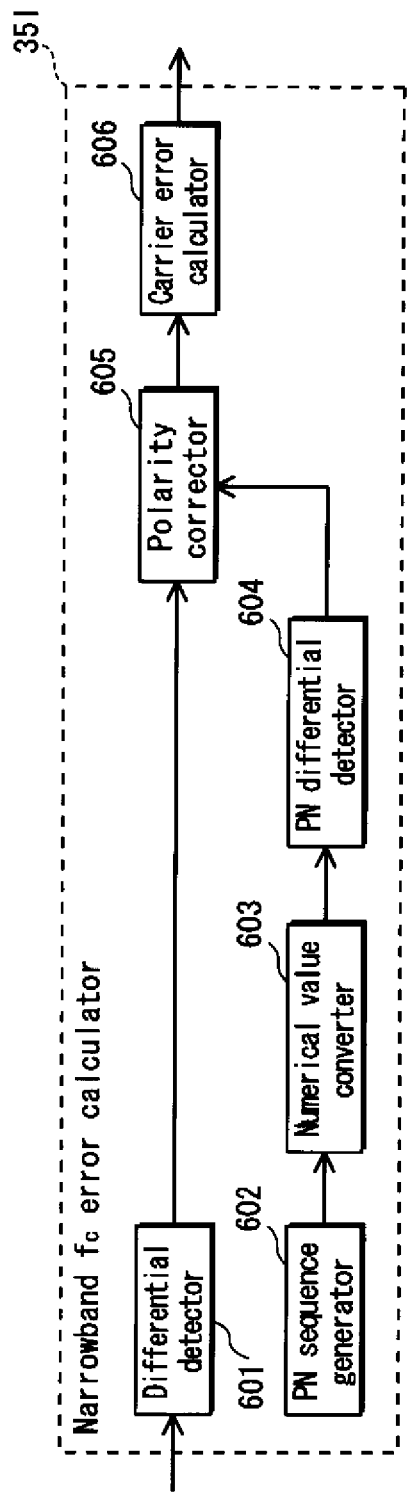
FIG. 25 is a configuration diagram of the narrowband $f_c$ error calculator from FIG. 24.

The configuration of the narrowband $f_c$ error calculator 35I is shown in FIG. 25. As shown, the narrowband $f_c$ error calculator 35I comprises a differential detector 601, a PN sequence generator 602, a numerical value converter 603, a PN differential detector 604, a polarity corrector 605, and a carrier error calculator 606.

The signals output from the orthogonal transformer 36 are supplied to the differential detector 601. The differential detector 601 performs differential detection for the CP signals included in the signals so supplied, then outputs the resulting signals (differential detection signals) to the polarity corrector 605. The ultimate result is that signals can be obtained for which, in addition to the PN-sequence dependant inter-symbol polarity difference shown in FIG. 13, the phase displacement based on the carrier frequency discrepancies have been multiplied.

The PN sequence generator 602 generates the PN sequence shown in FIG. 13 with the frame-leading symbol for reference, and then outputs the PN sequence so generated to the numerical value converter 603. The numerical value converter 603 performs numerical value conversion on the PN sequence input from the PN sequence generator 602 using the above-inscribed (Math. 6), and then outputs the resulting sequence signal to the PN differential detector 604. The PN differential detector 604 calculates the inter-symbol polarity through inter-symbol differential detection of the sequence signal input from the numerical value converter 603, and then outputs the inter-symbol polarity so calculated to the polarity corrector 605.

The polarity corrector 605 calculates the inter-symbol phase difference, which is the cause of carrier frequency discrepancies, by applying polarity corrections on the differential detection signals of the CP signals input from the differential detector 601 according to the inter-symbol polarity calculated by the PN differential detector 604, and then outputs the inter-symbol phase difference so calculated to the carrier error calculator 606. The carrier error calculator 606 calculates the narrowband carrier frequency error according to the inter-symbol polarity difference from the polarity calculator 605, and then outputs the narrowband carrier frequency error so calculated to the $f_c$ corrector 32 of FIG. 24.

The $f_c$ corrector 32 uses the narrowband carrier frequency error input from the carrier error calculator 606 within the narrowband $f_c$ error calculator 35I rather than that input from the narrowband $f_c$ error calculator 35 when applying corrections to carrier frequency discrepancies.

Corrections to carrier frequency discrepancies may be applied through multiplication of the phase opposite the calculated phase by the signals output from the orthogonal transformer 36 rather than being applied by the $f_c$ corrector 32.

The narrowband $f_c$ error calculator 35, which operates in the time domain, and the narrowband $f_c$ error calculators 35H and 35I, which operate in the frequency domain, may be used together. Also, corrections may be applied using the carrier error calculated by the narrowband $f_c$ error calculators 35H and 35I after the CP signal location pattern has been verified.

Embodiments 1 through 10 apply corrections to carrier frequency discrepancies on time-domain signals according to the error calculated within the non-P1 symbol sub-carrier spacing (narrowband carrier frequency error). However, the Embodiments are not limited in this manner and may also apply corrections to carrier frequency discrepancies of frequency-domain signals.

Furthermore, for example, the time-domain narrowband carrier frequency error calculation explained for Embodiments 1-4, 6 and 7 may be combined with the frequency-domain narrowband carrier frequency error calculation explained for Embodiments 9 and 10.

Embodiment 11

Embodiment 11 of the present invention is described below with reference to the figures. It should be noted that those structural elements of Embodiment 11 which are substantially equivalent to structural elements of Embodiment 1 use identical reference numbers and are here omitted as Embodiment 1 may be referred to for explanations thereof.

Before the wideband $f_c$ error calculator 37 calculates the wideband carrier frequency error, the demodulator 13 of Embodiment 1 uses the error at the unit level of the P1 symbol sub-carrier spacing detected in the P1 symbols to ensure that the error at the unit level of the non-P1 symbol sub-carrier spacing falls within half the difference in the number of useful sub-carriers between extended mode and normal mode.

In contrast, before the wideband $f_c$ error calculator 37 calculates the wideband carrier frequency error, the demodulator 13J of Embodiment 11 does not use the P1 symbols to ensure that the error at the unit level of the non-P1 symbol sub-carrier spacing falls within half the difference in the number of useful sub-carrier symbols between extended mode and normal mode.

Figure 26:
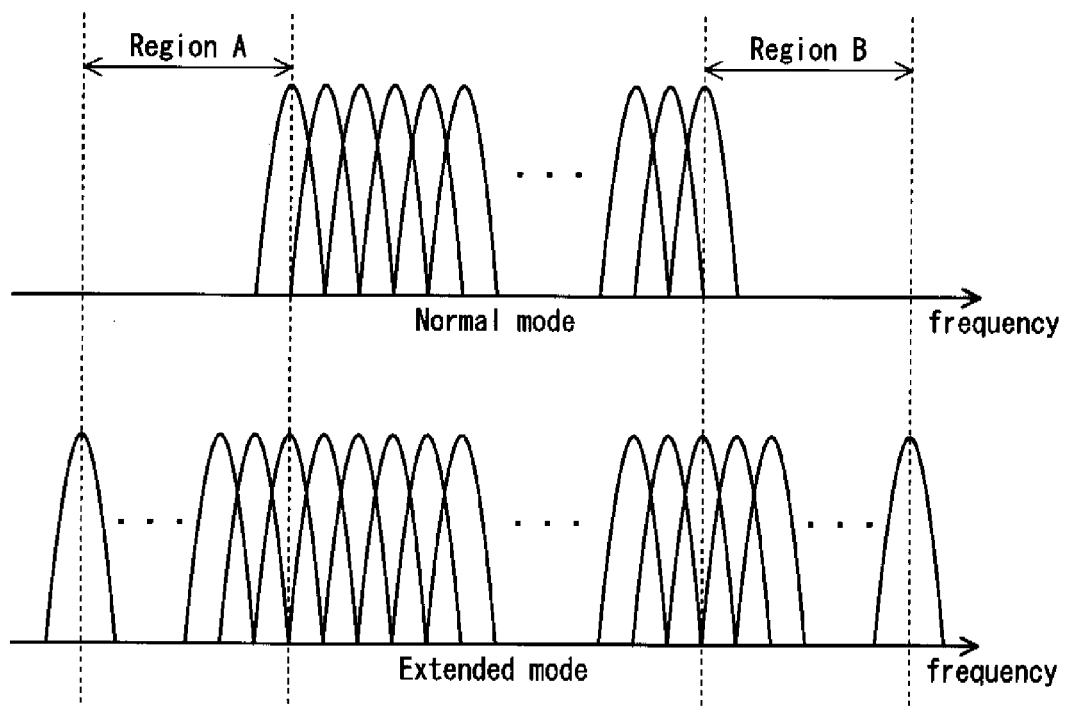
FIG. 26 is a schematic diagram showing the sub-carrier positions in the two carrier modes, namely normal mode and extended mode.

As shown in FIG. 26, for Embodiment 11, the regions corresponding to the difference in useful sub-carriers between normal mode and extended mode are region A and region B, respectively.

The demodulator 13J of Embodiment 11 is described below with reference to FIG. 27. As shown, the demodulator core 22J of the demodulator 13 J comprises the structure of the demodulator core 22 of the demodulator 13 (see FIG. 2) modified in the replacement of the $f_c$ corrector 32 by the $f_c$ corrector 32J, and the addition of a forward $f_c$ error calculator 48.

Figure 28:
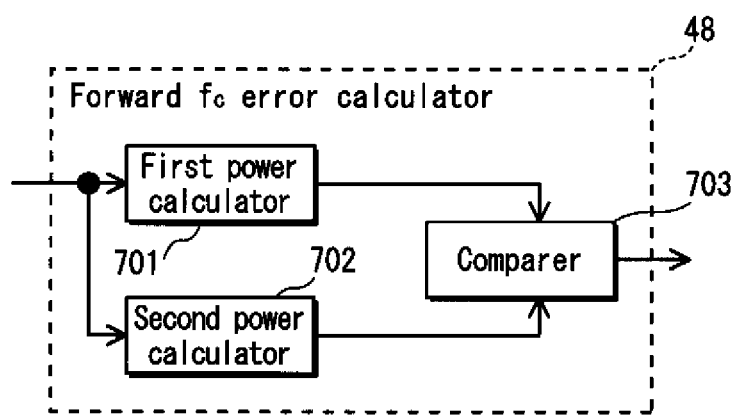
FIG. 28 is a configuration diagram of the forward $f_c$ error calculator from FIG. 27.
Figure 30:
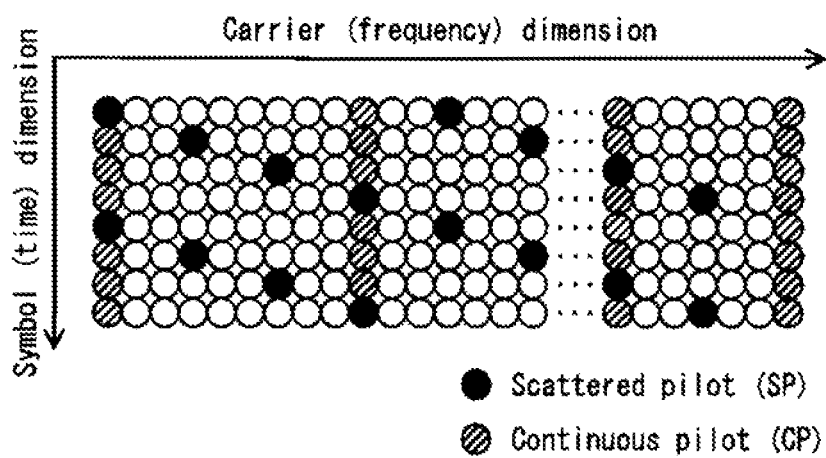
FIG. 30 is a schematic diagram showing the ISDB-T transmission format.
Figure 31:
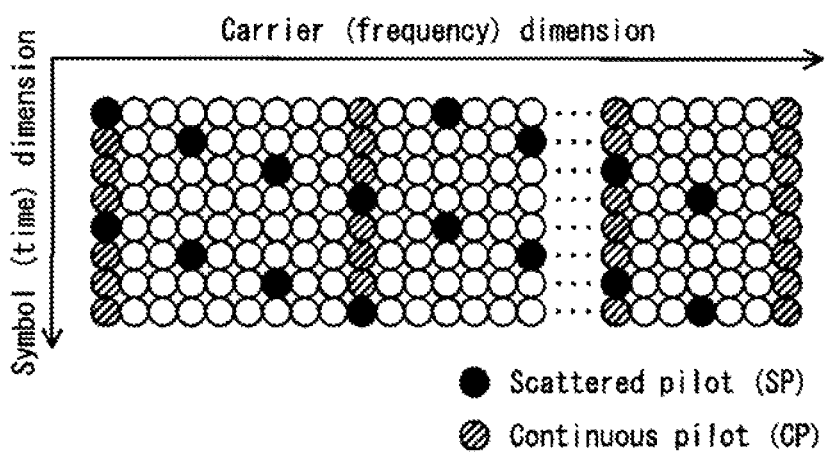
FIG. 31 is a schematic diagram showing the DVB-T transmission format.
Figure 33:
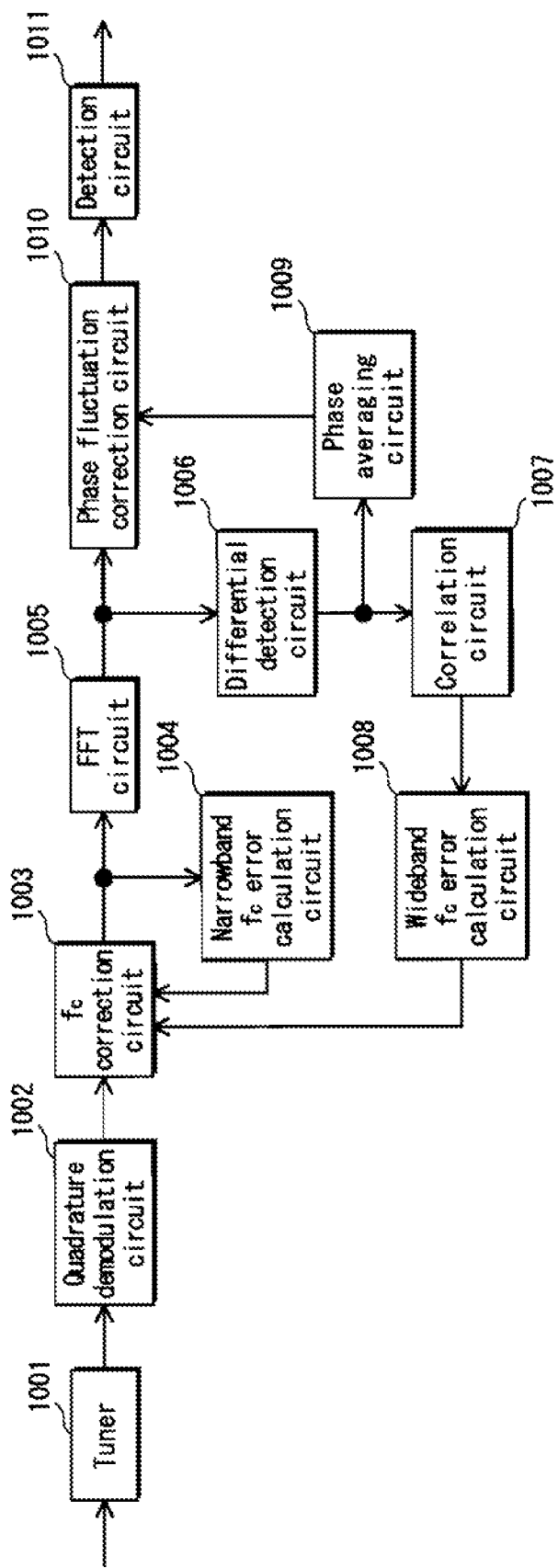
FIG. 33 is a configuration diagram of the OFDM signal demodulator pertaining to Patent Literature 1.
Figure 34:
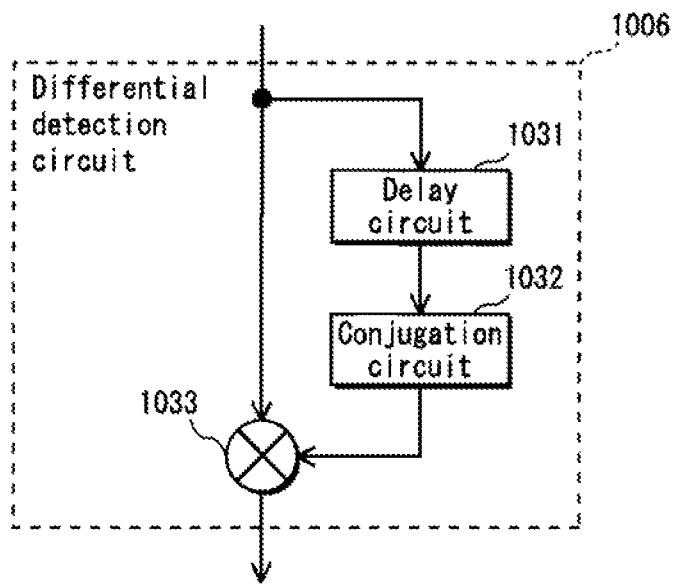
FIG. 34 is a configuration diagram of the differential detection circuit from FIG. 33.
Figure 35:
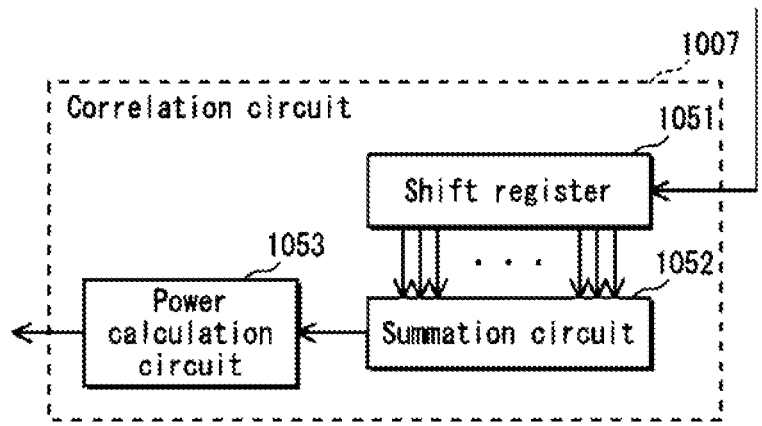
FIG. 35 is a configuration diagram of the correlation circuit from FIG. 33.
Figure 36:
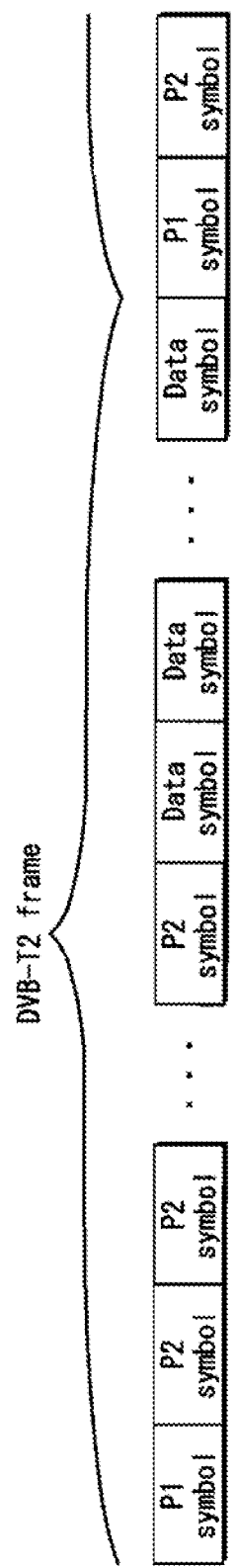
FIG. 36 is a schematic diagram showing the frame structure in the DVB-T2 transmission format.

The configuration of the forward $f_c$ error calculator 48 is shown in FIG. 28. As shown, the forward $f_c$ error calculator 48 comprises a first power calculator 701, a second power calculator 702, and a comparer 703.

The first power calculator 701 calculates the total power of the sub-carrier signals included in region A and outputs the total value so calculated to the comparer 703. The second power calculator 702 calculates the total power of the sub-carrier signals included in region B and outputs the total value so calculated to the comparer 703.

The comparer 703 compares the total power value of the sub-carrier signals in region A input from the first power calculator 701 (hereinafter referred to as the region A power value) to the total power value of the sub-carrier signals in region B input from the second power calculator 702 (hereinafter referred to as the region B power value). If the region A power value is larger than the region B power value, then because this indicates frequency discrepancies on the region A side (in the low-frequency direction) the comparer 703 outputs a signal for these frequencies to be made higher to the $f_c$ corrector 32J. If the region B power value is larger than the region A power value, then because this indicates frequency discrepancies on the region B side (in the high-frequency direction) the comparer 703 outputs a signal for these frequencies to be made lower to the $f_c$ corrector 32J.

Figure 27:
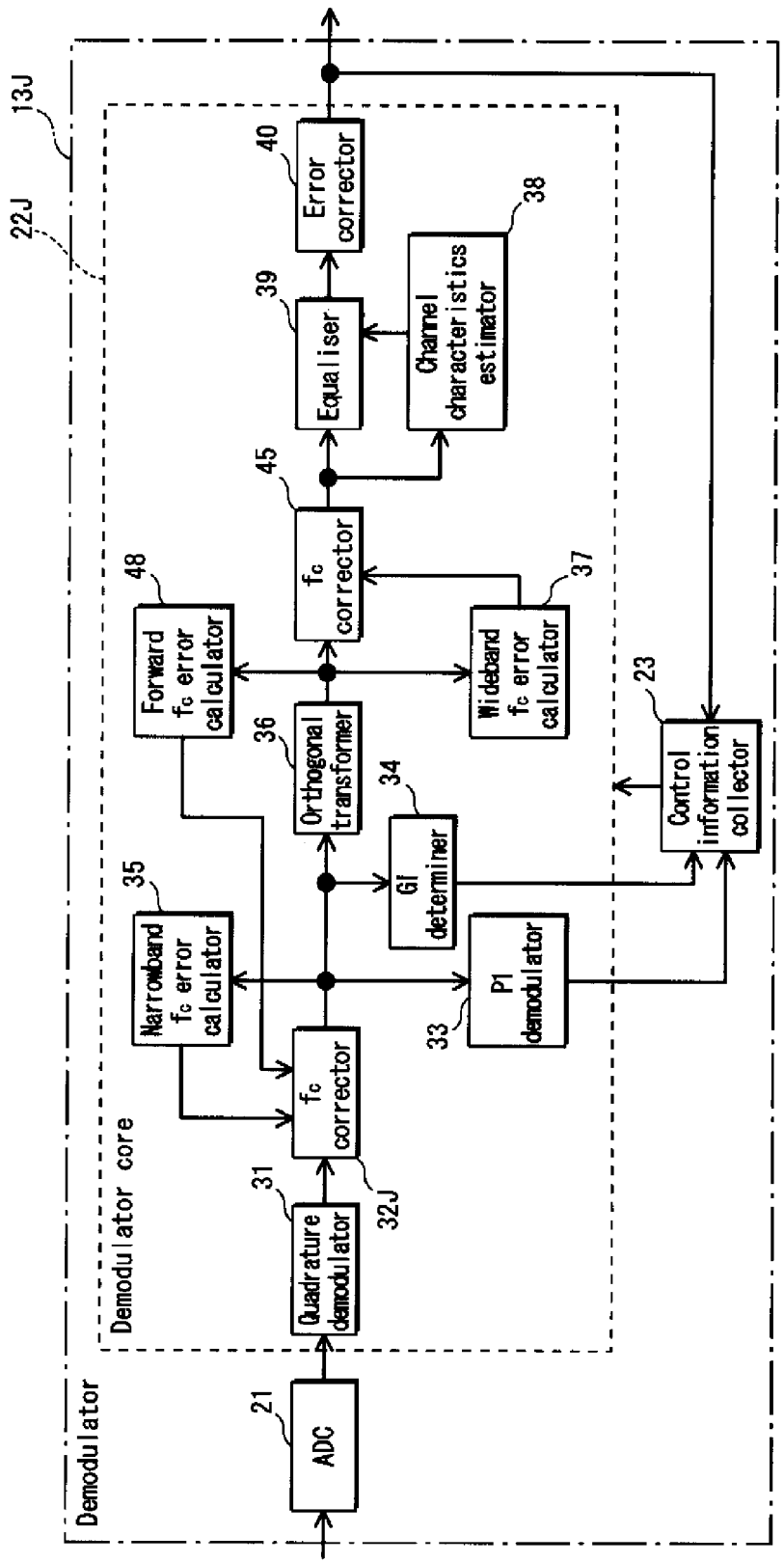
FIG. 27 is a configuration diagram of the demodulator pertaining to Embodiment 11.

The $f_c$ corrector 32J of FIG. 27 applies corrections to carrier frequency discrepancies according to the signals input from the forward $f_c$ error calculator 48.

The above process is repeated until the difference between the region A power value and the region B power value is below a first threshold.

Accordingly, carrier frequency discrepancies are constrained within half the difference in number of useful sub-carriers between extended mode and normal mode. As such, the two modes can be distinguished in the wideband carrier frequency error calculation process by the wideband $f_c$ error calculator 37.

Extended mode and normal mode may be distinguished via the region A power value and the region B power value even if the difference between the two values is not below the predetermined value. For instance, a second threshold may be set such that extended mode is in use when the difference between the region A power value and the region B power value is greater than the second threshold, and normal mode is in use when this difference is lower than the second threshold. Accordingly, the number of CP signal location pattern candidates can be reduced for use in maximum value detection. This, in turn, enhances the accuracy of wideband carrier frequency error detection.

(Supplement)

The present invention is not limited to the Embodiments described above. Many other variations are possible as long as they achieve the aim of the present invention as well as complementary aims thereof. Examples are given as follows.

(1) The receiver of each of the above-described Embodiments is not limited to transmissions in the DVB-T2 transmission format but is applicable to any OFDM signals in which CP signals are arranged at sub-carrier locations determined according to any one location pattern among a plurality of location patterns that determine a plurality of sub-carrier locations in which CP signals are continuously arranged within a plurality of symbols in the symbol direction.

(2) The above Embodiments are described with an example using OFDM signals in which CP signals are arranged at predetermined sub-carrier locations determined according to any one location pattern among a plurality of CP signal location patterns. However, the Embodiments are not limited in this manner but are also applicable to any example such as the following, where OFDM signals in which predetermined signals continuously arranged at a plurality of symbols along a symbol direction are arranged at a plurality of sub-carrier positions determined according to one among a plurality of location patterns which determine the sub-carrier positions in which the predetermined signals are arranged. The plurality of sub-carrier positions at which are arranged signals differentially modulated in the symbol direction are preferably non-periodic.

An example of a broadcast scheme that is not directly applicable to the above Embodiments, in which symbols differentially modulated in the symbol direction are arranged in a plurality of sub-carriers, is described as follows. The Japanese terrestrial digital transmission format ISDB-T incorporates sub-carriers that transmit control information, known as TMCC (Transmission Multiplexing Configuration Control) signals. In order to enable demodulation and decoding by a receiver, TMCC signals comprise such information as system identification, transmitted parameter switch indices, emergency transmission flags, current and upcoming program information, and the like. TMCC signals are modulated using DBPSK (Differential Binary Phase displacement Keying). The sub-carrier locations of TMCC signals in ISDB-T are shown in FIG. 29 (Mode 3, synchronous modulation). In ISDB-T, the sub-carrier locations of TMCC signals are uniquely defined.

(3) Each of the above Embodiments is described as receiving OFDM signals. However, the Embodiments are also applicable to multi-carrier modulated signals using a plurality of non-orthogonal carriers.

(4) Each of the above Embodiments is described in examples using two modes, namely extended mode and normal mode. However, the Embodiments are not limited in this manner and are also applicable to cases where three or more modes are used, as well as to cases where only one mode is used.

(5) The above Embodiments, being intended for use with the DVB-T2 transmission format, use preamble symbols, i.e. the P1 symbols, that include control information (such as FFT size information) to narrow down the pilot patterns. However the Embodiments are not limited in this manner Furthermore, the Embodiments are not limited to the use of control symbols, i.e. P2 symbols, which include the pilot pattern and carrier mode.

(6) Each of the above Embodiments is described as using P2 pilot signals for the P2 symbols, these being symbols in which CP signals are not arranged, and as using SP signals and FC pilot signals as frame-closing symbols. However, the Embodiments are not limited in this manner and may use any signals in which vectors are aligned through differential detection along the symbol direction.

(7) The structure of each of the above Embodiments is such that all CP carriers are used. However the Embodiments are not limited in this manner but may also make use of any of the following. The structure may be such that, owing to the influence of interfering waves within a single channel (narrowband interference and analogue broadcasts), CP signals are detected at higher power and the high-power CP signals so detected are excluded from correlation. The detection method may be, for example, one in which the power of the CP carriers is calculated and the CP carrier with the greatest power value is detected as the CP carrier to be excluded from correlation, or in which CP carriers with a value in excess of a predetermined threshold are detected as CP carriers to be so excluded. Alternatively, the power value of the differential detection value of the CP carriers may be calculated and the CP carrier with the greatest such value detected as the CP carrier to be excluded from correlation, or CP carriers with such values in excess of a predetermined threshold may be detected as the CP carriers to be so excluded. The same may be applied to the handling of SP signals, P2 pilot signals, and FC pilot signals in carriers where such signals are arranged.

(8) Embodiment 1 is described above as performing quadrature demodulation with the quadrature demodulator 31 using a fixed frequency and as applying corrections to carrier frequency error with the $f_c$ corrector 32. However, Embodiment 1 is not limited in this manner and may also be implemented as follows. The quadrature demodulator 31 may perform quadrature demodulation using a frequency obtained by summing the fixed frequency and the detected carrier frequency error, and the complex baseband signals in which carrier frequency discrepancies have been corrected may be obtained thusly. Similar variations are also applicable to the other Embodiments.

(9) Embodiment 1 is described above as estimating the guard interval fraction through guard correlation by the GI determiner 34. However, the Embodiment is not limited in this manner but may also estimate the guard interval fraction actually used for transmission of non-P1 symbols by using methods other than guard correlation. Furthermore, all guard interval fractions may be processed in order, with no GI determiner 34 being used. Similar variations are also applicable to the other Embodiments.

(10) Embodiment 1 is described above as having a structure in which the orthogonal transformer 36 and the P1 orthogonal transformer 53 are distinct. However the Embodiment is not limited in this manner and may make use of a structure in which the orthogonal transformer 36 and the P1 orthogonal transformer 53 are a single structural element. Similar variations are also applicable to the other Embodiments.

(11) Each structural element of the receiver of each of the above Embodiments may be realized by LSIs. As such, each structural element may be formed on a single chip, and alternatively a plurality of or the totality of functional units may be formed on a single chip. According to varying integrations, the LSI here named may be an IC, a system LSI, a SLSI, an ULSI, or similar. Additionally, the integrated circuit method is not limited to LSI, but may also be realized as a private circuit or as a general-use processor. A FPGA (Field Programmable Gate Array) or a reconfigurable processor connected or set up in circuit cells within the LSI may also be used. Furthermore, should integrated circuit technology appear that comes to replace LSI, perhaps through progress in semiconductors or in related technologies, the integration of function blocks using such technology is of course also possible. Potential applicability to biotechnology is also conceivable.

(12) The operating method of the receiver described in each of the above Embodiments may be written at least in part as a receiver program and stored in memory for reading and execution by, for instance, a CPU (Central Processing Unit). The above-described program may also be saved and distributed on a recording medium.

(13) A receiver performing at least one part of the receiving process described for the receiver in each of the above Embodiments may also be realized.

(14) Each of the above-described Embodiments may also be realized as a receiver performing part of the receiving process described above, or as a receiving method, or as a receiving circuit, or as a program, or as a combination thereof. For example, a receiver or integrated circuit configured in part as a receiver described above may be realized, and the operating process thereof may be written as a receiving program with the exception of one part, and this process may be stored in memory to be read and executed by a CPU.

(15) The content explained for each of the above-described Embodiments may be recombined as appropriate.

The present invention may be used as a receiver that applies corrections to carrier frequency discrepancies arising in transmission reception.

REFERENCE SIGNS LIST 1 receiver
11 antenna
12 tuner
13 demodulator
14 decoder
15 display
21 ADC
22 demodulator core
23 control information collector
31 quadrature demodulator
32 $f_c$ corrector
33 P1 demodulator
34 GI determiner
35 narrowband $f_c$ error calculator
36 orthogonal transformer
37 wideband $f_c$ error calculator
38 channel characteristics estimator
39 equaliser
40 error corrector
51 P1 position detector
52 P1 NAFC
53 P1 orthogonal transformer
54 P1 WAFC
55 P1 decoder
101 power calculator
102 correlator
103 maximum value detector
104 $f_c$ corrector
$151_{1-N-1}$ registers
$152_{1-N}$ multipliers
153 adder
201 differential detector
$202_{1-16}$ correlators
203 maximum value detector
231 delayer 232 complex conjugate calculator
233 multiplier
$251_{1-N-1}$ registers
$252_{1-N}$ multipliers
253 adder
254 power calculator

The invention claimed is:

1. A receiving device receiving multi-carrier modulated signals in which predetermined signals continuously arranged at a plurality of symbols along a symbol direction are arranged at a plurality of sub-carrier positions determined according to one among a plurality of location patterns which determine the sub-carrier positions in which the predetermined signals are arranged, wherein the sub-carrier positions in which the predetermined signals are arranged are non-periodic along a carrier direction and differ with each of the location patterns, the receiving device comprising:

an orthogonal transformer operable to separate and output the multi-carrier modulated signals into a plurality of sub-carriers by orthogonal transformation;

a wideband carrier frequency error calculator operable to (i) for each of the location patterns, calculate a cumulative value by performing predetermined processing on signals output from the orthogonal transformer at the sub-carrier positions determined by the location pattern while simultaneously shifting the signals output by the orthogonal transformer by one sub-carrier unit along the carrier direction, and (ii) calculate a wideband carrier frequency error according to a carrier direction discrepancy calculated as a maximum value within the cumulative values; and a carrier frequency error corrector operable to apply corrections to the carrier frequency discrepancy according to the wideband carrier frequency error calculated, wherein the multi-carrier modulated signals further include a preamble symbol, and the receiving device further comprises:

a preamble carrier frequency error estimator operable to estimate a carrier frequency error using the preamble symbol; and a first carrier frequency error corrector operable to apply corrections to the carrier frequency discrepancy using the carrier frequency error estimated using the preamble symbol before the wideband carrier frequency error is calculated by the wideband carrier frequency error calculator, and wherein the multi-carrier modulated signals are transmitted using one of the following modes: (i) a normal mode in which sub-carriers within a first range are useful sub-carriers, the first range being a middle portion of all sub-carriers to the exclusion of a plurality of high-frequency subcarriers and of a plurality of low-frequency sub-carriers; and (ii) an extended mode in which sub-carriers within a second range are useful sub-carriers, the second range being the first range extended by a set number of high-frequency sub-carriers and of low-frequency sub-carriers;

the location patterns are determined with reference to the sub-carrier position of the lowest frequency among the useful sub-carriers;

the wideband carrier frequency error calculator calculates the cumulative value for location patterns in normal mode as well as for location patterns in extended mode; and the first carrier frequency error corrector constrains a remaining post-correction carrier frequency discrepancy to half the difference in frequency band between normal mode and extended mode.

2. A receiving device receiving multi-carrier modulated signals in which predetermined signals continuously arranged at a plurality of symbols along a symbol direction are arranged at a plurality of sub-carrier positions determined according to one among a plurality of location patterns which determine the sub-carrier positions in which the predetermined signals are arranged, wherein the sub-carrier positions in which the predetermined signals are arranged are non-periodic along a carrier direction and differ with each of the location patterns, the receiving device comprising:

an orthogonal transformer operable to separate and output the multi-carrier modulated signals into a plurality of sub-carriers by orthogonal transformation;

a wideband carrier frequency error calculator operable to (i) for each of the location patterns, calculate a cumulative value by performing predetermined processing on signals output from the orthogonal transformer at the sub-carrier positions determined by the location pattern while simultaneously shifting the signals output by the orthogonal transformer by one sub-carrier unit along the carrier direction, and (ii) calculate a wideband carrier frequency error according to a carrier direction discrepancy calculated as a maximum value within the cumulative values; and a carrier frequency error corrector operable to apply corrections to the carrier frequency discrepancy according to the wideband carrier frequency error calculated, wherein the wideband carrier frequency error calculator comprises:

a differential detector operable to differentially detect and output, for every sub-carrier, signals output from the orthogonal transformer and signals output from the orthogonal transformer one symbol prior;

a correlator operable, for each of the location patterns, to shift signals output by the differential detector by one sub-carrier unit along the carrier direction and to simultaneously calculate a correlation between (i) a location sequence signal in which sub-carrier positions determined by the location pattern are set to one and all other sub-carrier positions are set to zero, and (ii) a signal output by the differential detector and output the result; and a maximum value detector operable to calculate the wideband carrier frequency error by detecting a maximum value within correlation values calculated by the correlator, and wherein the multi-carrier modulated signals further include symbols in which the predetermined signals are not included;

predetermined first signals that differ from the predetermined signals are arranged in a plurality of sub-carriers and included at the symbols in which the predetermined signals are not included; and the correlator is further operable to, when at least one of the two symbols used by the differential detector is one of the symbols in which the predetermined signals are not included, calculate a correlation between (i) for each of the location patterns, a location sequence signal in which sub-carrier positions where the predetermined signals are arranged therein when the location pattern is used and where the predetermined first signals are arranged at symbols in which the predetermined signals are not arranged are set to one, while all other sub-carrier positions are set to zero, and (ii) signals output by the differential detector.

3. A receiving device receiving multi-carrier modulated signals in which predetermined signals continuously arranged at a plurality of symbols along a symbol direction are arranged at a plurality of sub-carrier positions determined according to one among a plurality of location patterns which determine the sub-carrier positions in which the predetermined signals are arranged,
wherein the sub-carrier positions in which the predetermined signals are arranged are non-periodic along a carrier direction and differ with each of the location patterns, the receiving device comprising:
an orthogonal transformer operable to separate and output the multi-carrier modulated signals into a plurality of sub-carriers by orthogonal transformation;
a wideband carrier frequency error calculator operable to (i) for each of the location patterns, calculate a cumulative value by performing predetermined processing on signals output from the orthogonal transformer at the sub-carrier positions determined by the location pattern while simultaneously shifting the signals output by the orthogonal transformer by one sub-carrier unit along the carrier direction, and (ii) calculate a wideband carrier frequency error according to a carrier direction discrepancy calculated as a maximum value within the cumulative values; and
a carrier frequency error corrector operable to apply corrections to the carrier frequency discrepancy according to the wideband carrier frequency error calculated,
wherein the wideband carrier frequency error calculator comprises:
a differential detector operable to differentially detect and output, for every sub-carrier, signals output from the orthogonal transformer and signals output from the orthogonal transformer one symbol prior;
a correlator operable, for each of the location patterns, to shift signals output by the differential detector by one sub-carrier unit along the carrier direction and to simultaneously calculate a correlation between (i) a location sequence signal in which sub-carrier positions determined by the location pattern are set to one and all other sub-carrier positions are set to zero, and (ii) a signal output by the differential detector and output the result; and
a maximum value detector operable to calculate the wideband carrier frequency error by detecting a maximum value within correlation values calculated by the correlator, and
wherein the multi-carrier modulated signals include symbols in which the predetermined signals are not included;
predetermined first signals that differ from the predetermined signals are arranged in a plurality of sub-carriers and included at the symbols in which the predetermined signals are not included; and
the correlator is further operable, when both of the two symbols used by the differential detector are symbols in which the predetermined signals are not included, to calculate a correlation between (i) for each of the location patterns, a location sequence signal in which sub-carrier positions where the predetermined signals are arranged therein when the location pattern is used and where the predetermined first signals are arranged at symbols in which the predetermined signals are not arranged are set to one, while all other sub-carrier positions are set to zero, and (ii) signals output by the differential detector.

4. The receiving device of claim 1, wherein
the wideband carrier frequency error detector estimates the location pattern and carrier mode used by the multi-carrier modulated signals according to the location pattern and carrier direction discrepancies of the greatest cumulative value,
the receiving device further comprises:
a channel characteristics estimator operable to estimate channel characteristics, which are the amplitude and phase received as a channel by the multi-carrier modulated signals, according to the location pattern and carrier mode estimated by the wideband carrier frequency calculator; and
an equalizer operable to correct the amplitude and phase of the signals output by the orthogonal transformer according to the channel characteristics estimated by the channel characteristics estimator.

5. The receiving device of claim 4, wherein
the multi-carrier modulated signals include scattered pilot signals scattered therein;
the scatter pattern of the scattered pilot signals is determined according to the location pattern and the carrier mode; and
the channel characteristics estimator estimates the scatter pattern from the estimated location pattern and carrier mode, and estimates channel characteristics according to the scatter pattern so estimated.

6. The receiving device of claim 1, wherein
the multi-carrier modulated signals further include control symbols that include control information as the location pattern and the carrier mode used by the multicarrier modulated signals,
the receiving device further comprises:
a control information extractor operable to extract the control information from the control symbols; and
the wideband carrier frequency error calculator calculates the cumulative values only for the location pattern and carrier mode included therein after extraction of the control information.

7. The receiving device of claim 4, wherein
the multi-carrier modulated signals further include control symbols that include control information, being the location pattern and the carrier mode used by the multi-carrier modulated signals,
the receiving device further comprises:
a control information extractor operable to extract the control information from the control symbols; and
the channel characteristics estimator estimates the channel characteristics according to the location pattern and carrier mode included therein after the extraction of the control information.

* * * * *